US012765695B2

(12) United States Patent
Lin et al.

(10) Patent No.: US 12,765,695 B2
(45) Date of Patent: Oct. 20, 2026

(54) INTERNAL TENSIONING STRUCTURE USEABLE WITH INFLATABLE DEVICES

(71) Applicant: Intex Marketing Ltd., Tortola (VG)

(72) Inventors: Hua Hsiang Lin, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 19/318,931

(22) Filed: Sep. 4, 2025

(65) Prior Publication Data

US 2025/0380818 A1 Dec. 18, 2025

Related U.S. Application Data

(63) Continuation of application No. 18/532,903, filed on Dec. 7, 2023, which is a continuation of application
(Continued)

(30) Foreign Application Priority Data

Mar. 2, 2012 (CN) ........................ 201210053143.X
Mar. 2, 2012 (CN) ........................ 201210053146.3
(Continued)

(51) Int. Cl.
*A47C 27/08* (2006.01)
*B29C 65/00* (2006.01)
(Continued)

(52) U.S. Cl.
CPC .......... *A47C 27/087* (2013.01); *A47C 27/081* (2013.01); *B29C 65/02* (2013.01);
(Continued)

(58) Field of Classification Search
CPC ..... A47C 27/087; A47C 27/18; A47C 27/081; B29D 22/02; B32B 2307/54; B32B 5/022;
(Continued)

(56) References Cited

U.S. PATENT DOCUMENTS

| | | | |
|---|---|---|---|
| 245,881 | A | 8/1881 | Snyder et al. |
| 486,696 | A | 11/1892 | Curlin |

(Continued)

FOREIGN PATENT DOCUMENTS

| | | | |
|---|---|---|---|
| AT | 241745 | B | 8/1965 |
| CA | 2634218 | A1 | 7/2007 |

(Continued)

OTHER PUBLICATIONS

Exhibit 28 to Declaration of R. Dodge in Support of (1) Intex's Notice and Motion for Partial Summary Judgment of Infringement and Estoppel; (2) Intex's Notice of Motion to Exclude Bestway's Expert Opinions; and (3) Intex's Notice and Consolidated Motion to Strike in U.S. Pat. No. 9,254,240 Infringement Action, dated Aug. 18, 2023, 5 pages.

(Continued)

*Primary Examiner* — Justin C Mikowski
*Assistant Examiner* — George Samuel Gines
(74) *Attorney, Agent, or Firm* — Faegre Drinker Biddle & Reath LLP

(57) ABSTRACT

An internal tensioning structure for use in an inflatable product fulfills the basic function of maintaining two adjacent inflatable surfaces in a desired geometric arrangement when the inflatable product is pressurized. The tensioning structure is formed by connecting a pair of plastic strips sheets via spaced-apart strands, such as strings or wires. When pulled taut, the strands provide a high tensile strength between the two opposed plastic strips. At the same time, the plastic strips facilitate a strong, long-lasting weld between the tensioning structure and the inflatable product.

26 Claims, 28 Drawing Sheets

Related U.S. Application Data

No. 17/889,684, filed on Aug. 17, 2022, now abandoned, which is a continuation of application No. 16/935,964, filed on Jul. 22, 2020, now abandoned, which is a continuation of application No. 15/581,638, filed on Apr. 28, 2017, now abandoned, which is a continuation of application No. 14/444,453, filed on Jul. 28, 2014, now Pat. No. 9,802,359, which is a continuation of application No. PCT/US2012/042079, filed on Jun. 12, 2012.

(30) Foreign Application Priority Data

Mar. 2, 2012 (CN) ........................ 201220075738.0
Mar. 2, 2012 (CN) ........................ 201220075742.7

(51) Int. Cl.

*B29C 65/02* (2006.01)
*B29C 65/04* (2006.01)
*B29C 65/18* (2006.01)
*B29D 22/02* (2006.01)
*B29L 22/02* (2006.01)
*B29L 31/00* (2006.01)
*B32B 5/02* (2006.01)
*B32B 27/12* (2006.01)

(52) U.S. Cl.

CPC ........ *B29C 66/1122* (2013.01); *B29C 66/439* (2013.01); *B29C 66/474* (2013.01); *B29D 22/02* (2013.01); *B32B 5/022* (2013.01); *B32B 27/12* (2013.01); *B29C 65/04* (2013.01); *B29C 65/18* (2013.01); *B29C 66/433* (2013.01); *B29C 66/45* (2013.01); *B29C 66/47* (2013.01); *B29C 66/472* (2013.01); *B29C 66/4722* (2013.01); *B29C 66/53462* (2013.01); *B29C 66/69* (2013.01); *B29C 66/71* (2013.01); *B29C 66/723* (2013.01); *B29C 66/7352* (2013.01); *B29C 66/83413* (2013.01); *B29C 66/8432* (2013.01); *B29C 66/919* (2013.01); *B29C 66/949* (2013.01); *B29L 2022/02* (2013.01); *B29L 2031/751* (2013.01); *B32B 2307/54* (2013.01); *B32B 2307/558* (2013.01); *B32B 2398/00* (2013.01); *B32B 2479/00* (2013.01)

(58) Field of Classification Search

CPC .............. B32B 27/12; B32B 2307/558; B32B 2398/00; B32B 2479/00; D03D 1/02; B29C 65/02; B29C 66/1122; B29C 66/439; B29C 66/474; B29C 65/04; B29C 65/18; B29C 66/433; B29C 66/45; B29C 66/47; B29C 66/472; B29C 66/4722; B29C 66/53462; B29C 66/69; B29C 66/71; B29C 66/723; B29C 66/7352; B29C 66/83413; B29C 66/8432; B29C 66/919; B29C 66/949; B29L 2022/02; B29L 2031/751

USPC .............................................................. 5/706

See application file for complete search history.

(56) References Cited

U.S. PATENT DOCUMENTS

| | | | | |
|---|---|---|---|---|
| 573,122 | A | 12/1896 | Young | |
| 585,834 | A | 7/1897 | Ruth | |
| 818,321 | A | 4/1906 | Whall | |
| 1,138,307 | A | 5/1915 | Parramore | |
| 1,210,455 | A | 1/1917 | Gammeter | |
| 1,276,731 | A | 8/1918 | Crowell | |
| 1,331,018 | A | 2/1920 | Luthy | |
| 1,697,459 | A | 1/1929 | Lajos et al. | |
| 1,775,942 | A | 9/1930 | Millmather | |
| 1,797,770 | A | 3/1931 | Gunning | |
| 1,817,929 | A | 8/1931 | Pfeiffer | |
| 1,820,458 | A | 8/1931 | Jenkins | |
| 1,851,768 | A | 3/1932 | Hubbell | |
| 1,978,690 | A | 10/1934 | Peterson | |
| 2,170,539 | A | 8/1939 | Schoberg | |
| 2,383,592 | A | 8/1945 | Davis | |
| 2,419,429 | A | 4/1947 | Voiles | |
| 2,430,076 | A | 11/1947 | Pollock | |
| 2,549,597 | A | 4/1951 | Harris et al. | |
| 2,596,547 | A | 5/1952 | Guest | |
| 2,663,659 | A | 12/1953 | Miller | |
| 2,691,179 | A | 10/1954 | Kann | |
| 2,731,652 | A | 1/1956 | Bishop | |
| 2,741,780 | A | 4/1956 | Kimbrig | |
| 2,743,510 | A | 5/1956 | Paul et al. | |
| 2,753,573 | A * | 7/1956 | Barker | A47C 27/081 5/712 |
| 3,008,213 | A | 11/1961 | Foster et al. | |
| 3,030,245 | A | 4/1962 | Greiner et al. | |
| 3,092,101 | A | 6/1963 | Kinney | |
| 3,336,921 | A | 8/1967 | Lloyd | |
| 3,379,596 | A | 4/1968 | Stutz | |
| 3,459,615 | A | 8/1969 | Eilerman | |
| 3,522,123 | A | 7/1970 | Andre | |
| 3,555,231 | A | 1/1971 | Laurentie et al. | |
| 3,573,151 | A | 3/1971 | Dawbarn | |
| 3,595,722 | A | 7/1971 | Dawbarn | |
| 3,683,343 | A | 8/1972 | Feldman et al. | |
| 3,683,413 | A | 8/1972 | Schlaepfer | |
| 3,683,431 | A * | 8/1972 | Pennel | A47C 27/087 5/712 |
| 3,705,429 | A | 12/1972 | Nail | |
| 3,772,717 | A | 11/1973 | Yuen et al. | |
| 3,782,456 | A | 1/1974 | Gusmer | |
| 3,899,622 | A | 8/1975 | Geiger | |
| 4,032,751 | A | 6/1977 | Youtsey et al. | |
| 4,230,935 | A | 10/1980 | Meixner | |
| 4,255,646 | A | 3/1981 | Dragoy et al. | |
| 4,272,856 | A | 6/1981 | Wegener et al. | |
| 4,295,918 | A | 10/1981 | Benson et al. | |
| 4,334,141 | A | 6/1982 | Roller et al. | |
| 4,371,777 | A | 2/1983 | Roller et al. | |
| 4,371,999 | A | 2/1983 | Reid | |
| 4,395,618 | A | 7/1983 | Cunningham | |
| 4,395,623 | A | 7/1983 | Shimada et al. | |
| 4,402,887 | A | 9/1983 | Kuriyama et al. | |
| 4,417,639 | A | 11/1983 | Wegener | |
| 4,483,030 | A | 11/1984 | Flick et al. | |
| 4,488,929 | A | 12/1984 | Ostertag | |
| 4,501,952 | A | 2/1985 | Lehrke | |
| 4,528,704 | A | 7/1985 | Wegener et al. | |
| 4,535,490 | A | 8/1985 | Wright | |
| 4,566,443 | A | 1/1986 | Bucher | |
| 4,594,743 | A | 6/1986 | Owen et al. | |
| 4,644,597 | A | 2/1987 | Walker | |
| 4,651,360 | A | 3/1987 | Wang | |
| 4,682,378 | A | 7/1987 | Savenije | |
| 4,754,502 | A | 7/1988 | Bowen | |
| 4,773,104 | A | 9/1988 | Wang | |
| 4,776,911 | A | 10/1988 | Uda et al. | |
| 4,799,821 | A | 1/1989 | Brodersen | |
| 4,822,980 | A | 4/1989 | Carbone et al. | |
| 4,843,659 | A | 7/1989 | Popovich et al. | |
| 4,899,401 | A | 2/1990 | Savarese | |
| 4,920,588 | A | 5/1990 | Watkins | |
| 4,922,083 | A | 5/1990 | Springs et al. | |
| 4,981,543 | A | 1/1991 | Popovich et al. | |
| 4,998,637 | A | 3/1991 | Marovskis | |
| 5,083,361 | A | 1/1992 | Rudy | |
| 5,095,559 | A | 3/1992 | Liljegren et al. | |
| 5,101,823 | A | 4/1992 | Smith | |
| 5,135,440 | A | 8/1992 | Smollar et al. | |
| 5,145,623 | A | 9/1992 | Hendrix et al. | |
| 5,152,018 | A | 10/1992 | Lea | |

(56) References Cited

U.S. PATENT DOCUMENTS

| | | | |
|---|---|---|---|
| 5,159,961 A | 11/1992 | Snetting et al. | |
| 5,171,630 A | 12/1992 | Muzzy et al. | |
| 5,249,323 A | 10/1993 | Kikuchi et al. | |
| 5,257,341 A | 10/1993 | Austin et al. | |
| 5,283,915 A | 2/1994 | Idland et al. | |
| 5,308,424 A | 5/1994 | Sasaki et al. | |
| 5,345,622 A | 9/1994 | Plone | |
| 5,345,996 A | 9/1994 | Druien | |
| 5,412,822 A | 5/1995 | Kelly | |
| 5,438,642 A | 8/1995 | Posen | |
| 5,490,295 A | 2/1996 | Boyd | |
| 5,491,854 A | 2/1996 | Music | |
| 5,504,307 A | 4/1996 | Hayashi et al. | |
| 5,513,296 A | 4/1996 | Goldstein | |
| 5,543,194 A | 8/1996 | Rudy | |
| 5,567,127 A | 10/1996 | Wentz | |
| 5,570,452 A | 10/1996 | Kuhn et al. | |
| 5,585,025 A | 12/1996 | Idland | |
| 5,598,593 A | 2/1997 | Wolfe | |
| D386,238 S | 11/1997 | Peterson | |
| 5,718,007 A | 2/1998 | Loyd | |
| 5,724,478 A | 3/1998 | Thweatt | |
| 5,735,000 A | 4/1998 | Pfaeffle | |
| 5,760,379 A | 6/1998 | Matsen | |
| 5,809,942 A | 9/1998 | Kralovec et al. | |
| 5,865,564 A | 2/1999 | Miller et al. | |
| 5,924,144 A | 7/1999 | Peterson | |
| 5,930,458 A | 7/1999 | Yane et al. | |
| 5,960,495 A | 10/1999 | Hsu et al. | |
| 5,985,071 A | 11/1999 | Wynne et al. | |
| 6,003,166 A | 12/1999 | Hald et al. | |
| 6,054,178 A | 4/2000 | Howells | |
| 6,093,909 A | 7/2000 | Beetz et al. | |
| 6,108,829 A | 8/2000 | Wadsworth | |
| 6,180,930 B1 | 1/2001 | Wu | |
| 6,199,224 B1 | 3/2001 | Versland | |
| 6,209,150 B1 | 4/2001 | Hsu et al. | |
| 6,212,718 B1 | 4/2001 | Stolpmann et al. | |
| 6,236,810 B1 | 5/2001 | Kadotani | |
| 6,315,364 B1 | 11/2001 | Fujita et al. | |
| 6,322,870 B1 | 11/2001 | Tsai | |
| 6,330,395 B1 | 12/2001 | Wu | |
| 6,330,695 B1 | 12/2001 | Arai | |
| 6,357,059 B1 | 3/2002 | Lau | |
| 6,384,864 B1 | 5/2002 | Kim | |
| 6,385,864 B1 | 5/2002 | Sell et al. | |
| 6,405,386 B1 | 6/2002 | Chang | |
| 6,412,123 B1 | 7/2002 | Lau | |
| 6,442,341 B1 | 8/2002 | Wu | |
| 6,453,962 B1 | 9/2002 | Pratt | |
| 6,457,745 B1 | 10/2002 | Juergen | |
| 6,459,854 B1 | 10/2002 | Yoakim et al. | |
| 6,474,373 B1 | 11/2002 | Sejnowski | |
| 6,543,068 B1 | 4/2003 | Penninger | |
| 6,543,962 B2 | 4/2003 | Wells | |
| 6,571,405 B1 | 6/2003 | Saputo et al. | |
| 6,588,028 B1 | 7/2003 | Wu | |
| D486,696 S | 2/2004 | McMullin | |
| 6,859,953 B1 | 3/2005 | Christensen | |
| 7,032,258 B2 | 4/2006 | O'Hanlon | |
| 7,046,922 B1 | 5/2006 | Sturm et al. | |
| 7,056,461 B2 | 6/2006 | Park et al. | |
| 7,070,845 B2 | 7/2006 | Thomas et al. | |
| 7,088,915 B1 | 8/2006 | Sturm et al. | |
| 7,106,957 B2 | 9/2006 | Abras et al. | |
| 7,234,183 B2 | 6/2007 | Elrod et al. | |
| 7,248,792 B2 | 7/2007 | Mihara | |
| 7,254,853 B1 | 8/2007 | Kim | |
| 7,334,274 B2 | 2/2008 | Wang | |
| 7,353,555 B2 | 4/2008 | Lau | |
| 7,370,375 B2 | 5/2008 | Phillips | |
| 7,409,779 B2 | 8/2008 | Dojan et al. | |
| 7,424,211 B2 | 9/2008 | Lehmann | |
| 7,461,416 B2 | 12/2008 | Stover | |
| 7,467,496 B1 | 12/2008 | Cuisset et al. | |
| 7,591,036 B2 | 9/2009 | Lin et al. | |
| 7,694,372 B1 | 4/2010 | Boyd | |
| 7,727,350 B2 * | 6/2010 | Hawkins | A46B 5/06 156/441 |
| 7,797,770 B2 | 9/2010 | Lau | |
| 7,813,628 B2 | 10/2010 | Haan | |
| 7,818,825 B2 | 10/2010 | Lau | |
| 7,822,326 B2 | 10/2010 | Commette et al. | |
| 7,865,073 B2 | 1/2011 | Von et al. | |
| 7,987,531 B2 | 8/2011 | West | |
| 8,012,201 B2 | 9/2011 | Lashinski et al. | |
| 8,095,998 B2 | 1/2012 | Lau | |
| 8,108,954 B2 | 2/2012 | Lau | |
| 8,151,486 B2 | 4/2012 | Dua | |
| 8,170,406 B2 | 5/2012 | Wu | |
| 8,241,451 B2 | 8/2012 | Rapaport et al. | |
| 8,431,874 B2 | 4/2013 | Oh et al. | |
| 8,479,412 B2 | 7/2013 | Peyton et al. | |
| 8,562,773 B2 | 10/2013 | Lin et al. | |
| 8,569,663 B2 | 10/2013 | Qin et al. | |
| 8,577,211 B2 | 11/2013 | Lucker et al. | |
| 8,789,294 B2 | 7/2014 | Dojan et al. | |
| 8,813,389 B2 | 8/2014 | Gishifu et al. | |
| 9,156,203 B2 | 10/2015 | Lin et al. | |
| 9,254,240 B2 | 2/2016 | Lin et al. | |
| 9,468,582 B2 | 10/2016 | Lin et al. | |
| 9,468,583 B2 | 10/2016 | Lin et al. | |
| 9,642,771 B2 | 5/2017 | Lin et al. | |
| 9,802,359 B2 | 10/2017 | Lin et al. | |
| 9,901,186 B2 | 2/2018 | Lin et al. | |
| 10,161,148 B2 | 12/2018 | Lin et al. | |
| 10,165,868 B2 | 1/2019 | Lin et al. | |
| 10,165,869 B2 | 1/2019 | Lin et al. | |
| 10,815,686 B2 | 10/2020 | Lin et al. | |
| 11,421,434 B2 | 8/2022 | Lin et al. | |
| 12,150,911 B2 | 11/2024 | Huang et al. | |
| 2001/0003336 A1 | 6/2001 | Abbott et al. | |
| 2002/0020014 A1 | 2/2002 | Authier et al. | |
| 2002/0029414 A1 | 3/2002 | Shun Lau | |
| 2002/0053106 A1 | 5/2002 | Turner | |
| 2003/0019024 A1 | 1/2003 | Tompkins | |
| 2003/0070237 A1 | 4/2003 | Reinhard et al. | |
| 2003/0188388 A1 | 10/2003 | Boso et al. | |
| 2003/0233704 A1 | 12/2003 | Castellote | |
| 2004/0040082 A1 | 3/2004 | Fireman et al. | |
| 2004/0040083 A1 | 3/2004 | Bentley | |
| 2004/0077791 A1 | 4/2004 | Issum et al. | |
| 2005/0039346 A1 | 2/2005 | Goodwin et al. | |
| 2005/0050627 A1 | 3/2005 | Ayeni et al. | |
| 2005/0066433 A1 | 3/2005 | Phillips | |
| 2005/0066446 A1 | 3/2005 | Gladney | |
| 2005/0079077 A1 | 4/2005 | Tsai et al. | |
| 2005/0097777 A1 | 5/2005 | Goodwin | |
| 2005/0235406 A1 | 10/2005 | August | |
| 2006/0020332 A1 | 1/2006 | Lashinski et al. | |
| 2006/0025854 A1 | 2/2006 | Lashinski et al. | |
| 2006/0025855 A1 | 2/2006 | Lashinski et al. | |
| 2006/0115248 A1 | 6/2006 | Tran | |
| 2006/0137087 A1 | 6/2006 | Carreau et al. | |
| 2006/0252320 A1 | 11/2006 | Panse | |
| 2006/0253992 A1 | 11/2006 | Chapman | |
| 2006/0260038 A1 | 11/2006 | Lau | |
| 2006/0292945 A1 | 12/2006 | Kuhn et al. | |
| 2007/0040368 A1 | 2/2007 | Manley | |
| 2007/0107133 A1 | 5/2007 | Schwaiger et al. | |
| 2007/0192952 A1 | 8/2007 | Lau | |
| 2007/0200329 A1 | 8/2007 | Ma | |
| 2007/0204406 A1 | 9/2007 | Thisse | |
| 2007/0266494 A1 * | 11/2007 | DeLuca | A61G 7/1028 5/81.1 R |
| 2007/0277324 A1 | 12/2007 | Liu | |
| 2008/0000029 A1 | 1/2008 | Feingold et al. | |
| 2008/0022460 A1 | 1/2008 | Yang | |
| 2008/0141449 A1 | 6/2008 | Ren | |
| 2008/0172783 A1 | 7/2008 | Smith et al. | |
| 2008/0314563 A1 | 12/2008 | Filippi et al. | |
| 2009/0049757 A1 | 2/2009 | Potter | |
| 2009/0089924 A1 | 4/2009 | Jan | |
| 2009/0241252 A1 | 10/2009 | Li | |

(56) References Cited

U.S. PATENT DOCUMENTS

| | | | | |
|---|---|---|---|---|
| 2010/0107333 | A1* | 5/2010 | Ortlieb | A47G 9/0207 428/221 |
| 2010/0325807 | A1 | 12/2010 | Wu | |
| 2011/0010836 | A1 | 1/2011 | Lau | |
| 2011/0047691 | A1 | 3/2011 | Huang et al. | |
| 2011/0094025 | A1 | 4/2011 | West | |
| 2011/0219530 | A1 | 9/2011 | Hollaway | |
| 2011/0280554 | A1 | 11/2011 | Schlipf | |
| 2012/0000017 | A1 | 1/2012 | Xia et al. | |
| 2012/0031265 | A1 | 2/2012 | Song et al. | |
| 2012/0124732 | A1 | 5/2012 | Lau | |
| 2012/0124734 | A1 | 5/2012 | Lau | |
| 2012/0297530 | A1 | 11/2012 | Huang | |
| 2013/0163969 | A1 | 6/2013 | Bohlender et al. | |
| 2013/0186966 | A1 | 7/2013 | Taguchi | |
| 2013/0191985 | A1 | 8/2013 | Qin et al. | |
| 2013/0230670 | A1 | 9/2013 | Lin et al. | |
| 2013/0230671 | A1 | 9/2013 | Lin et al. | |
| 2014/0050466 | A1 | 2/2014 | Giffels et al. | |
| 2014/0086566 | A1 | 3/2014 | Waechter et al. | |
| 2014/0332142 | A1 | 11/2014 | Lin et al. | |
| 2015/0096126 | A1 | 4/2015 | Chai | |
| 2015/0335164 | A1 | 11/2015 | Liu | |
| 2016/0054029 | A1 | 2/2016 | Carlens et al. | |
| 2016/0084523 | A1 | 3/2016 | Liu | |
| 2016/0192784 | A1 | 7/2016 | Chang et al. | |
| 2017/0224125 | A1 | 8/2017 | Lin et al. | |
| 2018/0031271 | A1 | 2/2018 | Huang et al. | |
| 2018/0271779 | A1 | 9/2018 | Begovac et al. | |
| 2019/0085576 | A1 | 3/2019 | Lin et al. | |
| 2020/0352347 | A1 | 11/2020 | Lin et al. | |
| 2020/0407992 | A1 | 12/2020 | Lin et al. | |
| 2021/0239359 | A1 | 8/2021 | Liu | |
| 2022/0325546 | A1 | 10/2022 | Lin et al. | |
| 2023/0218090 | A1 | 7/2023 | Lin et al. | |
| 2023/0271479 | A1 | 8/2023 | Szostek et al. | |
| 2023/0417450 | A1 | 12/2023 | Liu | |
| 2024/0099475 | A1 | 3/2024 | Lin et al. | |
| 2025/0380817 | A1 | 12/2025 | Lin | |
| 2025/0380818 | A1 | 12/2025 | Lin | |
| 2025/0380819 | A1 | 12/2025 | Lin | |

FOREIGN PATENT DOCUMENTS

| | | | | |
|---|---|---|---|---|
| CH | 197243 | A | 4/1938 | |
| CH | 376651 | A | 4/1964 | |
| CH | 438622 | A | 6/1967 | |
| CN | 2064797 | U | 10/1990 | |
| CN | 2074591 | U | 4/1991 | |
| CN | 2287948 | Y | 8/1998 | |
| CN | 2361179 | Y | 2/2000 | |
| CN | 2362037 | Y | 2/2000 | |
| CN | 1280467 | A | 1/2001 | |
| CN | 1124804 | C | 10/2003 | |
| CN | 2606296 | Y | 3/2004 | |
| CN | 1506140 | A | 6/2004 | |
| CN | 2659261 | Y | 12/2004 | |
| CN | 2676755 | Y | 2/2005 | |
| CN | 1596864 | A | 3/2005 | |
| CN | 2706070 | Y | 6/2005 | |
| CN | 2776171 | Y | 5/2006 | |
| CN | 2794505 | Y | 7/2006 | |
| CN | 2812721 | | 9/2006 | |
| CN | 1867280 | A | 11/2006 | |
| CN | 2832129 | Y | 11/2006 | |
| CN | 2908147 | Y | 6/2007 | |
| CN | 2930467 | Y | 8/2007 | |
| CN | 200980613 | Y | 11/2007 | |
| CN | 201032956 | Y | 3/2008 | |
| CN | 201146614 | Y | 11/2008 | |
| CN | 201153763 | Y | 11/2008 | |
| CN | 201169931 | Y | 12/2008 | |
| CN | 201260250 | Y | 6/2009 | |
| CN | 101628698 | A | 1/2010 | |
| CN | 201476268 | U | 5/2010 | |
| CN | 201499325 | U | 6/2010 | |
| CN | 101817233 | A | 9/2010 | |
| CN | 201719136 | U | 1/2011 | |
| CN | 201790383 | U * | 4/2011 | A47C 27/087 |
| CN | 102072557 | A | 5/2011 | |
| CN | 202051615 | U | 11/2011 | |
| CN | 202151339 | U | 2/2012 | |
| CN | 202160295 | U | 3/2012 | |
| CN | 202175165 | U * | 3/2012 | B63B 7/08 |
| CN | 202267222 | U | 6/2012 | |
| CN | 102578859 | A | 7/2012 | |
| CN | 102578860 | A | 7/2012 | |
| CN | 202299515 | U | 7/2012 | |
| CN | 202536548 | U | 11/2012 | |
| CN | 202536827 | U | 11/2012 | |
| CN | 202551366 | U | 11/2012 | |
| CN | 202732280 | U | 2/2013 | |
| CN | 202734250 | U | 2/2013 | |
| CN | 202928069 | U | 5/2013 | |
| CN | 202957997 | U | 5/2013 | |
| CN | 203296407 | U | 11/2013 | |
| CN | 203349481 | U | 12/2013 | |
| CN | 103743088 | A | 4/2014 | |
| CN | 203583938 | U | 5/2014 | |
| CN | 203586522 | U | 5/2014 | |
| CN | 203619151 | U | 6/2014 | |
| CN | 203634453 | U | 6/2014 | |
| CN | 203640334 | U | 6/2014 | |
| CN | 203640339 | U | 6/2014 | |
| CN | 103912147 | A | 7/2014 | |
| CN | 203684742 | U | 7/2014 | |
| CN | 203687327 | U | 7/2014 | |
| CN | 203687330 | U | 7/2014 | |
| CN | 203766439 | U | 8/2014 | |
| CN | 104159343 | A | 11/2014 | |
| CN | 203924786 | U | 11/2014 | |
| CN | 204119542 | U | 1/2015 | |
| CN | 206320919 | U | 7/2017 | |
| DE | 2942523 | A1 | 4/1981 | |
| DE | 4016381 | A1 | 12/1991 | |
| DE | 4300163 | C1 | 3/1994 | |
| DE | 19848169 | A1 | 5/1999 | |
| DE | 19953563 | | 5/2000 | |
| DE | 20317936 | U1 | 2/2004 | |
| DE | 202004000700 | U1 | 6/2004 | |
| DE | 202004002168 | U1 | 3/2005 | |
| DE | 102005024397 | A1 | 11/2006 | |
| DE | 102005039246 | A1 | 2/2007 | |
| DE | 102006053661 | A1 | 6/2007 | |
| DE | 102006053566 | A1 | 2/2008 | |
| DE | 102006053666 | A1 | 5/2008 | |
| EP | 0152536 | A2 | 8/1985 | |
| EP | 0273400 | A1 | 7/1988 | |
| EP | 0373547 | A1 | 6/1990 | |
| EP | 0678263 | A1 | 10/1995 | |
| EP | 0899985 | A1 | 3/1999 | |
| EP | 1138307 | A2 | 10/2001 | |
| EP | 1852141 | A2 | 11/2007 | |
| EP | 1852151 | A1 | 11/2007 | |
| EP | 2022687 | A1 | 2/2009 | |
| EP | 2654514 | A1 | 10/2013 | |
| EP | 2674072 | A1 | 12/2013 | |
| EP | 2674073 | A1 | 12/2013 | |
| EP | 2674074 | A1 | 12/2013 | |
| EP | 2734007 | A1 | 5/2014 | |
| EP | 3001118 | A2 | 3/2016 | |
| EP | 3373547 | A1 | 9/2018 | |
| EP | 3945264 | A1 | 2/2022 | |
| FR | 2979809 | A1 | 3/2013 | |
| GB | 191515424 | A | 3/1916 | |
| GB | 0313023 | A | 6/1929 | |
| GB | 0410502 | A | 5/1934 | |
| GB | 0787421 | A | 12/1957 | |
| GB | 1246211 | A | 9/1971 | |
| GB | 1380153 | A | 1/1975 | |
| JP | 59-136767 | A | 8/1984 | |
| JP | 60-022904 | A | 2/1985 | |
| JP | 60-055904 | A | 4/1985 | |

(56) References Cited

FOREIGN PATENT DOCUMENTS

| | | | |
|---|---|---|---|
| JP | 01-230303 | A | 9/1989 |
| JP | 03-013669 | A | 1/1991 |
| JP | 04-108001 | U | 9/1992 |
| JP | 05-114467 | A | 5/1993 |
| JP | 05-317141 | A | 12/1993 |
| JP | 06-021194 | U | 3/1994 |
| JP | 07-327782 | A | 12/1995 |
| JP | 2006-527017 | A | 11/2006 |
| JP | 2007-506529 | A | 3/2007 |
| KR | 10-2012-0135574 | A | 12/2012 |
| NO | 170565 | B | 7/1992 |
| SU | 410502 | A1 | 1/1974 |
| WO | 98/31045 | A2 | 7/1998 |
| WO | 2004/108047 | A1 | 12/2004 |
| WO | 2005/030005 | A2 | 4/2005 |
| WO | 2008/083494 | A1 | 7/2008 |
| WO | 2009/075928 | A1 | 6/2009 |
| WO | 2013/020464 | A1 | 2/2013 |
| WO | 2013/034864 | A1 | 3/2013 |
| WO | 2013/130117 | A1 | 9/2013 |

OTHER PUBLICATIONS

Exhibit 3 to Declaration of J. DeAmicis in Support of Intex's Opposition to Bestway's Emergency Motion (Ex Parte Application) for Leave to Amend Answer and Invalidity Contentions in U.S. Pat. No. 9,254,240 Infringement Action, dated May 19, 2025, 4 pages.

Exhibit 3 to Declaration of J. Deamicis in Support of Intex's Opposition to Bestway's Motion for Leave to Amend Answer in action for False Advertising, Unfair Competition, and Infringement of U.S. Pat. No. 10,154,869 and U.S. Pat. No. 9,254,240, dated Jul. 31, 2024, 6 pages.

Exhibit 3 to Declaration of R. Dodge in support of Intex's Motion for Leave to Amend Its Infringement Contentions in U.S. Pat. No. 9,254,240 Infringement Action, dated Jun. 8, 2021, 10 pages.

Exhibit 3 to Declaration of S. A. Caloiaro in Support of Bestway's Motion for Leave to Amend Answer and Invalidity Contentions in action for False Advertising, Unfair Competition, and Infringement of U.S. Pat. No. 10,154,869 and U.S. Pat. No. 9,254,240, dated May 25, 2025, 23 pages.

Exhibit 31 to Declaration of R. Dodge in Support of Intex's Responsive Markman Brief in action for False Advertising, Unfair Competition, and Infringement of U.S. Pat. No. 10,154,869 and U.S. Pat. No. 9,254,240, dated May 5, 2023, 7 pages.

Exhibit 32 to Declaration of R. Dodge in Support of (1) Intex's Notice and Motion for Partial Summary Judgment of Infringement and Estoppel; (2) Intex's Notice of Motion to Exclude Bestway's Expert Opinions; and (3) Intex's Notice and Consolidated Motion to Strike in U.S. Pat. No. 9,254,240 Infringement Action, dated Aug. 18, 2023, 3 pages.

Exhibit 4 to Declaration of J. Deamicis in Support of Intex's Opposition to Bestway's Motion for Leave to Amend Answer in action for False Advertising, Unfair Competition, and Infringement of U.S. Pat. No. 10,154,869 and U.S. Pat. No. 9,254,240, dated Jul. 31, 2024, 6 pages.

Exhibit 4 to Declaration of J. S. Artz in support of Bestway's Supplemental Claim Construction Brief in U.S. Pat. No. 9,254,240 Infringement Action, dated Sep. 8, 2020, 53 pages.

Exhibit 4 to Declaration of R. Dodge in support of Intex's Motion for Leave to Amend Its Infringement Contentions in U.S. Pat. No. 9,254,240 Infringement Action, dated Jun. 8, 2021, 78 pages.

Exhibit 4 to Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 138 pages.

Exhibit 4 to Declaration of S. A. Caloiaro in Support of Bestway's Motion for Leave to Amend Answer and Invalidity Contentions in action for False Advertising, Unfair Competition, and Infringement of U.S. Pat. No. 10,154,869 and U.S. Pat. No. 9,254,240, dated May 25, 2025, 26 pages.

Exhibit 4 to Declaration of S. Caloiaro in Support of Bestway's Opposition to Intex's Motion for Partial Summary Judgment of Infringement and Estoppel in U.S. Pat. No. 9,254,240 Infringement Action, dated Sep. 11, 2023, 16 pages.

Exhibit 4 to Intex's First Amended Complaint for False Advertising, Unfair Competition, and Infringement of U.S. Pat. No. 9,901,186 and U.S. Pat. No. 10,165,869, dated Nov. 26, 2019, 22 pages.

Exhibit 5 to Declaration of J. S. Artz in support of Bestway's Supplemental Claim Construction Brief in U.S. Pat. No. 9,254,240 Infringement Action, dated Sep. 8, 2020, 30 pages.

Exhibit 5 to Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 7 pages.

Exhibit 5 to Declaration of R. Dodge in support of Intex's Supplemental Opening Markman Brief in U.S. Pat. No. 9,254,240 Infringement Action, dated Sep. 8, 2020, 3 pages.

Exhibit 5 to Intex's First Amended Complaint for False Advertising, Unfair Competition, and Infringement of U.S. Pat. No. 9,901,186 and U.S. Pat. No. 10,165,869, dated Nov. 26, 2019, 7 pages.

Exhibit 6 to Declaration of J. S. Artz in support of Bestway's Supplemental Claim Construction Brief in U.S. Pat. No. 9,254,240 Infringement Action, dated Sep. 8, 2020, 2 pages.

Exhibit 8 to Declaration of R. Dodge in support of Intex's Supplemental Opening Markman Brief in U.S. Pat. No. 9,254,240 Infringement Action, dated Sep. 8, 2020, 10 pages.

Exhibit 8 to Declaration of S. A. Caloiaro in Support of Bestway's Opening Markman Brief in action for False Advertising, Unfair Competition, and Infringement of U.S. Pat. No. 10,154,869 and U.S. Pat. No. 9,254,240, dated Apr. 14, 2023, 4 pages.

Exhibit 8 to Intex's Second Amended Complaint for False Advertising, Unfair Competition, and Infringement of U.S. Pat. No. 10,154,869 and U.S. Pat. No. 9,254,240, dated Sep. 30, 2022, 3 pages.

Exhibit 9 to Declaration of R. Dodge in support of Intex's Motion for Leave to Amend Its Infringement Contentions in U.S. Pat. No. 9,254,240 Infringement Action, dated Jun. 8, 2021, 31 pages.

Exhibit 9 to Declaration of S. A. Caloiaro in Support of Bestway's Opening Markman Brief in action for False Advertising, Unfair Competition, and Infringement of U.S. Pat. No. 10,154,869 and U.S. Pat. No. 9,254,240, dated Apr. 14, 2023, 9 pages.

Exhibit A to Bestway's Post-Trial Closing Brief regarding Estoppel Evidentiary Hearing in U.S. Pat. No. 9,254,240 Infringement Action, dated Aug. 25, 2025, 29 pages.

Exhibit A to Declaration of O. F. Ennis in Support of Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 17, 2024; 21 pages.

Exhibit A to Joint Notice of Lodging Joint Claim Construction Chart and File Histories in action for False Advertising, Unfair Competition, and Infringement of U.S. Pat. No. 10,154,869 and U.S. Pat. No. 9,254,240, dated May 5, 2023, 7 pages.

Exhibit A to Notice of Lodging Joint Claim Construction Chart in U.S. Pat. No. 9,254,240 Infringement Action, dated Feb. 13, 2017, 3 pages.

Exhibit A to Notice of Lodging Joint Claim Construction Chart in U.S. Pat. No. 9,254,240 Infringement Action, dated Oct. 1, 2020, 3 pages.

Exhibit B to Declaration of O. F. Ennis in Support of Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 17, 2024, 23 pages.

Exhibit B to Declaration of R. Dodge in Support of Intex's Opposition to Bestway's Motion for Leave to Amend Its Invalidity Contentions in U.S. Pat. No. 9,254,240 Infringement Action, dated May 27, 2022, 64 pages.

Exhibit C to Declaration of S. Caloiaro in Support of Bestway's Motion for Leave to Amend Its Invalidity Contentions in U.S. Pat. No. 9,254,240 Infringement Action, dated May 6, 2022, 10 pages.

Exhibit D to Declaration of O. F. Ennis in Support of Bestway's Motion for Leave to Amend Answer to Include Unclean Hands

(56) References Cited

OTHER PUBLICATIONS

Affirmative Defense in action for False Advertising, Unfair Competition, and Infringement of U.S. Pat. No. 10,154,869 and U.S. Pat. No. 9,254,240, dated Jul. 17, 2024, 14 pages.
Exhibit D to Declaration of R. Dodge in Support of Intex's Opposition to Bestway's Motion for Leave to Amend Its Invalidity Contentions in U.S. Pat. No. 9,254,240 Infringement Action, dated May 27, 2022, 2 pages.
Exhibit D to Declaration of S. Caloiaro in Support of Bestway's Motion for Leave to Amend Its Invalidity Contentions in U.S. Pat. No. 9,254,240 Infringement Action, dated May 6, 2022, 9 pages.
Exhibit E to Declaration of R. Dodge in Support of Intex's Opposition to Bestway's Motion for Leave to Amend Its Invalidity Contentions in U.S. Pat. No. 9,254,240 Infringement Action, dated May 27, 2022, 53 pages.
Exhibit E to Declaration of S. Caloiaro in Support of Bestway's Motion for Leave to Amend Its Invalidity Contentions in U.S. Pat. No. 9,254,240 Infringement Action, dated May 6, 2022, 19 pages.
Exhibit G to Declaration of O. F. Ennis in Support of Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 17, 2024, 3 pages.
Exhibit G to Declaration of R. Dodge in Support of Intex's Opposition to Bestway's Motion for Leave to Amend Its Invalidity Contentions in U.S. Pat. No. 9,254,240 Infringement Action, dated May 27, 2022, 10 pages.
Exhibit H to Declaration of O. F. Ennis in Support of Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 17, 2024, 3 pages.
Exhibit H to Declaration of R. Dodge in Support of Intex's Opposition to Bestway's Motion for Leave to Amend Its Invalidity Contentions in U.S. Pat. No. 9,254,240 Infringement Action, dated May 27, 2022, 78 pages.
Exhibit I to Declaration of R. Dodge in Support of Intex's Opposition to Bestway's Motion for Leave to Amend Its Invalidity Contentions in U.S. Pat. No. 9,254,240 Infringement Action, dated May 27, 2022, 81 pages.
Exhibit J to Declaration of S. Caloiaro in Support of Bestway's Motion for Summary Judgment (Non-Infringement and No Willful Infringement) and Partial Summary Judgment (Simex Estoppel) in U.S. Pat. No. 9,254,240 Infringement Action, dated Aug. 18, 2023, 2 pages.
Exhibit K to Declaration of O. F. Ennis in Support of Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 17, 2024, 18 pages.
Exhibit L to Declaration of O. F. Ennis in Support of Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 17, 2024, 19 pages.
Exhibit M to Declaration of O. F. Ennis in Support of Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 17, 2024, 21 pages.
Exhibit N to Declaration of O. F. Ennis in Support of Bestway's Reply in Support of Its Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Aug. 7, 2024, 7 pages.
Exhibit O to Declaration of O. F. Ennis in Support of Bestway's Reply in Support of Its Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Aug. 7, 2024, 9 pages.
Exhibit P to Declaration of O. F. Ennis in Support of Bestway's Reply in Support of Its Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Aug. 7, 2024, 6 pages.
File History of U.S. Appl. No. 10/184,835, Exhibit 2018, in Inter Partes Review U.S. Pat. No. 9,254,240, dated Nov. 30, 2016; 158 pages.
"192 PO R1 1304", Apr. 18, 2013 (Apr. 18, 2013), pp. 1-17, XP055225701, Retrieved from the Internet: URL:http://www.poolcenter.com/medias/pdf/MP 9902/PureSpa_Manual.pdf.
"2009 Above Ground Pools", Appendix A of Fumagalli Declaration.
"2009 Summer Inflatables", Appendix B of Fumagalli Declaration.
"2010 Bestway Above Ground Pools", Bestway catalog; 51 pages.
"2010 Leisure Products", ORPC catalog; 60 pages.
"2010-2011 Spa Pool Collection", Five Stars catalog; 4 pages.
"2011 Bestway Above Ground Pools", Bestway catalog; 53 pages.
"2012 Bestway Above Ground Pool Collection", Bestway catalog; 30 pages.
"2013 Above Ground Pool Series", Jilong catalog; 29 pages.
"Connection technology", Wikipedia, last updated Jan. 24, 2012, 3 pages.
"Intex 2001 Above Ground Pools", Intex Recreation Corp. catalog; 12 pages.
"Intex 2005 Above Ground Pools", Intex Recreation Corp. catalog; 16 pages.
"Intex 2006 Above Ground Pools", Intex Recreation Corp. catalog; 20 pages.
"Intex 2007 Above Ground Pools", Intex Recreation Corp. catalog; 36 pages.
"Intex 2008 Above Ground Pools", Intex Recreation Corp. catalog; 42 pages.
"Intex 2009 Above Ground Pools", Intex Recreation Corp. catalog; 32 pages.
"Intex 2010 Above Ground Pools", Intex Recreation Corp. catalog; 16 pages.
"Intex 2011 Above Ground Pools", Intex Recreation Corp. catalog; 40 pages.
"Intex 2012 Above Ground Pools", Intex Recreation Corp. catalog; 44 pages.
"Intex 2013 Above Ground Pools", Intex Recreation Corp. catalog; 52 pages.
"MSpa 2011 My Home My Spa", ORPC catalog; 6 pages.
"MSpa Bubble 2013", ORPC catalog insert; 6 pages.
"MSpa vs. Intex Pure Spa", ORPC catalog, European Version—2013; 28 pages.
"Pool 2003", Sevylor catalog; 8 pages.
"Spas that free your mind", Avenli 2013 catalog; 2 pages.
"Summer 2011 Inflatable Toys Section", Jilong catalog; 82 pages.
"Opposition response—Reply to notice of opposition" for EP App. 3225764, Nov. 3, 2021, pp. 23.
2012 Bestway Above Ground Pool Collection catalog, 6 pages.
2012 Bestway Summer Collection catalog 2011, 7 pages.
2013 Bestway Above Ground Pools Collection; 34 pages.
27 Report of Rule 26 Planning Meeting.
Abraham CV, Bestway Ex. 1003, *Bestway* v. *Intex* IPR2020-01416, pp. 1-48.
Affidavit by Jiang Xu.
Affidavit by Mr. Jiang Xu; 3 pages.
Affidavit of Chen Lirong, dated Apr. 17, 2023, 9 pages.
Affidavit of Huayang Jian, dated Dec. 21, 2021, 1 page.
Affidavit of Huayang Jiang, submitted in Opposition against European Patent No. 3,572,600, dated Sep. 20, 2023, 6 pages.
Affidavit of Huayang Jiang; 91 pages.
Affidavit of Jenny Zhang, dated Sep. 26, 2022, 3 pages.
Affidavit of Jenny Zhang, in infringement action of EP 3,077,606, dated Sep. 26, 2022; 3 pages.
Affidavit of Matthew Whalen, dated Sep. 26, 2022, 6 pages.
Affidavit of Pan Xiaohua, dated Apr. 17, 2023, 9 pages.

(56) References Cited

OTHER PUBLICATIONS

Affidavit of Pan Xiaohua, dated Jan. 25, 2024, 2 pages.
Affidavit of Simone Zesi, dated Dec. 22, 2021, 4 pages.
Affidavit of Yolanda Morales, dated Sep. 26, 2022, 4 pages.
Affidavits of Chen Lirong and Pan Xiaohua, dated Dec. 18, 2023, 5 pages.
Affidavits of Pan Xiaohua and Chen Lirong, dated Oct. 29, 2024, 2 pages.
Amended Order, CV 19-08596 TJH (ASx), Jul. 2, 2020, pp. 1-2.
Amendments filed in EP 13001947.4, dated Jun. 23, 2016, 14 pages.
Appeals from the United States Patent and Trademark Office, Patent Trial and Appeal Board in No. PGR2017-00003, Judgment, 2019-1373, 2019-1392, Jan. 9, 2020, pp. 1-2.
Petitioner's submission in response to qualified notice of the Federal Patent Court of Dec. 9, 2022 in invalidity proceeding of EP 2,674,073, dated Jan. 13, 2023, 44 pages (including English language translation of German language document).
Petitioner's submission in response to qualified notice of the Federal Patent Court of Dec. 9, 2022, in invalidity proceeding of EP 2,674,072 B1, dated Jan. 13, 2023, 31 pages.
Petitioner's submission in response to qualified notice of the Federal Patent Court of Oct. 12, 2023 in invalidity proceeding of EP 2,674,070 B1, dated Nov. 17, 2023, 32 pages.
Petitioner's submission in response to qualified notice of the Federal Patent Court of Oct. 12, 2023 in invalidity proceeding of EP 2,674,070, dated Nov. 17, 2023, 64 pages (including English language translation of German language document).
Petitioner-Appellee's reply to Respondent-Appellant's grounds of appeal in appeal against decision of the Federal Patent Court in invalidity proceeding against EP 2,674,073 B1, dated Aug. 2, 2024, 86 pages.
PGR2017-00003—Decision Instituteing Post-grant Review of U.S. Pat. No. 9,254,240, issued May 11, 2017, 22 pages.
PGR2017-00003—Decision Instituting Post-Grant Review of U.S. Pat. No. 9,254,240, issued May 11, 2017, 22 pages.
Plaintiff Intex Recreation Corp.'s Preliminary Infringement Contentions, Case No. 2:19-CV-08596-AB-AS, pp. 1-98.
Plaintiff's complaint for infringement of EP 3,077,606, dated Feb. 14, 2022, 84 pages (including English language translation of German language document).
Plaintiff's response to Defendant's reply of Nov. 2, 2022 in infringement action of EP 3,077,606, dated Dec. 12, 2022, 56 pages (including English language translation of German language document).
Plaintiff's response to Defendant's statement of defense in infringement action of EP 3,077,606, dated Aug. 24, 2022, 62 pages (including English language translation of German language document).
Plaintiffs complaint for infringement of EP 3,077,606, dated Feb. 14, 2022, 42 pages.
Plaintiffs response to Defendant's reply of Nov. 2, 2022 in infringement action of EP 3,077,606, dated Dec. 12, 2022, 28 pages.
Plaintiffs response to Defendant's statement of defense in infringement action of EP 3,077,606, dated Aug. 24, 2022, 31 pages.
Plaintiffs' List of Terms for Construction, Lead Case No. LA 2:16-cv-03300-JAK (Ex), Dec. 8, 2016, pp. 1-4.
Plaintiffs' Preliminary Infringement Contentions, Case No. 2:16-cv-03300-JAK-E, pp. 1-598.
Polypool Summer 2011 catalog, 48 pages.
Polypool, 2011 catalog, 2010 publication year; 48 pages.
Pool Spa USA, Biotech Home Spa Duo Website, available at http://www.poolspausa.com/spas/Biotech.sub.--portablespa.htm, Copyright 2006, 2 pages.
Post-Grant Review Petition for U.S. Pat. No. 9,254,240.
Preliminary Opinion of the Federal Patent Court in invalidity proceeding of EP 3,077,606 B1, dated Jun. 3, 2024, 13 pages.
Preliminary Opinion of the Opposition Division and Summons to attend Oral Proceedings in Opposition against European Patent No. 3,572,600, dated Mar. 31, 2025, 15 pages.
Preliminary opinion of the Opposition Division in opposition against EP 2,674,074 B1, dated Aug. 20, 2021, 14 pages.
Preliminary opinion of the Opposition Division in opposition against EP 3,077,606 B1, dated Oct. 11, 2020, 9 pages.
Proof of sale, dated Jan. 19, 2009, and proof of delivery, dated Apr. 5, 2009, 26 pages.
Proof of sale, Oct. 26, 2009, and proof of delivery, dated Feb. 7, 2020, 23 pages.
Provisional opinion of the Opposition Division in opposition of EP 3,077,606, dated Nov. 10, 2020, 9 pages.
Qualified notice of the Federal Patent Court in invalidity proceeding of EP 2,674,070 B1, dated Oct. 12, 2023, 33 pages.
Qualified notice of the Federal Patent Court in invalidity proceeding of EP 2,674,070, dated Oct. 12, 2023, 66 pages (including English language translation of German language document).
Qualified notice of the Federal Patent Court in invalidity proceeding of EP 2,674,072 B1, dated Dec. 9, 2022, 34 pages.
Qualified notice of the Federal Patent Court in invalidity proceeding of EP 2,674,072 B1, dated Dec. 9, 2022, 68 pages (including English language translation of German language document).
Qualified notice of the Federal Patent Court in invalidity proceeding of EP 2,674,073 B1, dated Dec. 9, 2022, 32 pages.
Qualified notice of the Federal Patent Court in invalidity proceeding of EP 2,674,073 B1, dated Dec. 9, 2022, 64 pages (including English language translation of German language document).
Qualified notice of the Federal Patent Court in invalidity proceeding of EP 3,077,606 B1, dated Sep. 9, 2022, 4 pages.
Qualified notice of the Federal Patent Court in invalidity proceeding of EP 3,077,606, dated Sep. 16, 2022, 8 pages (including English language translation of German language document).
Record of Oral Hearing Held: Nov. 4, 2021, IPR2020-01405 (U.S. Pat. No. 9,901,186 B2), IPR2020-01416 (U.S. Pat. No. 10,165,869 B2), Dec. 13, 2021, pp. 1-65.
Remote Deposition of Alex J. Wang, Case IPR2020-01405/IPR2020-01416, U.S. Pat. No. 9,901,186/U.S. Pat. No. 10,165,869, Oct. 5, 2021, pp. 1-34.
Remote Deposition of, John P. Abraham, Ph.D., St. Paul, Minnesota, Case No. IPR2020-01405, U.S. Pat. No. 9,901,186, Sep. 30, 2021, pp. 1-208.
Reply Brief of Appellee and Cross-Appellant Intext Marketing Ltd., Nos. 2019-1373, -1392, Jul. 22, 2019, pp. 1-31.
Reply Declaration of John P. Abraham, Ph.D, Case IPR2020-01416, U.S. Pat. No. 10,165,869, Sep. 3, 2021, pp. 1-27.
Reply of Patent Proprietor to Notice of Opposition against EP 3,077,606 B1, dated Jun. 2, 2020, 47 pages.
Reply of Patent Proprietor to the Notice of Opposition against EP 3,674,074 B1, dated Apr. 6, 2021, 20 pages.
Request for Participation in the Global/IP5 Patent Prosecution Highway (PPH) Pilot Program in the USPTO, May 17, 2017, pp. 1-856.
Respondent's reasons for objection in invalidity proceeding of EP 2,674,070 B1, dated Aug. 30, 2022, 54 pages.
Respondent's reasons for objection in invalidity proceeding of EP 2,674,070, dated Aug. 30, 2022, 107 pages (including English language translation of German language document).
Respondent's reasons for objection in invalidity proceeding of EP 2,674,072 B1, dated Oct. 22, 2021, 119 pages (including English language translation of German language document).
Respondent's reasons for objection in invalidity proceeding of EP 2,674,072 B1, dated Oct. 22, 2021, 60 pages.
Respondent's reasons for objection in invalidity proceeding of EP 2,674,073 B1, dated Oct. 22, 2021, 133 pages (including English language translation of German language document).
Respondent's reasons for objection in invalidity proceeding of EP 2,674,073 B1, dated Oct. 22, 2021, 67 pages.
Respondent's reasons for objection in invalidity proceeding of EP 3,077,606 B1, dated Aug. 25, 2022, 113 pages.
Appeals from the United States Patent and Trademark Office, Patent Trial and Appeal Board in No. PGR2017-00003, Mandate, 2019-1373, 2019-1392, Feb. 18, 2020, pp. 1-1.

(56) References Cited

OTHER PUBLICATIONS

Appellant's grounds of appeal of decision of District Court of Mannheim in infringement action of EP 3,077,606, dated Jun. 7, 2023, 74 pages (including English language translation of German language document).
Appellant's Response to Appellee's Response to Appeal of Sep. 11, 2023, in infringement action of EP 3,077,606, dated May 15, 2024; 34 pages.
Appellant's submission in appeal in infringement action of EP 3,077,606, dated May 15, 2024, 34 pages.
Appellee's response to Appellant's grounds of appeal in infringement action of EP 3,077,606, dated Sep. 11, 2023, 91 pages (including English language translation of German language document).
Application Elements, USPTO, Dec. 10, 2014, pp. 1-333.
Assessment of"Comfort Quest" airbed, dated Apr. 18, 2023, 100 pages.
Bestway—Tritech Airbed 22 Inch with Built-in AC Pump, Queen, Walmart, pp. 1-5.
Bestway 2003 catalog, 62 pages.
Bestway 2008 and 2009 catalog, 14 pages.
Bestway 2010 Above Ground Pools catalog, 6 pages.
Bestway 2011 Summer Collection catalog, 90 pages.
Bestway 2012 catalog, 2011 publication year, 30 pages.
Bestway Above Ground Pools 2011 catalog, 28 pages.
Bestway Ex. 1024 *Bestway* v. *Intex* IPR2020-01416, ApplicationData Sheet, Prosecution History U.S. Appl. No. 15/581,638, pp. 1-270.
Bestway Ex. 1025 *Bestway* v. *Intex* IPR2020-01416, ApplicationData Sheet, Prosecution history of U.S. Appl. No. 14/444,453, pp. 1-617.
Bestway Ex. 1025 *Bestway* v. *Intex* IPR2020-01416, State Intellectual Property Office of the People's Republic of China, Oct. 15, 2015, pp. 1-620.
Bestway Ex. 1026 *Bestway* v. *Intex* IPR2020-01416, CN 200620039703.6, pp. 1-650.
Bestway Germany GmbH u.a., "Above Ground Pools 2011" catalog; 28 pages.
Bestway Germany GmbH u.a., 2003 catalog, 2002 publication year.
Bestway Germany GmbH u.a., catalog, "2011 Bestway Summer Collection", 2010 publication year; 90 pages.
Bestway Inflatables & Materials Corp, Owner's Manual Lay-Z-Spa #54075FR, #54090FR, 86 pages.
Bestway Inflatables & Materials Corp., "2010 Above Ground Pools", Catalog, copyright 2009; 6 pages.
Bestway Inflatables & Materials Corp., "2012 Bestway Above Ground Pool Collection", Catalog, copyright 2011; 6 pages.
Bestway Inflatables & Materials Corp., "2013 Bestway Above Ground Pools Collection", Catalog, copyright 2012; 6 pages.
Bestway Inflatables & Materials Corp., "Owner's Manuel Lay-Z-Spa"; 8 pages.
Bestway Lay-Z-Spa Owner's Manual, 8 pages.
Bestway TriTech 22" Inflatable Blow Up Air Mattress w/ Built in AC Pump, Queen, Target, pp. 1-3.
*Bestway* v. *Intex* IPR202001405; IPR202001406 Authorization for a Motion to Strike, Oct. 13, 2021, pp. 1-2.
Bestway's Preliminary Invalidity Contentions for U.S. Pat. No. 8,562,773, Exhibits W-GG, dated Nov. 30, 2016, 84 pages.
Bestway's Preliminary Invalidity Contentions for U.S. Pat. No. 9,156,203, Exhibits L-V, dated Nov. 30, 2016, 497 Pages.
Bestway's Answer to First Amended Complaint for False Advertising, Unfair Competition, and Patent Infringement and Counterclaim, Jury Trial Demanded, Case No. 2:19-CV-08596-AB-AS, Dec. 24, 2019, pp. 1-18.
Brief of Appellant, Appeal Board in No. PGR2017-00003, Nos. 2019-1373, -1392, Mar. 25, 2019, pp. 1-169.
Brief of Appellee and Cross-Appellant Intex Marketing Ltd., Nos. 2019-1373, -1392, May 20, 2019, pp. 1-196.
Brochure "Bubble 2012", Mspa, 8 pages.
Catalogue: Bestway's 2012.
Certificate of Correction, U.S. Pat. No. 8,562,773 B2, Oct. 22, 2013, pp. 1-235.
Certification and Request for Prioritized Examination Under 37 CFR 1.102(e), Bestway Ex. 1004, *Bestway* v. *Intex* IPR2020-01416, Feb. 27, 2018, pp. 1-268.
Certification and Request for Prioritized Examination Under 37 CFR 1.102(e), Bestway Ex. 1026 *Bestway* v. *Intex* IPR2020-01416, Dec. 26, 2012, pp. 1-753.
Chapter 20 from Roark's Formulas for Stress and Strain, 8th Edition, McGraw Hill 2012.
Claim Comparison, G&P0-3—Claim Comparison.pdf.
Comfort Line Products, Inc., SPA2GO / EzSpa / Gr8 Spa Manual, dated Feb. 25, 2005, 30 pages.
Comfort Rest (Trade Mark), "I-Beam and Pillar Construction", Super Tough bed catalog, 2006, 1 page.
Comfort-Rest™ I-Beam and Pillar, published 2006, 1 page.
Commission Investigative Staff's Response to Motion to Terminate Investigation Based on Entry of Consent Order, and for a Stay of the Procedural Schedule, Mot. Docket No. 1009-001, Investigation No. 337-TA-1009, Jul. 14, 2016, pp. 1-8.
Communication dated Dec. 23, 2015 in corresponding European Application No. 1300946.6.
Communication of the Board of Appeal in appeal against decision of the Opposition Division rejecting the opposition filed against EP 3,077606 B1, dated Dec. 12, 2022, 26 pages.
Communication under Article 94(3) in EP 13001947.4, dated Feb. 3, 2015, 4 pages.
Communication under Article 94(3) in EP 13001947.4, dated Jan. 20, 2016, 3 pages.
Communication under Rule 71(3) in EP 13001947.4, dated Jan. 30, 2017, 122 pages.
Patent Proprietor's Statement of Grounds of Appeal Against Decision of Opposition Division Revoking EP 2,674,074, dated May 2, 2023; 32 pages.
Patent Proprietor's Statement of Grounds of Appeal, dated May 2, 2023, 32 pages.
Patent Proprietor's submission in appeal against decision of Opposition Division rejecting opposition of EP 3,077,606 B1, dated Nov. 30, 2022, 15 pages.
Patent Proprietor's submission in appeal against decision of Opposition Division rejecting opposition of EP 3,077,606 B1, dated Nov. 30, 2022, 20 pages.
Patent Proprietor's submission in appeal against the decision of the Opposition Division rejecting the opposition against EP 3,077,606 B1, dated Apr. 25, 2023, 10 pages.
PCT Application No. PCT/US2012/042079, filed Jun. 12, 2012.
Petition for Inter Partes review of U.S. Pat. No. 10,165,869, dated Aug. 4, 2020, 85 pages.
Petition for Inter Partes Review of U.S. Pat. No. 9,901,186, Case IPR2020-01405, U.S. Pat. No. 9,901,186, Aug. 1, 2020, pp. 1-75.
Petitioner Bestway (USA) Inc's Motion to Strike, Case IPR2020-01416, U.S. Pat. No. 10,165,869, Oct. 21, 2021, pp. 1-8.
Petitioner Bestway (USA) Inc's Opposition to Patent Owner'smotion to Strike, Case IPR2020-01416, U.S. Pat. No. 10,165,869, Oct. 28, 2021, pp. 1-7.
Petitioner Bestway (USA) Inc's Reply to Patent Owner's Preliminary Response, Case IPR2020-01416, U.S. Pat. No. 10,165,869, Dec. 31, 2020, pp. 1-14.
Petitioner Bestway (USA) Inc's Reply to Patent Owner's Response, Case IPR2020-01416, U.S. Pat. No. 10,165,869, Sep. 3, 2021, pp. 1-32.
Petitioner's complaint for invalidation of EP 2,674,070 B1, dated May 6, 2022, 53 pages.
Petitioner's complaint for invalidation of EP 2,674,070, dated May 6, 2022, 98 pages (including English language translation of German language document).
Petitioner's complaint for invalidation of EP 2,674,072 B1, dated Dec. 16, 2020, 153 pages (including English language translation of German language document).
Petitioner's complaint for invalidation of EP 2,674,072 B1, dated Dec. 16, 2020, 77 pages.
Petitioner's complaint for invalidation of EP 2,674,073 B1, dated Dec. 15, 2020, 154 pages (including English language translation of German language document).

(56) References Cited

OTHER PUBLICATIONS

Petitioner's complaint for invalidation of EP 2,674,073 B1, dated Dec. 15, 2020, 78 pages.
Petitioner's complaint for invalidation of EP 3,077,606 B1, dated May 2, 2022, 53 pages.
Petitioner's complaint for invalidation of EP 3,077,606, dated May 2, 2022, 104 pages (including English language translation of German language document).
Petitioner's further submission in invalidity proceeding of EP 2,674,073 B1, dated May 26, 2023, 114 pages (including English language translation of German language document).
Petitioner's further submission in invalidity proceeding of EP 2,674,073 B1, dated May 26, 2023, 57 pages.
Petitioner's response to respondent's reasons for objection in invalidity proceeding of EP 2,674,070 B1, dated Nov. 14, 2022, 72 pages.
Petitioner's response to Respondent's reasons for objection in invalidity proceeding of EP 2,674,070, dated Nov. 14, 2022, 137 pages (including English language translation of German language document).
Petitioner's response to respondent's reasons for objection in invalidity proceeding of EP 2,674,072 B1, dated Dec. 28, 2021, 33 pages.
Petitioner's response to Respondent's reasons for objection in invalidity proceeding of EP 2,674,072 B1, dated Dec. 28, 2021, 63 pages (including English language translation of German language document).
Petitioner's response to respondent's reasons for objection in invalidity proceeding of EP 2,674,073 B1, dated Dec. 28, 2021, 28 pages.
Petitioner's response to Respondent's reasons for objection in invalidity proceeding of EP 3,077,606 B1, dated Jun. 5, 2023, 60 pages.
Petitioner's response to Respondent's reasons for objection in invalidity proceeding of EP 3,077,606, dated Jun. 5, 2023, 120 pages (including English language translation of German language document).
Petitioner's response to Respondent's reasons for objection of Oct. 22, 2021 in invalidity proceeding of EP 2,674,073 B1, dated Dec. 28, 2021, 53 pages (including English language translation of German language document).
Petitioner's response to Respondent's reply of May 24, 2022 in invalidity proceeding of EP 2,674,072 B1, dated Dec. 5, 2022, 54 pages (including English language translation of German language document).
Petitioner's response to respondent's reply of May 24, 2022 in invalidity proceeding of EP 2,674,073 B1, dated Dec. 5, 2022, 27 pages.
Petitioner's response to Respondent's reply of May 24, 2022 in invalidity proceeding of EP 2,674,073 B1, dated Dec. 5, 2022, 51 pages (including English language translation of German language document).
Petitioner's response to respondent's reply of May 24, 2022, in invalidity proceeding of EP 2,674,072 B1, dated Dec. 5, 2022, 28 pages.
Petitioner's response to Respondent's submission in response to the Preliminary Opinion of the Federal Patent Court in invalidity proceeding of EP 3,077,606 B1, dated Nov. 14, 2024, 92 pages.
Petitioner's response to Respondent's submission of Jan. 10, 2025, in invalidity proceeding of EP 3,077,606 B1, dated Jan. 17, 2025, 5 pages.
Petitioner's response to Respondent's submission of Jan. 13, 2023 in invalidity proceeding of EP 2,674,072 B1, dated Feb. 10, 2023, 34 pages (including English language translation of German language document).
Petitioner's response to respondent's submission of Jan. 13, 2023 in invalidity proceeding of EP 2,674,073 B1, dated Feb. 10, 2023, 16 pages.
Petitioner's response to Respondent's submission of Jan. 13, 2023 in invalidity proceeding of EP 2,674,073 B1, dated Feb. 10, 2023, 32 pages (including English language translation of German language document).
Petitioner's response to respondent's submission of Jan. 13, 2023, in invalidity proceeding of EP 2,674,072 B1, dated Feb. 10, 2023, 17 pages.
Petitioner's response to Respondent's submission of Jul. 9, 2025 in invalidity proceeding of EP 3,077,606 B1, dated Aug. 4, 2025, 3 pages.
Petitioner's response to respondent's submission of Nov. 17, 2023 in invalidity proceeding of EP 2,674,070 B1, dated Dec. 21, 2023, 19 pages.
Petitioner's response to Respondent's submission of Nov. 17, 2023 in invalidity proceeding of EP 2,674,070, dated Dec. 21, 2023, 38 pages (including English language translation of German language document).
Petitioner's response to the Preliminary Opinion of the Federal Patent Court in invalidity proceeding of EP 3,077,606 B1, dated Aug. 26, 2024, 7 pages.
Petitioner's response to the qualified notice of the Federal Patent Court in invalidity proceeding of EP 3,077,606 B1, dated Sep. 29, 2022, 37 pages.
Petitioner's response to the qualified notice of the Federal Patent Court in invalidity proceeding of EP 3,077,606, dated Sep. 29, 2022, 71 pages (including English language translation of German language document).
Petitioner's submission accompanying affidavits of Pan Xiaohua and Chen Lirong in invalidity proceeding of EP 3,077,606 B1, dated Oct. 31, 2024, 3 pages.
Petitioner's submission in invalidity proceeding of EP 3,077,606 B1, dated Mar. 26, 2024, 29 pages.
Petitioner's submission in response to qualified notice of the Federal Patent Court of Dec. 9, 2022 in invalidity proceeding of EP 2,674,072 B1, dated Jan. 13, 2023, 62 pages (including English language translation of German language document).
Petitioner's submission in response to qualified notice of the Federal Patent Court of Dec. 9, 2022 in invalidity proceeding of EP 2,674,073 B1, dated Jan. 13, 2023, 22 pages.
Respondent's reasons for objection in invalidity proceeding of EP 3,077,606, dated Aug. 25, 2022, 226 pages (including English language translation of German language document).
Respondent's response to Appellant's grounds of appeal in infringement action of EP 3,077,606, dated Sep. 11, 2023, 46 pages.
Respondent's response to Petitioner's further submission of May 26, 2023 in invalidity proceeding of EP 2,674,073 B1, dated Jun. 28, 2023, 144 pages (including English language translation of German language document).
Respondent's response to petitioner's further submission of May 26, 2023, in invalidity proceeding of EP 2,674,073 B1, dated Jun. 28, 2023, 72 pages.
Respondent's response to Petitioner's reply of Dec. 28, 2021 in invalidity proceeding of EP 2,674,072 B1, dated May 24, 2022, 51 pages (including English language translation of German language document).
Respondent's response to Petitioner's reply of Dec. 28, 2021 in invalidity proceeding of EP 2,674,073 B1, dated May 24, 2022, 62 pages (including English language translation of German language document).
Respondent's response to petitioner's reply of Dec. 28, 2021, in invalidity proceeding of EP 2,674,072 B1, dated May 24, 2022, 26 pages.
Respondent's response to petitioner's reply of Dec. 28, 2021, in invalidity proceeding of EP 2,674,073 B1, dated May 24, 2022, 32 pages.
Respondent's response to Petitioner's submission of Jan. 13, 2023 in invalidity proceeding of EP 2,674,072 B1, dated Feb. 10, 2023, 64 pages (including English language translation of German language document).
Respondent's response to Petitioner's submission of Jan. 13, 2023 in invalidity proceeding of EP 2,674,073 B1, dated Feb. 10, 2023, 55 pages (including English language translation of German language document).

(56) References Cited

OTHER PUBLICATIONS

Respondent's response to petitioner's submission of Jan. 13, 2023, in invalidity proceeding of EP 2,674,072 B1, dated Feb. 10, 2023, 32 pages.
Respondent's response to petitioner's submission of Jan. 13, 2023, in invalidity proceeding of EP 2,674,073 B1, dated Feb. 10, 2023, 28 pages.
Respondent's response to petitioner's submission of Nov. 17, 2023 in invalidity proceeding of EP 2,674,070 B1, dated Dec. 22, 2023, 54 pages.
Respondent's response to Petitioner's submission of Nov. 17, 2023 in invalidity proceeding of EP 2,674,070, dated Dec. 22, 2023, 108 pages (including English language translation of German language document).
Respondent's response to Petitioner's submission to the Preliminary Opinion of the Federal Patent Court in invalidity proceeding of EP 3,077,606 B1, dated Nov. 14, 2024, 11 pages.
Respondent's response to the Preliminary Opinion of the Federal Patent Court in invalidity proceeding of EP 3,077,606 B1, dated Sep. 20, 2024, 58 pages.
Respondent's submission in invalidity proceeding of EP 3,077,606 B1, dated Feb. 9, 2024, 93 pages.
Respondent's submission in invalidity proceeding of EP 3,077,606 B1, dated Jan. 10, 2025, 50 pages.
Respondent's submission in invalidity proceeding of EP 3,077,606 B1, dated Jul. 9, 2025, 6 pages.
Respondent's submission in response to qualified notice of the Federal Patent Court of Dec. 9, 2022 in invalidity proceeding of EP 2,674,072 B1, dated Jan. 13, 2023, 26 pages (including English language translation of German language document).
Respondent's submission in response to qualified notice of the Federal Patent Court of Dec. 9, 2022 in invalidity proceeding of EP 2,674,073, dated Jan. 13, 2023, 26 pages (including English language translation of German language document).
Respondent's submission in response to qualified notice of the Federal Patent Court of Dec. 9, 2022, in invalidity proceeding of EP 2,674,072 B1, dated Jan. 13, 2023,13 pages.
Respondent's submission in response to qualified notice of the Federal Patent Court of Dec. 9, 2022, in invalidity proceeding of EP 2,674,073 B1, dated Jan. 13, 2022, 13 pages.
Respondent's submission in response to qualified notice of the Federal Patent Court of Oct. 12, 2023 in invalidity proceeding of EP 2,674,070 B1, dated Nov. 17, 2023, 11 pages.
Respondent's submission in response to qualified notice of the Federal Patent Court of Oct. 12, 2023 in invalidity proceeding of EP 2,674,070, dated Nov. 17, 2023, 22 pages (including English language translation of German language document).
Respondent-Appellant s reply to Petitioner-Appellee s response of Aug. 2, 2024 in appeal against decision of the Federal Patent Court in invalidity proceeding against EP 2,674,073 B1, dated Sep. 29, 2025, 63 pages.
Respondent-Appellant's grounds of appeal in appeal against decision of the Federal Patent Court in invalidity proceeding against EP 2,674,073 B1, dated Apr. 11, 2024, 63 pages.
Respondent-Appellant's Grounds of Appeal in Appeal from Judgment of the Federal Patent Court in invalidity proceeding of EP3077606, dated Oct. 27, 2025; 64 pages.
Respondent-Appellant's Notice of Appeal against decision of the Federal Patent Court in invalidity proceeding against EP 2,674,073 B1, dated Dec. 13, 2023, 3 pages.
Respondents' Infringement of Independent Claim 1 of the '773 Patent, Exhibit 26, pp. 1-21.
Respondents' Motion and Memorandum in Support of Motion to: (1) Terminate the Investigation Based on a Consent Order Stipulation and (2) Stay the Investigation in Its Entirety Pending Resolution of the Motion to Terminate or, in the Alternative, for Expedited Treatment, Investigation No. 337-TA-1009, Jul. 13, 2016, pp. 1-15.
Respondents' Response to Complaint Under Section 337 of the Tariff Act of 1930, as Amended, and the Notice of Investigation, Investigation No. 337-TA-1009, Jul. 6, 2016, pp. 1-27.
Response and Reply Brief of Appellant, Nos. 2019-1373, -1392, Jul. 1, 2019, pp. 1-62.
Response to Communication under Article 94(3) filed with the European Patent Office in EP 13001947.4, dated Apr. 27, 2016; 8 pages.
Response to Communication under Article 94(3) in EP 13001947.4, dated Apr. 27, 2016, 8 pages.
Response to Communication under Rule 71(3) in EP 13001947.4, dated Dec. 9, 2015, 59 pages.
Response to Communication under Rule 71(3) in EP 13001947.4, dated Jan. 5, 2017, 15 pages.
Response to Extended European Search Report in EP 13001947.4, dated Jun. 18, 2014, 4 pages.
Result of oral proceeding in opposition against EP 2,674,074 B1, dated Nov. 9, 2022, 2 pages.
Revocation of EP 2,674,074 B1, dated Dec. 20, 2022, 17 pages.
Róng jie, *Bestway* v. *Intex*, IPR2020-01416, Exhibit 2102, pp. 1-1.
Róngjie, *Bestway* v. *Intex*IPR2020-01416, Exhibit 2103, pp. 1-1.
Sales confirmation of 54112 to SDGS (UK).
Sales confirmation of 54112 to TFS (CH).
Sales confirmation of 54112 to Thomas Philipps (DE).
Sales confirmation of 54112 to Wilton Bradley (UK).
Sales confirmation of the product concerned, i.e. "54112" to CDS (UK).
File history of U.S. Appl. No. 14/444,474 in Post Grant Review of U.S. Pat. No. 9,254,240; 1,451 pages.
File history of U.S. Appl. No. 14/566,075, filed Dec. 10, 2014, Ex. 2024, in Inter Partes Review of U.S. Pat. No. 9,901,186; 333 pages.
File History of U.S. Appl. No. 13/668,799, Exhibit 1015, in Inter Partes Review of U.S. Pat. No. 9,156,203, dated Nov. 30, 2016; 235 pages.
File History of U.S. Pat. No. 9,901,186, Ex. 1004, in Inter Partes Review of U.S. Pat. No. 9,901,186; 856 pages.
First Amended Complaint for False Advertising, Unfair Competition, and Patent Infringement, Ex. 1006, in Inter Partes Review of U.S. Pat. No. 9,901,186, filed Nov. 26, 2019; 245 pages.
Formulas for Stress, Strain, and Structural Matrices, Walter D. Pikey, copyright 2005, Ex. 2034, in Post Grant Review of U.S. Pat. No. 9,254,240; 3 pages.
Hawley's Condensed Chemical Dictionary, Fourteenth Edition, Revised by Richard J. Lewis, Sr., copyright 2001, Exhibit 2004, in Inter Partes Review of U.S. Pat. No. 9,156,203; 3 pages.
Intex PureSpa Packaging Panels, Ex. 2005, in Post Grant Review of U.S. Pat. No. 9,254,240; 8 pages.
Intex's Additional Statements of Undisputed Facts in U.S. Pat. No. 9,254,240 Infringement Action, dated Sep. 11, 2023, 10 pages.
Intex's Answer to Bestway's Amended Counterclaims in action for False Advertising, Unfair Competition, and Infringement of U.S. Pat. No. 10,154,869 and U.S. Pat. No. 9,254,240, dated Oct. 25, 2022, 13 pages.
Intex's Answers to Bestway's Counterclaims in U.S. Pat. No. 9,254,240 Infringement Action, dated Sep. 27, 2016; 6 pages.
Intex's Answers to Bestway's Counterclaims, in U.S. Pat. No. 8,562,773 and U.S. Pat. No. 9,156,203 Infringement Action, filed Aug. 31, 2016; 7 pages.
Intex's Brief in Opposition to Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 31, 2024, 30 pages.
Intex's Brief in Opposition to Bestway's Notice of Motion and Motion for Leave to Amend Its Invalidity Contentions in U.S. Pat. No. 9,254,240 Infringement Action, dated May 27, 2022, 23 pages.
Intex's Demonstratives, Ex. 2040, in Post Grant Review of U.S. Pat. No. 9,254,240, submitted Feb. 2, 2018; 77 pages.
Intex's Markman Demonstratives in U.S. Pat. No. 9,254,240 Infringement Action, dated Oct. 26, 2020;101 page.
Intex's Markman Hearing Presentation in U.S. Pat. No. 9,254,240 Infringement Action, dated Feb. 13, 2017, 49 pages.
Intex's Notice and Motion for Leave to Amend its Infringement Contentions in U.S. Pat. No. 9,254,240 Infringement Action, dated Jun. 8, 2021, 16 pages.

(56) References Cited

OTHER PUBLICATIONS

Intex's Notice and Motion for Partial Summary Judgment of Infringement and Estoppel in U.S. Pat. No. 9,254,240 Infringement Action, dated Aug. 18, 2023, 30 page.
Intex's Opening Claim Construction Brief in U.S. Pat. No. 9,254,240 Infringement Action, dated Jan. 30, 2017, 116 pages.
Intex's Opening Markman Brief in action for False Advertising, Unfair Competition, and Infringement of U.S. Pat. No. 10,154,869 and U.S. Pat. No. 9,254,240, dated Apr. 14, 2023, 31 pages.
Intex's Opposition to Bestway's Emergency Motion (Ex Parte Application) for Leave to Amend Answer and Invalidity Contentions in action for False Advertising, Unfair Competition, and Infringement of U.S. Pat. No. 10,154,869 and U.S. Pat. No. 9,254,240, dated May 19, 2025, 21 pages.
Intex's Opposition to Bestway's Emergency Motion (Ex Parte Application) for Leave to Amend Answer and Invalidity Contentions in U.S. Pat. No. 9,254,240 Infringement Action, dated May 19, 2025, 40 pages.
Intex's Opposition to Bestway's Motion for Leave to Amend Answer and Invalidity Contentions in U.S. Pat. No. 9,254,240 Infringement Action, dated Jun. 9, 2025, 31 pages.
Intex's Opposition to Bestway's Motion to File Supplemental Information in Post Grant Review of U.S. Pat. No. 9,254,240, dated Jun. 22, 2018; 7 pages.
Intex's Post-Hearing Brief regarding PGR Estoppel in U.S. Pat. No. 9,254,240 Infringement Action, dated Jul. 28, 2025, 30 pages.
Intex's Preliminary Response, filed Sep. 5, 2017, in Inter Partes Review of U.S. Pat. No. 9,156,203; 82 pages.
Intex's Request for Adverse Judgment under 37 C.F.R. 42.73(b)(2), dated Feb. 16, 2018, in Inter Partes Review of U.S. Pat. No. 8,562,773; 3 pages.
Intex's Responsive Claim Construction Brief in U.S. Pat. No. 9,254,240 Infringement Action, dated Feb. 17, 2017, 8 pages.
Intex's Responsive Markman Brief in action for False Advertising, Unfair Competition, and Infringement of U.S. Pat. No. 10,154,869 and U.S. Pat. No. 9,254,240, dated May 5, 2023, 16 pages.
Intex's Second Amended Complaint for False Advertising, Unfair Competition, and Infringement of U.S. Pat. No. 10,154,869 and U.S. Pat. No. 9,254,240, dated Sep. 30, 2022, 28 pages.
Intex's Statement of Genuine Disputes of Material Fact in U.S. Pat. No. 9,254,240 Infringement Action, dated Sep. 11, 2023, 59 pages.
Intex's Supplemental Demonstratives, Ex. 2042, in U.S. Pat. No. 9,254,240 Infringement Action, submitted Jul. 30, 2018; 7 pages.
Intex's Supplemental Opening Markman Brief in U.S. Pat. No. 9,254,240 Infringement Action, dated Sep. 8, 2020; 25 pages.
Joint Claim Construction and Prehearing Statement in U.S. Pat. No. 9,254,240 Infringement Action, dated Jan. 23, 2017; 6 pages.
Joint Markman Prehearing Statement in action for False Advertising, Unfair Competition, and Infringement of U.S. Pat. No. 10,154,869 and U.S. Pat. No. 9,254,240, dated Mar. 10, 2023, 12 pages.
Joint Notice of Lodging Joint Claim Construction Chart and File Histories in action for False Advertising, Unfair Competition, and Infringement of U.S. Pat. No. 10,154,869 and U.S. Pat. No. 9,254,240, dated May 5, 2023, 2 pages.
Joint Stipulation of Dismissal with Prejudice of Counts I-IV of Intex's Claims and Bestway's Withdrawal of Pending Motion for Leave to Include Unclean Hands Defense in action for False Advertising, Unfair Competition, and Infringement of U.S. Pat. No. 10,154,869 and U.S. Pat. No. 9,254,240, dated May 7, 2025, 3 pages.
Joint Stipulation regarding Representative Products in U.S. Pat. No. 9,254,240 Infringement Action, dated Aug. 12, 2021, 6 pages.
Letter from Bestway Inflatables & Material Corp. to Intex Marketing Ltd., dated Aug. 28, 2014, Exhibit 2008, in Inter Partes Review of U.S. Pat. No. 9,156,203; 1 page.
Letter from Intex Marketing Ltd. to Bestway Inflatables & Material Corp., dated Jul. 30, 2024, Exhibit 2007, in Inter Partes Review of U.S. Pat. No. 9,156,203; 2 pages.
Notice of Intex's Position Regarding Need for Supplemental Estoppel Hearing to the Extent Defendants are Allowed to Amend Contentions, in U.S. Pat. No. 9,254,240 Infringement Action; 4 pages.
Notice of Lodging Joint Claim Construction Chart in U.S. Pat. No. 9,254,240 Infringement Action, dated Oct. 1, 2020, 2 pages.
Order Denying Bestway's Motion to File Supplemental Information in Post Grant Review of U.S. Pat. No. 9,254,240, entered Jul. 12, 2018; 9 pages.
Order of the C.D. Cal. regarding Bestway's Ex Parte Applications and New Authority Relevant to PGR Estoppel; Order regarding Emergency Request for Hearing/Telephonic Status Conference in action for False Advertising, Unfair Competition, and Infringement of U.S. Pat. No. 10,154,869 and U.S. Pat. No. 9,254,240, dated May 20. 2025, 3 pages.
Order of the C.D. Cal. regarding Bestway's Motion to Amend Invalidity Contentions in U.S. Pat. No. 9,254,240 Infringement Action, dated Aug. 4, 2022, 8 pages.
Order of the C.D. Cal. regarding Claim Construction in action for False Advertising, Unfair Competition, and Infringement of U.S. Pat. No. 10,154,869 and U.S. Pat. No. 9,254,240, dated Aug. 18, 2023, 22 pages.
Order of the C.D. Cal. regarding Intex's Motion to Strike Bestway's Late-Disclosed Theories and Late-Produced Documents in action for False Advertising, Unfair Competition, and Infringement of U.S. Pat. No. 10,154,869 and U.S. Pat. No. 9,254,240, dated Jan. 21, 2026, 4 pages.
Order of the C.D. Cal. regarding Joint Stipulation of Dismissal with Prejudice of Counts I-IV of Intex's Claims and Bestway's Claims and Bestway's Withdrawal of Pending Motion for Leave to Include Unclean Hands Defense in action for False Advertising, Unfair Competition, and Infringement of U.S. Pat. No. 10,154,869 and U.S. Pat. No. 9,254,240, dated Jun. 12, 2025, 2 pages.
Order of the C.D. Cal. regarding Motions for Summary Judgment and Related Motions in U.S. Pat. No. 9,254,240 Infringement Action, dated Nov. 27, 2023, 26 pages.
Notarial Certificate concerning functions and interior structure of the 54112 pump.
Notice of Allowance dated Aug. 22, 2017 in corresponding U.S. Appl. No. 14/444,453.
Notice of Intervention filed against EP 3,077,606 B1, dated Apr. 25, 2022, 88 pages.
Notice of Opposition against EP 2,674,074 B1, dated Nov. 11, 2020, 64 pages.
Notice of Opposition against EP 3,077,606 B1, dated Jan. 7, 2020, 38 pages.
Notice of Opposition against European Patent No. 3,572,600, dated Feb. 1, 2023, 33 pages.
Notice of opposition received for European Patent Application No. 13001948.2, mailed on Nov. 19, 2020, 7 pages.
Office Action dated Apr. 11, 2017 in corresponding U.S. Appl. No. 13/727,143.
Office Action dated Jul. 19, 2017 in corresponding U.S. Appl. No. 15/597,956.
Office Action dated May 4, 2016 in U.S. Appl. No. 14/444,453.
Opponent's grounds of appeal of Decision of Opposition Division rejecting opposition of EP 3,077,606, dated Dec. 22, 2021, 327 pages (including English language translation of German language document).
Opponent's Notice of Appeal against Opposition Division's decision rejecting opposition against EP 3,077,606 B1, dated Oct. 15, 2021, 2 pages.
Opponent's response to Patent Proprietor's Statement of Grounds of Appeal, dated Sep. 11, 2023, 68 pages.
Opponent's response to preliminary opinion of the Opposition Division in opposition against EP 3,077,606 B1, dated Mar. 8, 2021, 17 pages.
Opponent's Statement of Grounds of Appeal, dated Dec. 22, 2021, 84 pages.
Opponent's submission in appeal against decision of Opposition Division rejected opposition of EP 3,077,606 B1, dated Nov. 4, 2022, 31 pages.

(56) References Cited

OTHER PUBLICATIONS

Opponent's submission in appeal against decision of Opposition Division rejected opposition of EP 3,077,606, dated Mar. 30, 2023, 36 pages.
Opponent's submission in appeal against decision of Opposition Division rejecting opposition of EP 3,077,606 B1, dated Oct. 14, 2022, 85 pages.
Opponent-Appellant's response to Patent Proprietor's reply of Jul. 19, 2022 in opposition of EP 3,077,606, dated Oct. 14, 2022, 88 pages.
Opponent-Appellant's response to the Preliminary Opinion of the Board of Appeal of the European Patent Office of Dec. 22, 2022 in opposition of EP 3,077,606, dated Mar. 30, 2023, 36 pages.
Opposition against EP 2,674,074 B1, dated Nov. 11, 2020, 57 pages.
Oral Deposition of Scott Schroeder, Ph.D., P.E. Friday, Jul. 30, 2021 Conducted Remotely via Zoom, Case IPR2020-01405, U.S. Pat. No. 9,901,186, Jul. 30, 2021, pp. 1-204.
Oral Hearing: Petitioner's Demonstratives, *Bestway (USA), Inc.*, Petitioner v. *Intex Recreation Corp.*, Patent Owner, Case Nos. IPR2020-01405, IPR2020-01416, U.S. Pat. Nos. 9,901,186 and 10,165,869, pp. 1-20.
Order of hearing by District Court of Mannheim, dated Mar. 11, 2022, 1 page.
Order, CV 19-08596 TJH (ASx), Oct. 8, 2020, pp. 1-2.
Oriental Recreational Products (Shanghai) Co., Ltd., MSpa Service Manual, 2013, 29 pages.
ORPC 2010 catalog, 2009 publication year; 60 pages.
ORPC 2012 catalog, 2011 publication year; 8 pages.
ORPC Blue Toy 2008 catalog, 36 pages.
ORPC Bring Leisure to Your Home 2010 Leisure Products catalog, 60 pages.
ORPC, 2008 catalog, 2007 publication year; 36 pages.
P. V. Cavallaro et al., Air-Inflated Fabric Structures, Naval Undersea Warfare Center Division, Newport, Rhode Island, Nov. 5, 2006.
Pages 4 to 7 of the user's manual of 554112.
Patent Assignment Cover Sheet, USPTO, Apr. 20, 2016, pp. 1-51.
Patent Assignment Cover Sheet, USPTO, Aug. 3, 2020, pp. 1-55.
Patent Owner Response, Case PGR2017-00003, U.S. Pat. No. 9,254,240 B2, Aug. 11, 2017, pp. 1-91.
Patent Owner's Demonstrative Exhibit—Not Evidence, *Bestway (USA), Inc.* v. *Intex Marketing Ltd.*, IPR2020-01405, -01416, pp. 1-157.
Patent Owner's Motion to Strike, Case IPR2020-01416, U.S. Pat. No. 10,165,869, Oct. 21, 2021, pp. 1-6.
Patent Owner's Opposition To Petitioner's Motion to Strike, Case IPR2020-01416, U.S. Pat. No. 9,901,186, Oct. 28, 2021, pp. 1-7.
Patent Owner's Preliminary Response, Case IPR2020-01416, U.S. Pat. No. 10,165,869, Nov. 20, 2020, pp. 1-60.
Patent Owner's Requests for Production to Petitioner, Case IPR2020-01416, U.S. Pat. No. 10,165,869, 2021, pp. 1-7.
Patent Owner's Response, Case IPR2020-01416, U.S. Pat. No. 10,165,869, May 27, 2021, pp. 1-72.
Patent Owner's Sur-Reply in Response to Petitioner's Reply to Preliminary Response, Case IPR2020-01416, U.S. Pat. No. 10,165,869, Jan. 14, 2020, pp. 1-12.
Patent Owner's Surreply, Case IPR2020-01416, U.S. Pat. No. 10,165,869, Oct. 11, 2021, pp. 1-33.
Patent Proprietor's Notice of Appeal against decision of Opposition Division revoking EP 2,674,074 B1, dated Feb. 24, 2023, 1 page.
Patent Proprietor's response to Notice of Intervention filed against EP 3,077,606 B1, dated Sep. 28, 2022, 144 pages.
Patent Proprietor's response to Notice of Intervention of Apr. 25, 2022 in opposition of EP 3,077,606, dated Sep. 28, 2022, 144 pages.
Patent Proprietor's response to Opponent's grounds of appeal of Dec. 22, 2021 in opposition of EP 3,077,606, dated Jul. 19, 2022, 344 pages.
Patent Proprietor's response to Opponent's Statement of Grounds of Appeal, dated Jul. 19, 2022, 108 pages.
Patent Proprietor's response to preliminary opinion of the Opposition Division in opposition against EP 3,077,606 B1, dated Mar. 11, 2021, 9 pages.
*Intex Recreation Corporation* v. *Bestway Germany GmbH u.a.*, Complaint of Intex Recreation Corporation, dated Feb. 14, 2022, filed against European Patent No. 3077606; 42 pages.
*Intex Recreation Corporation* v. *Bestway Germany GmbH u.a.*, Notice of Intervention, dated Apr. 25, 2022, filed against European Patent No. 3077606; 88 pages.
*Intex Recreation Corporation* v. *Bestway Germany GmbH u.a.*, Order of Hearing Date by District Court of Mannheim, dated Mar. 11, 2022, filed against European Patent No. 3077606; 1 page.
Intex Recreation Corporation, 2007 catalog, 2006 publication year; 80 pages.
Intex Recreation Corps.'s Amendments filed in European Patent Application No. 13001947.4, dated Jun. 23, 2016; 14 pages.
Intex, PureSpa Catalogue, dated Mar. 1, 2013, 2 pages.
Intex, PureSpa SPJ-HS-20 Owner's Manual, dated Dec. 20, 2013, 27 pages.
Intex, PureSpa SSP-10 Owner's Manual, dated Apr. 18, 2013, 17 pages.
Invalidity Chart for the Asserted Claim 6-7 under 35 U.S.C. § 103 Over CN Patent No. 2676755 ("Hanlie") in View of U.S. Patent Application Publication No. 2004/0040082 ("Fireman") and U.S. Pub. Patent Appl. No. 2003/0188388 ("Boso"), Chart 6, 4 pages.
Invalidity Chart for the Asserted Claims of U.S. Pat. No. 10,165,869 In View of Simmons Beautyrest Hi-Loft Inflatable Mattress, Chart 11, 59 pages.
Invalidity Chart for the Asserted Claims of U.S. Pat. No. 10,165,869 Over CN Patent No. 2676755 ("Hanlie") in View of U.S. Patent Application Publication No. 2004/0040082 ("Fireman") and U.S. Pat. No. 4,402,887 ("Kuriyama)", Chart 7, 5 pages.
Invalidity Chart for the Asserted Claims of U.S. Pat. No. 10,165,869 Over CN Patent No. 2676755 ("Hanlie") in View of U.S. Patent Application Publication No. 2004/0040082 ("Fireman"), and, optionally, U.S. Pat. No. 3,683,431 ("Pennel"), Chart 8, 14 pages.
Invalidity Chart for the Asserted Claims of U.S. Pat. No. 10,165,869 Over CN Patent No. 2676755 ("Hanlie") in view of U.S. Patent Application Publication No. 2004/0040082 ("Fireman"), U.S. Pat. No. 3,683,431 ("Pennel"), and U.S. Pat. No. 4,402,887 ("Kuriyama"), Chart 9, 4 pages.
Invalidity Chart for the Asserted Claims of U.S. Pat. No. 10,165,869 Under 35 U.S.C. §102 and/or §103 Over Bestway's 2008 Product Catalog or Bestway's Comfort Quest Airbed Product Line (collectively "Bestway's Comfort Quest Airbed") or Under 35 U.S.C. §103 Over Bestway's Comfort Quest Airbed in View of U.S. Pub. Patent Appl. No. 2003/0188388 ("Boso"), or Under 35 U.S.C. §103 Over Bestway's Comfort Quest Airbed in View of CN Patent No. 2676755 ("Hanlie"), Chart 10, 63 pages.
Invalidity Chart for the Asserted Claims of U.S. Pat. No. 10,165,869 Under 35 U.S.C. §103 Over CN Patent No. 2676755 ("Hanlie") and U.S. Patent Application Publication No. 2004/0040082 ("Fireman"), Chart 5, 22 pages.
Invalidity Chart for the Asserted Claims of U.S. Pat. No. 9,901,186 In View of Simmons Beautyrest Hi-Loft Inflatable Mattress, Chart 4, 32 pages.
Invalidity Chart for the Asserted Claims of U.S. Pat. No. 9,901,186 Over CN Patent No. 2676755 ("Hanlie") in View of U.S. Patent Application Publication No. 2004/0040082 ("Fireman"), Chart 1, 13 pages.
Invalidity Chart for the Asserted Claims of U.S. Pat. No. 9,901,186 Over U.S. Pat. No. 5,924,144 ("Peterson") in view of CN Patent No. 2676755 ("Hanlie") and U.S. Patent Application Publication No. 2004/0040082 ("Fireman"), Chart 2, 21 pages.
Invalidity Chart for the Asserted Claims of U.S. Pat. No. 9,901,186 Under 35 U.S.C. §102 Over Bestway's 2008 Product Catalog or Bestway's Comfort Quest Airbed Product Line (collectively "Bestway's Comfort Quest Airbed"); or Under 35 U.S.C. §103 Over Bestway's Comfort Quest Airbed in View of U.S. Patent Application Publication No. 2004/0040082 ("Fireman"), Chart 3, 30 pages.
IPR 2017-01396—Non-patent Exhibits to the Petition for Inter Partes Review of U.S. Pat. No. 9,156,203, 768 pages.
IPR 2017-01396—203 IPR Petition, 91 pages.

(56) References Cited

OTHER PUBLICATIONS

IPR 2017-01397—773 IPR Petition, 83 pages.
IPR2017-01396—Decision Denying Institution of Inter Partes Review of U.S. Pat. No. 9,156,203, issued Dec. 1, 2017, 22 pages.
IPR2017-01396—Petition for Inter Partes Review of U.S. Pat. No. 9,156,203, filed May 12, 2017, 91 Pages.
IPR2017-01397—Decision Instituteing Inter Partes Review of U.S. Pat. No. 8,562,773, issued Dec. 4, 2017, 26 pages.
IPR2017-01397—Non-patent Exhibits to the Petition for Inter Partes Review of U.S. Pat. No. 8,562,773, 860 pages.
IPR2017-01397—Petition for Inter Partes Review of U.S. Pat. No. 8,562,773, filed May 12, 2017, 83 pages.
IPR2017-01655—Decision Denying Institution of Inter Partes Review of U.S. Pat. No. 9,254,240, issued Jan. 4, 2018, 14 pages.
IPR202001416: Final Written Decision *Bestway* (*USA*), *Inc.* v. *Intex Marketing Ltd*., Feb. 10, 2022, pp. 1-1.
Jilong, 2010 Summer' 2010 Inflatable Toys Section Catalog, 2009 publication year; 41 pages.
Joint Markman Prehearing Statement, Case No. 2:19-CV-08596-TJH(ASx), Sep. 11, 2020, pp. 1-3.
Judgement of the Federal Patent Court in invalidity proceeding of EP 2,674,070 B1, dated Jan. 30, 2024, 59 pages.
Judgment Final Written Decision Determining Some Challenged Claims Unpatentable 35 U.S.C. § 318(a), Order Dismissing Patent Owner's and Petitioner's Motions to Strike 37 C.F.R. § 42.23(b), IPR2020-01416, U.S. Pat. No. 10,165,869 B2, Feb. 2, 2022, pp. 1-52.
Judgment of the District Court of Mannheim in infringement action of EP 3,077,606, dated Feb. 14, 2023, 34 pages.
Judgment of the Federal Patent Court in invalidity proceeding of EP 2,674,072 B1, dated Feb. 24, 2023, 42 pages.
Judgment of the Federal Patent Court in invalidity proceeding of EP 2,674,073 B1, dated Jul. 13, 2023, 40 pages.
Judgment of the Federal Patent Court in invalidity proceeding of EP 3,077,606 B1, dated Feb. 12, 2025, 64 pages.
Judgment of the Federal Patent Court in Invalidity Proceeding of European Patent No. 2,674,070, dated Jan. 30, 2024, 103 pages (including English translation).
Judgment Request for Adverse Judgment 37 C.F.R. § 42.73, Case IPR2017-01397, U.S. Pat. No. 8,562,773 B2, Mar. 5, 2018, pp. 1-3.
LAY-Z-SPA, Bestway, pp. 1-46.
Layzspa Vegas Manual.
Intex 2002 Inflatables catalog, 40 pages.
Intex Summer 2007 catalog, 80 pages.
Merriam Webster's Collegiate Dictionary, vol. 10, 1997, pp. 1-10.
Micheal J. Troughton., Handbook of Plastic Joining, A Practical Guide, 2nd Edition 2008, ISBN: 978-08155-1581-4.
Minutes of hearing in invalidity proceeding of EP 3,077,606 B1, dated Feb. 12, 2025, 14 pages.
Minutes of oral proceedings of Jan. 30, 2024 in invalidity proceeding of EP 2,674,070, Federal Patent Court, dated Jan. 30, 2024, 9 pages.
Minutes of the Oral Proceedings held May 5, 2023, in appeal against the decision of the Opposition Division rejecting the opposition against EP 3,077,606 B1, dated May 5, 2023, 5 pages.
MSpa Bubble 2012 catalog, 8 pages.
Notarial Certificate concerning Bestway Inflatables & Materials Corp.'s Lay-Z-Spa #54075, Jan. 4, 2023, 110 pages.
Schwarz et al., Kunststoff-verarbeitung, ISBN 3-8023-1893-5, 2022, pp. 205-206, 213, 215-16, and 219.
Screen capture from Yaoota.com as submitted with Notice of Intervention filed against EP 3,077,606 B1, dated Apr. 25, 2022, 1 page.
Screen capture from Yaoota.com, 1 page.
Screenshot from yaoota.com, dated Oct. 21, 2021, 1 page.
Screenshot of A8.
Screenshot of A9.
Screenshot showing the latest modified dates if A 1, A2.3 and A10.
Search Report dated Feb. 3, 2015 in corresponding European Application No. 13001944.1.
Search Report dated Feb. 3, 2015 in corresponding European Application No. 13001946.6.
Search Report dated Feb. 3, 2015 in corresponding European Application No. 13001947.4.
Search Report dated Feb. 3, 2015 in corresponding European Application No. 13001948.2.
Search Report dated Feb. 3, 2015 in corresponding European Application No. 13167366.7.
Search Report dated Jan. 16, 2015 in GB 1421648.5.
Search Report dated Nov. 7, 2013 in corresponding European Application No. 13001945.
Search Report dated Nov. 8, 2013 in corresponding European Application No. 13167364.
Search Report dated Nov. 8, 2013 in corresponding European Application No. 13167369.
Search Report dated Oct. 5, 2016 in corresponding European Application No. 13001948.2.
Search Report dated Oct. 5, 2016 in corresponding European Patent Application No. 13001948.2.
Search Report dated Sep. 19, 2014 in corresponding European Application No. 12839169.5.
Search Report/Notice of Allowability dated Dec. 23, 2015 in European Application No. 1300946.6.
Sevylor 100% fun season 2000 catalog, 33 pages.
Sevylor, 2000 catalog, 1999 year of publication; 33 pages.
Shanghai Jilong Plastic Products Co., Ltd., Prompt Set Spa Manual, Copyright 2011, 11 pages.
Submission by Opponent in opposition against EP 2,674,074 B1, dated Aug. 11, 2021, 7 pages.
Submission by Opponent in opposition against EP 3,077,606 B1, dated Apr. 30, 2021, 6 pages.
Submission by Patent Owner in opposition proceeding concerning EP 2,674,074 B1, dated Nov. 11, 2022, 5 pages.
Submission by Patent Proprietor in opposition against EP 2,674,074 B1, dated Nov. 7, 2022, 4 pages.
Submission by Patent Proprietor in opposition against EP 2,674,074 B1, dated Sep. 9, 2022, 8 pages.
Submission of Opponent in Opposition against European Patent No. 3,572,600, dated Mar. 15, 2024, 23 pages.
Submission of Opponent in Opposition against European Patent No. 3,572,600, dated Sep. 27, 2023, 65 pages.
Submission of Patent Owner in opposition against EP 2,674,074 B1, dated Nov. 7, 2022, 5 pages.
Submission of Patent Proprietor in Opposition against European Patent No. 3,572,600, dated Jan. 19, 2024, 23 pages.
Submission of Patent Proprietor in Opposition against European Patent No. 3,572,600, dated Jul. 6, 2023, 33 pages.
Summary of telephonic interview in EP 13001947.4, dated Jun. 15, 2015, 3 pages.
Summons to attend oral proceedings and Preliminary Opinion of the Board of Appeal of the European Patent Office, Appeal from decision of Opposition Division rejecting opposition of EP 3,077,606, dated Dec. 12, 2022, 29 pages.
Summons to attend oral proceedings before the European Patent Office in opposition proceeding against EP 2,674,074 B1, dated Aug. 20, 2021, 15 pages.
Summons to attend oral proceedings before the European Patent Office in opposition proceeding concerning EP 2,674,074 B1, dated Aug. 20, 2021, 15 pages.
Super-Tough (Trade Mark) Bed, "With Super-Tough (Trade Mark) Laminated Construction", Super Tough bed catalog, 2007, 1 page.
Super-Tough™ Bed, published 2007, 1 page.
Supplemental affidavits of Pan Xiaohua and Chen Lirong, dated Dec. 18, 2023, 5 pages.
Test report of 54112 and 54113, furnished by TUV Rheinland LGA Products GmnH.
Third-Party Submission dated Jan. 5, 2014 in U.S. Appl. No. 14/444,337.
Three-dimensional model of the control system of 54112.
Translation of Chinese Utility Model CN 202151339 U, Vertical Air Compartment, Feb. 29, 2012, 5 pages, China.

(56) References Cited

OTHER PUBLICATIONS

Translation of CN 201153763Y as submitted with Petitioner's submission in response to qualified notice of the Federal Patent Court of Oct. 12, 2023 in invalidity proceeding of EP 2,674,070 B1, dated Nov. 17, 2023, 10 pages.
Translation of CN 201153763Y, 10 pages.
Translation of CN 2676755Y, dated May 30, 2017, 12 pages.
Translation of CN 2776171Y, dated Jun. 20, 2023, 11 pages.
Translation of CN203583938U as submitted with Notice of Intervention filed against EP 3,077,606 B1, dated Apr. 25, 2022; 6 pages.
Examination Decision on the Request for Invalidation dated May 4, 2015 in Chinese Application No. 201320796506.9.
Examination Report Dated Sep. 22, 2017 in corresponding European Application No. 14824211.8, 3 pages.
Except from "Handbook on Plastic Joining", 2nd Edition, 2008, ISBN 978-08155-15814-4, pp. 33-34, Section 2.8.2 Ultrasonic Welding of Fabrics and Films.
Excerpt from "Plastics Chemistry for Engineers—From Synthesis to Application" (3rd ed., Munich 2011), chapter 13.1, W. Kaiser, 26 pages (including English language translation of German language document).
Excerpt from "Ultrasonic Welding", pp. 33-34, section 2.8.2 Ultrasonic Welding of Fabrics and Films, 2 pages.
Excerpt from Kalweit e.g. (E.d), Manual for technical product design—materials and manufacturing, basis for decision-making for designers and engineers, 2012, table of contents, pp. 75-79, 16 pages (including English language translation of German language document).
Excerpt from Kalweit et al., "Handbook of Technical Product Design-Materials and Manufacturing, Decision-making Principles for Designers and Engineers", 2012, ISBN 978-3-642-02641-6, pp. 75-79.
Excerpt from Oxford Dictionary of Mechanical Engineering, Oxford University Press, 2013.
Excerpt from Schwarz et al., Kunststoff-verarbeitung, ISBN 3-8023-1893-5, 2022; 8 pages.
Excerpt from W. Kaiser, "Plastics Chemistry for Engineers—From Synthesis to Application", 2011, ISBN 978-3-446-43047-1, pp. 482-489.
Excerpt from Webster's New World Dictionary of the American Language, Prentice Hall Press, 1986.
Excerpts from various product catalogs; 1 page.
Expert Declaration of Bernhard Kuchel, Case IPR2017-01397, U.S. Pat. No. 8,562,773, Sep. 6, 2017, pp. 1-82.
Expert Declaration of Scott Schroeder, Ph.D., P.E., Case IPR2020-01416, U.S. Pat. No. 10,165,869, May 27, 2021, pp. 1-98.
Extended European Search Report in EP 13001947.4, dated Nov. 15, 2013, 6 pages.
Faserverbundwerkstoff, Fiber Composite Material, Wikipedia, last updated Aug. 27, 2013, 13 pages.
Fiber Composite Material, Wikipedia, last updated Oct. 26, 2011, 13 pages.
File History for EP Patent Application No. 13167366 (now patent# EP2674076, issued on Jul. 26, 2017), 385 pages.
File history for European Patent No. EP2674076, 385 pages, Nov. 15, 2013, 10, 15, 2013.
Final Written Decision 35 U.S.C. § 328(a) and 37 C.F.R. § 42.73, Case PGR2017-00003, U.S. Pat. No. 9,254,240 B2, Nov. 7, 2018, pp. 1-52.
Final Written Decision of the Opposition Division in Opposition of European Patent No. 3,225,764, dated Oct. 17, 2023, 59 pages.
Final Written Decision of the Patent Trial and Appeal Board in Inter Partes Review of U.S. Pat. No. 10,165,869 (IPR2020-01416), dated Feb. 2, 2022, 52 pages.
Final Written Decision of the Patent Trial and Appeal Board in Inter Partes Review of U.S. Pat. No. 9,901,186 (IPR2020-01405), dated Feb. 2, 2022, 48 pages.
Final Written Decision of the Patent Trial and Appeal Board in Post Grant Review of U.S. Pat. No. 9,254,240 (PGR2017-00003), dated Nov. 7, 2018, 52 pages.
Graham, "An Introduction to hexagonal Geometry", 2010, p. 1-13.
Graham, An Introduction to Hexagonal Geometry, Hexnet, May 8, 2021, pp. 1-11.
Heat Sealer, Wikipedia, Nov. 2020, pp. 669-674.
High Frequency Welding Handbook, 1995, The Federation of High Frequency Welders, ISBN 0952577402, Chapter 7, Appendix B.
High Frequency Welding Handbook, 1995, The Federation of High Frequency Welders, ISBN 0952577402, Chapters 2-3.
High Frequency Welding Handbook, 1995, The Federation of High Frequency Welders, ISBN 0952577402, Chapters 4-6.
High Frequency Welding Handbook, 1995, The Federation of High Frequency Welders, ISBN 0952577402, Title page, preface, table of contents, health & safety, chapter one, appendix A, glossary of terms.
Hydro-Solutions, Inc. WIPP System Product Specification; pp. 1-12, 2006, Waller, Texas; www. wippsystem.com.
Image from website of O3-A. 1.
Image from website of O3-B.1.
Image from website of O3-C.1.
Image from website of O3-D.1.
Initial Determination Granting Unopposed Motion to Terminate Investigation Based Upon a Consent Decree Stipulation and Proposed Consent Order, Inv. No. 337-TA-1009, Jul. 25, 2016, pp. 1-15.
International Preliminary Report on Patentability received for PCT Patent Application No. PCT/US2012/042079, mailed on Sep. 12, 2014, 25 pages.
International Preliminary Report on Patentability received for PCT Patent Application No. PCT/US2014/047252, mailed on Jun. 24, 2015, 34 pages.
International Preliminary Report on Patentability received for PCT Patent Application No. PCT/US2014/068884, mailed on Feb. 29, 2016, 23 pages.
International Search Report and Written Opinion in PCT/US2014/047252, dated Jan. 14, 2015, 16 pages.
International Search Report and Written Opinion received for PCT Patent Application No. PCT/US2012/042079, mailed on Oct. 18, 2012, 27 pages.
International Search Report and Written Opinion received for PCT Patent Application No. PCT/US2014/068884, mailed on Mar. 11, 2015, 15 pages.
Intervener's Notice of Intervention in opposition of EP 3,077,606, dated Apr. 25, 2022, 87 pages.
Intex Recreaction Corp., Easy Set Pool, packaging panel, Aug. 20, 2008, 1 page, USA.
Intex Recreaction Corp., Pure Spa by Intex, packaging panels, 2013, 8 pages, USA.
Intex Recreaction Corp., Ultra Frame Pool, Enjoy the Ultimate Stay-cation!, poster, 2009, 1 page, USA.
*Intex Recreation Corp.* v. *Bestway* (*USA*) *Inc.*, Lead Case No. 2:16-cv-3300-JAK-E, Defendants' Notice and Motion for Leave to Amend Its Invalidity Contentions, filed May 6, 2022, Document 234; 17 pages.
Intex Recreation Corporation 2002 catalog, "2002 Inflatables", 2001 publication year; 40 pages.
*Intex Recreation Corporation* v. *Bestway Germany GmbH u.a.*, Communication Entering Opposition Citations, dated May 12, 2022, filed against European Patent No. 3077606; 9 pages.
Order on Conduct of the Proceeding in Post Grant Review of U.S. Pat. No. 9,254,240, entered May 15, 2018; 8 pages.
Order on Conduct of the Proceeding: Request to File Motion for Supplemental Information in Post Grant Review of U.S. Pat. No. 9,254,240, entered Jun. 13, 2018; 4 pages.
Order regarding Bestway's Ex Parte Applications and New Authority Relevant to PGR Estoppel, in action for False Advertising, Unfair Competition, and Infringement of U.S. Pat. No. 10,154,869 and U.S. Pat. No. 9,254,240, dated May 20, 2025; 3 pages.
Petition for Inter Partes Review of U.S. Pat. No. 9,254,240, dated Jun. 27, 2017; 63 pages.
Prosecution history of U.S. Appl. No. 15/906,857, Ex. 1029, in Inter Partes Review of U.S. Pat. No. 9,901,186; 268 pages.

(56) References Cited

OTHER PUBLICATIONS

Provisional Opinion of the Opposition Division in Opposition against European Patent No. 3,572,600, dated Nov. 10, 2020; 9 pages.
Record of Oral Hearing held Aug. 1, 2018 in Post Grant Review of U.S. Pat. No. 9,254,240; 16 pages.
Record of Oral Hearing held Feb. 5, 2018 in Post Grant Review of U.S. Pat. No. 9,254,240; 39 pages.
Request for Rehearing on Decision to Institute, Exhibit 2003, in Inter Partes Review of U.S. Pat. No. 9,254,240; 8 pages.
Response to Restriction Requirement filed with the U.S. Patent Office on Nov. 19, 2025 in U.S. Appl. No. 18/532,903; 6 pages.
Restriction Requirement issued by the U.S. Patent Office on May 20, 2025 in U.S. Appl. No. 18/532,903; 9 pages.
Supplemental Expert Declaration of Bernhard Kuchel, Ex. 2039, in Post Grant Review of U.S. Pat. No. 9,254,240, dated Aug. 11, 2017; 45 pages.
Transcript of Hearing in action for False Advertising, Unfair Competition, and Infringement of U.S. Pat. No. 10,154,869 and U.S. Pat. No. 9,254,240, dated Jul. 2, 2025; 55 pages.
Bestway's Response to Intex' Statement of Grounds of Appeal in Appeal against the Judgment of the Federal Patent Court in Invalidity Action against EP 3,077,606, dated Mar. 9, 2026; 78 pages.
Final Written Decision of the Court of Appeals in Appeal against the Judgment of the Federal Patent Court in Invalidity Action against EP 2,674,073, dated Nov. 18, 2025; 30 pages.
Machine translation of Oral Hearing in Invalidity Action against EP 2,674,070, dated Feb. 26, 2026; 3 pages.
Order Granting Intex's Motion for Reconsideration in Case No. 2:19-cv-08596-JAK; dated Mar. 20, 2026; 3 pages.
Intex' submission in response to Summons to Attend Oral Proceedings of Mar. 31, 2025 and auxiliary requests, filed Feb. 20, 2026 in Opposition against European Patent No. 3572600; 200 pages.
Bestway's submission in response to Summons to Attend Oral Proceedings of Mar. 31, 2025, filed Feb. 20, 2026 in Opposition against European Patent No. 3572600; 12 pages.
Affidavit by Chun Yang, submitted with Bestway's submission in response to Summons to Attend Oral Proceedings of Mar. 31, 2025, filed Feb. 20, 2026 in Opposition against European Patent No. 3572600; 3 pages.
Consolidated list of cited documents in Opposition against European Patent No. 3572600, dated Feb. 20, 2026; 2 pages.
Translation of CN203583938U, 6 pages.
Translation of JPH0313669A as submitted with Notice of Intervention filed against EP 3,077,606 B1, dated Apr. 25, 2022, 11 pages.
Translation of JPH0313669A, 11 pages.
Translation of Kanirope Professional Ropes & Equipment, Aramid Rope Arabraid as submitted with Petitioner's response to Respondend's statement of grounds of appeal against decision of the Federal Patent Court in invalidity proceeding of EP 2,674,073 B1, dated Aug. 2, 2024, 8 pages.
Translation of Kanirope Professional Ropes & Equipment, Aramid Rope Arabraid, 8 pages.
Translation revision statement of Aimei Xu concerning CN 2,676,755 Y, 3 pages.
Translation revision statement of Aimei Xu concerning CN 2676755Y, dated Dec. 15, 2021, 3 pages.
Tritech Air Mattress with Built-In Pump, Wayfair, pp. 1-6.
U.S. Appl. No. 13/727,143, filed Dec. 26, 2012.
U.S. Appl. No. 14/444,453, filed Jul. 28, 2014.
U.S. Appl. No. 15/581,638, filed Apr. 28, 2017.
U.S. Appl. No. 15/597,956, filed May 17, 2017.
UK Intellectual Property Office, Combined Search and Examination Report in GB1421648.5, issued Jan. 16, 2015, 2 pages.
United States District Court Central District of California (Western Division—Los Angeles) Civil Docket for Case #: 2:19-cv-08596-TJH-AS, Jul. 23, 2020, pp. 1-10.
United States District Court Central District of California, *InteX Recreation Corp.*, Plaintiff V. *Bestway* (*USA*), *Inc. And Bestway Inflatables & Materials Corporation*, Defendants, Case No. 2:19-CV-08596-TJH(ASX), 15 pages.
United States Patent and Trademark Office Before the Patent Trial and Appeal Board, *Bestway* (*USA*), *Inc*., Petitioner V. *Intex Marketing Ltd.* Patent Owner Petition for Inter Partes Review of U.S. Pat. No. 9,901,186, Case No. IPR2020-01405, 75 pages.
United States Patent and Trademark Office Before the Patent Trial and Appeal *Board, Bestway* (*USA*), *Inc*., Petitioner V. *Intex Marketing Ltd.*, Decision for Inter Partes Review of U.S. Pat. No. 10,165,869, Case No. IPR 2020-01416, 26 pages.
United States Patent and Trademark Office Before the Patent Trial and Appeal Board, *Bestway* (*USA*), *Inc*., Petitioner V. *Intex Marketing Ltd.*, Decision for Inter Partes Review of U.S. Pat. No. 9,901,186, Case No. IPR2020-01405, 25 pages.
United States Patent and Trademark Office Before the Patent Trial and Appeal Board, *Bestway USA, Inc*., Petitioner V. *Intex Marketing Ltd.* Patent Owner, Petition for Inter Partes Review of U.S. Pat. No. 10,165,869, Case No. IPR2020-01416, 85 pages.
United States Patent and Trademark Office Judgment and Order Dismissing Patent Owner's and Petitioner's Motion to Strike of U.S. Pat. No. 10,165,869, Case No. IPR2020-01416, 52 pages.
United States Patent and Trademark Office Judgment and Order Dismissing Patent Owner's and Petitioner's Motion to Strike of U.S. Pat. No. 9,901,186, Case No. IPR2020-01405, 48 pages.
Video file referred to in A7.
Video instruction for setting up 54112 available at https://www.youtube.com/watch?v=De5tMMnYSHgY.
Video instructions for setting up 54112( starting at 5:05) available at https://www. Youtube.com/watch?v=krGVVVprYPA.
Videotaped Deposition of Ali M. Sadegh, Ph.D., Case Case PGR2017-00003, U.S. Pat. No. 9,254,240, Jul. 27, 2017, pp. 1-209.
Vincourek, "Ultrasonic Welding of Textiles," 1990, 40 pages.
Virtual Patent Marking, Bestway, Apr. 6, 2021, pp. 1-2.
Website screenshot.
Website screenshot of O3-C.1.
Website screenshot Of O3-D. 1.
Website screenshot original file name: 03-B. 1.
Wikipedia article to "Connection technology," Processing status Jan. 24, 2012 (expression from "The Wayback Machine"), 6 pages (including English language translation of German language document).
Wikipedia article: Fiber composite material, Aug. 27, 2013, https://de.wikipedia.org/wlindex.php?title=Faserverbundwerkstoff&oldid=1219 5259; 13 pages.
Written evidence of "Comfort Quest" airbed, dated Apr. 18, 2023, 47 pages.
Yaoota.com, Bestway Colorful Inflatable Swim Sing Paddling Pool as submitted with Notice of Intervention filed against EP 3,077,606 B1, dated Apr. 25, 2022, 1 page.
Declaration of S. Caloiaro in Support of Bestway's Responsive Markman Brief in action for False Advertising, Unfair Competition, and Infringement of U.S. Pat. No. 10,154,869 and U.S. Pat. No. 9,254,240, dated May 5, 2023, 2 pages.
Deposition of Bernhard Kuchel, on Jun. 28, 2018, in Post Grant Review of U.S. Pat. No. 9,254,240; 59 pages.
Deposition of Bernhard Kuchel, on Sep. 28, 2017 in Post Grant Review of U.S. Pat. No. 9,254,240; 115 pages.
Dictionary of Mechanical Engineering, G.H.F. Nayler, copyright 1996, Ex. 2033, in Post Grant Review of U.S. Pat. No. 9,254,240; 4 pages.
Direct Testimony Declaration of B. Kuchel in U.S. Pat. No. 9,254,240 Infringement Action, dated Oct. 24, 2024, 89 pages.
Direct Testimony Declaration of Dr. A. M. Sadegh, Ph.D. in U.S. Pat. No. 9,254,240 Infringement Action, dated Oct. 29, 2024, 34 pages.
Direct Testimony Declaration of P. Fumagalli in U.S. Pat. No. 9,254,240 Infringement Action, dated Oct. 29, 2024, 25 pages.
Disclosure of Bestway's Amended Final Invalidity Contentions in U.S. Pat. No. 9,254,240 Infringement Action, dated Aug. 26, 2022, 2 pages.

(56) References Cited

OTHER PUBLICATIONS

Disclosure of Bestway's Final Invalidity Contentions in U.S. Pat. No. 9,254,240 Infringement Action, dated Mar. 8, 2021, 2 pages.
Disclosure of Intex's Final Infringement Contentions in U.S. Pat. No. 9,254,240 Infringement Action, dated Feb. 8, 2021; 2 pages.
Excerpts from Merriam Webster's Collegiate Dictionary, copyright 1993, Ex. 1027, in Inter Parties Review of U.S. Pat. No. 9,901,186; 10 pages.
Excerpts of Declaration of A. M. Sadegh, Ph.D. in Inter Partes Review of U.S. Pat. No. 9,254,240 Infringement Action, dated Jun. 27, 2017, Ex.1 of Intex's Supplemental Markman Response Brief; 7 pages.
Excerpts of Patent Owner's Preliminary Response in Inter Partes Review of U.S. Pat. No. 9,254,240 Infringement Action, dated Oct. 17, 2017, Ex. 5 of Intex's Supplemental Markman Response Brief; 7 pages.
Excerpts of Petition for Inter Partes Review of U.S. Pat. No. 9,254,240 Infringement Action, dated Jun. 27, 2017, Ex. 1 of Intex's Supplemental Markman Response Brief; 9 pages.
Exhibit 1 to Bestway's Notice of Errata regarding Motion for Leave to Amend Answer and Invalidity Contentions & Exhibit 1 in action for False Advertising, Unfair Competition, and Infringement of U.S. Pat. No. 10,154,869 and U.S. Pat. No. 9,254,240, dated Jun. 30, 2025, 46 pages.
Exhibit 1 to Declaration of J. DeAmicis in Support of Intex's Opposition to Bestway's Emergency Motion (Ex Parte Application) for Leave to Amend Answer and Invalidity Contentions in U.S. Pat. No. 9,254,240 Infringement Action, dated May 19, 2025, 8 pages.
Exhibit 1 to Declaration of R. Dodge in support of Intex's Motion for Leave to Amend Its Infringement Contentions in U.S. Pat. No. 9,254,240 Infringement Action, dated Jun. 8, 2021, 32 pages.
Exhibit 1 to Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 7 pages.
Exhibit 1 to Declaration of R. Dodge in support of Intex's Supplemental Opening Markman Brief in U.S. Pat. No. 9,254,240 Infringement Action, dated Sep. 8, 2020, 5 pages.
Exhibit 1 to Declaration of S. A. Caloiaro in Support of Bestway's Motion for Leave to Amend Answer and Invalidity Contentions in action for False Advertising, Unfair Competition, and Infringement of U.S. Pat. No. 10,154,869 and U.S. Pat. No. 9,254,240, dated May 25, 2025, 45 pages.
Exhibit 1 to Disclosure of Bestway's Amended Final Invalidity Contentions in U.S. Pat. No. 9,254,240 Infringement Action, dated Aug. 26, 2022, 95 pages.
Exhibit 1 to Disclosure of Bestway's Final Invalidity Contentions in U.S. Pat. No. 9,254,240 Infringement Action, dated Mar. 8, 2021, 80 pages.
Exhibit 1 to Disclosure of Intex's Final Infringement Contentions in U.S. Pat. No. 9,254,240 Infringement Action, dated Feb. 8, 2021, 29 pages.
Exhibit 10 to Declaration of R. Dodge in Support of (1) Intex's Notice and Motion for Partial Summary Judgment of Infringement and Estoppel; (2) Intex's Notice of Motion to Exclude Bestway's Expert Opinions; and (3) Intex's Notice and Consolidated Motion to Strike in U.S. Pat. No. 9,254,240 Infringement Action, dated Aug. 18, 2023, 6 pages.
Exhibit 10 to Declaration of S. A. Caloiaro in Support of Bestway's Opening Markman Brief in action for False Advertising, Unfair Competition, and Infringement of U.S. Pat. No. 10,154,869 and U.S. Pat. No. 9,254,240, dated Apr. 14, 2023, 6 pages.
Exhibit 10 to Intex's Second Amended Complaint for False Advertising, Unfair Competition, and Infringement of U.S. Pat. No. 10,154,869 and U.S. Pat. No. 9,254,240, dated Sep. 30, 2022, 11 pages.
Exhibit 11 to Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 96 pages.
Exhibit 12 to Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 35 pages.
Exhibit 12 to Declaration of S. A. Caloiaro in Support of Bestway's Opening Markman Brief in action for False Advertising, Unfair Competition, and Infringement of U.S. Pat. No. 10,154,869 and U.S. Pat. No. 9,254,240, dated Apr. 14, 2023, 23 pages.
Exhibit 13 to Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 66 pages.
Exhibit 16 to Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 2 pages.
Exhibit 16 to Declaration of S. A. Caloiaro in Support of Bestway's Opening Markman Brief in action for False Advertising, Unfair Competition, and Infringement of U.S. Pat. No. 10,154,869 and U.S. Pat. No. 9,254,240, dated Apr. 14, 2023, 2 pages.
Exhibit 17 to Declaration of S. A. Caloiaro in Support of Bestway's Opening Markman Brief in action for False Advertising, Unfair Competition, and Infringement of U.S. Pat. No. 10,154,869 and U.S. Pat. No. 9,254,240, dated Apr. 14, 2023, 21 pages.
Exhibit 2 to Declaration of J. Deamicis in Support of Intex's Opposition to Bestway's Motion for Leave to Amend Answer in action for False Advertising, Unfair Competition, and Infringement of U.S. Pat. No. 10,154,869 and U.S. Pat. No. 9,254,240, dated Jul. 31, 2024, 15 pages.
Exhibit 2 to Declaration of R. Dodge in support of Intex's Motion for Leave to Amend Its Infringement Contentions in U.S. Pat. No. 9,254,240 Infringement Action, dated Jun. 8, 2021, 30 pages.
Exhibit 2 to Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 5 pages.
Exhibit 2 to Declaration of R. Dodge in support of Intex's Supplemental Opening Markman Brief in U.S. Pat. No. 9,254,240 Infringement Action, dated Sep. 8, 2020, 2 pages.
Exhibit 2 to Declaration of S. A. Caloiaro in Support of Bestway's Motion for Leave to Amend Answer and Invalidity Contentions in action for False Advertising, Unfair Competition, and Infringement of U.S. Pat. No. 10,154,869 and U.S. Pat. No. 9,254,240, dated May 25, 2025, 17 pages.
Exhibit 2 to Disclosure of Bestway's Amended Final Invalidity Contentions in U.S. Pat. No. 9,254,240 Infringement Action, dated Aug. 26, 2022, 56 pages.
Exhibit 20 to Declaration of S. A. Caloiaro in Support of Bestway's Motion for Leave to Amend Answer and Invalidity Contentions in action for False Advertising, Unfair Competition, and Infringement of U.S. Pat. No. 10,154,869 and U.S. Pat. No. 9,254,240, dated May 25, 2025, 28 pages.
Exhibit 20 to Declaration of S. A. Caloiaro in Support of Bestway's Motion for Leave to Amend Answer and Invalidity Contentions in U.S. Pat. No. 9,254,240 Infringement Action, dated May 24, 2025, 28 pages.
Exhibit 21 to Declaration of R. Dodge in Support of (1) Intex's Notice and Motion for Partial Summary Judgment of Infringement and Estoppel; (2) Intex's Notice of Motion to Exclude Bestway's Expert Opinions; and (3) Intex's Notice and Consolidated Motion to Strike in U.S. Pat. No. 9,254,240 Infringement Action, dated Aug. 18, 2023, 41 pages.
Exhibit 21 to Declaration of S. A. Caloiaro in Support of Bestway's Motion for Leave to Amend Answer and Invalidity Contentions in action for False Advertising, Unfair Competition, and Infringement of U.S. Pat. No. 10,154,869 and U.S. Pat. No. 9,254,240, dated May 25, 2025, 11 pages.
Exhibit 21 to Declaration of S. A. Caloiaro in Support of Bestway's Motion for Leave to Amend Answer and Invalidity Contentions in U.S. Pat. No. 9,254,240 Infringement Action, dated May 24, 2025, 11 pages.
Exhibit 21 to Declaration of S. Caloiaro in Support of Bestway's Responsive Markman Brief in action for False Advertising, Unfair

(56) References Cited

OTHER PUBLICATIONS

Competition, and Infringement of U.S. Pat. No. 10,154,869 and U.S. Pat. No. 9,254,240, dated May 5, 2023, 8 pages.
Exhibit 22 to Declaration of S. Caloiaro in Support of Bestway's Responsive Markman Brief in action for False Advertising, Unfair Competition, and Infringement of U.S. Pat. No. 10,154,869 and U.S. Pat. No. 9,254,240, dated May 5, 2023, 14 pages.
Exhibit 23 to Declaration of R. Dodge in Support of (1) Intex's Notice and Motion for Partial Summary Judgment of Infringement and Estoppel; (2) Intex's Notice of Motion to Exclude Bestway's Expert Opinions; and (3) Intex's Notice and Consolidated Motion to Strike in U.S. Pat. No. 9,254,240 Infringement Action, dated Aug. 18, 2023, 2 pages.
Exhibit 23 to Declaration of S. Caloiaro in Support of Bestway's Responsive Markman Brief in action for False Advertising, Unfair Competition, and Infringement of U.S. Pat. No. 10,154,869 and U.S. Pat. No. 9,254,240, dated May 5, 2023, 15 pages.
Exhibit 24 to Declaration of R. Dodge in Support of (1) Intex's Notice and Motion for Partial Summary Judgment of Infringement and Estoppel; (2) Intex's Notice of Motion to Exclude Bestway's Expert Opinions; and (3) Intex's Notice and Consolidated Motion to Strike in U.S. Pat. No. 9,254,240 Infringement Action, dated Aug. 18, 2023, 59 pages.
Exhibit 25 to Declaration of S. Caloiaro in Support of Bestway's Responsive Markman Brief in action for False Advertising, Unfair Competition, and Infringement of U.S. Pat. No. 10,154,869 and U.S. Pat. No. 9,254,240, dated May 5, 2023, 28 pages.
Communication under Rule 71(3) in EP 13001947.4, dated Jul. 13, 2015, 61 pages.
Communication under Rule 71(3) in EP 13001947.4, dated Sep. 19, 2016, 122 pages.
Complainant's Domestic Industry Products for Claim 1 of the '773 Patent, Exhibit 68, pp. 1-29.
Complainants Intex Recreation Corp.'s and Intex Marketing, Ltd.'s Statement on the Public Interest, Investigation No. 337-TA, May 17, 2016, pp. 1-30.
Complaint for Patent Infringement, Demand for Jury Trial, May 13, 2016, pp. 1-24.
Complaint qui tam action against Bestway.
Consent Order, Investigation No. 337-TA-1009, Aug. 18, 2016, pp. 1-4.
Covers of various catalogs as submitted with Notice of Intervention filed against EP 3,077,606 B1, dated Apr. 25, 2022, 1 page.
Covers of various catalogs, 1 page.
CSA US Corp., InstaSPA Deluxe Brochure, Copyright 2008, 1 page.
Decision Granting Institution of Inter Partes Review 35 U.S.C. § 314, IPR2020-01416, U.S. Pat. No. 10,165,869 B2, Feb. 4, 2021, pp. 1-26.
Decision Granting Institution of Inter Partes Review under 35 U.S.C. 314, before the U.S. Patent and Trademark Office Patent Trial and Appeal Board, *Bestway (USA) Inc*., Petitioner v. *Intex Marketing Ltd*., Patent Owner, U.S. Pat. No. 9,901,186, Case No. IPR2020-01405, entered Feb. 4, 2021; 25 pages.
Decision Granting Patent Owner's Request on Rehearing of the Final Written Decision 37 C.F.R. § 42.71(d), IPR2020-01416, U.S. Pat. No. 10,165,869 B2, Feb. 16, 2022, pp. 1-7.
Decision of Board of Appeal in appeal against decision of Opposition Division in opposition against EP 2,674,074 B1, dated Jun. 6, 2025, 16 pages.
Decision of Board of Appeal of the European Patent Office dismissing appeal and rejecting intervention in opposition of EP 3,077,606, dated May 5, 2023, 61 pages.
Decision of Opposition Division rejecting opposition of EP 3,077,606, dated Aug. 24, 2021, 16 pages.
Decision of the Board of Appeal in appeal against decision of the Opposition Division rejecting the opposition filed against EP 3,077,606 B1, dated May 5, 2023, 61 pages.
Decision of the Opposition Division in opposition against EP 2,674,074 B1, dated Dec. 20, 2022, 84 pages.
Decision of the Opposition Division in opposition against EP 3,077,606 B1, dated Aug. 24, 2021, 26 pages.
Decision to grant in EP 1300947.4, dated Feb. 9, 2017, 3 pages.
Declaration of Alex J. Wang, Case IPR2020-01416, U.S. Pat. No. 10,165,869, Aug. 31, 2021, pp. 1-3.
Declaration of Ali M. Sadegh, Ph.D, Case No. PGR2017-00003, pp. 1-144.
Declaration of Ali M. Sadegh, Ph.D., Case No. IPR2017-01397, May 12, 2017, pp. 1-83.
Declaration of Dr. Ali Sadegh.
Declaration of John P. Abraham, Ph.D. in Support of Petition for Inter Partes Review, Case IPR2020-01405, U.S. Pat. No. 9,901,186, Jul. 31, 2020, pp. 1-100.
Declaration of John P. Abraham, Ph.D. in Support of Petition for Inter Partes Review, Case IPR2020-01416, U.S. Pat. No. 10,165,869, Aug. 4, 2020, pp. 1-137.
Declaration of Matthew Whalen in Support of Response to Notice of Intervention, in infringement action of EP 3,077,606, dated Sep. 26, 2022; 6 pages.
Declaration of Patrizio Fumagalli.
Declaration of Patrizio Fumagalli dated Nov. 3, 2016.
Declaration of Patrizio Fumagalli, dated Jun. 7, 2018, 31 pages.
Declaration of Simone Zesi, dated Apr. 17, 2018, 15 pages.
Declaration of Steven A. Caloiaro in Support of Petitioner Bestway (USA) Inc's Motion for Pro Hac Vice Admission of Steven A. Caloiaro Under 37 C.F.R. § 42.10(c), Case IPR2020-01416, U.S. Pat. No. 10,165,869, Nov. 13, 2020, pp. 1-4.
Declaration of Yolanda Morales in Support of Response to Notice of Intervention, in infringement action of EP 3,077,606, dated Sep. 26, 2022; 4 pages.
Declaration of Zhang Zhuowei, dated Apr. 18, 2018, 19 pages.
Defendant's response to Plaintiffs reply of Aug. 24, 2022, in infringement action of EP 3,077,606, dated Nov. 2, 2022, 44 pages.
Defendant's statement of defense in infringement action of EP 3,077,606, dated May 23, 2022, 48 pages.
Defendants' Responses and Objections to Plaintiff's First Set of Discovery Requests, Case No. 2:19-CV-08596-TJH(ASx), Jun. 26, 2020, pp. 1-18.
Deposition of John P. Abraham, Ph.D., Case IPR2020-01405, U.S. Pat. No. 9,901,186, Oct. 4, 2021, pp. 1-28.
English language translation of CN 201153763 Y, 10 pages.
English language translation of CN 202732280 U, 6 pages.
English language translation of CN 203583938 U obtained from Espacenet, dated May 7, 2014, 10 pages.
English language translation of CN 2064797 U, 8 pages.
English language translation of CN 2794505 Y, 6 pages.
English language translation of CN 2832129 Y, 8 pages.
English language translation of JPH0313669, 11 pages.
English translation of *Intex Recreation Corporation* v. *Bestway Germany GmbH u.a*., Statement of Defense, dated May 23, 2022, filed against European Patent No. 3077606; 48 pages.
Enlarged view of screenshot of product No. 51038 on "yaoota. com"; 1 page.
European Search Report in Application No. EP 14826258.7, mailed Feb. 28, 2017, 6 pages.
Evidence of Bestway Inflatables & Materials Corp. Lay-Z-Spa #54075, Oct. 2009, 5 pages.
Evidence of Bestway Inflatables & Materials Corp. Lay-Z-Spa #54075, dated Jan. 17, 2023, 3 pages.
I-Beam and Pillar Sample, (9 pages), available by 2006.
"Frame," the American Heritage Dictionary, dated Sep. 23, 2020, Ex. 3 of Intex's Supplemental Markman Response Brief; 4 pages.
Bestway's 2018 SaluSpa Catalog as submitted in U.S. Pat. No. 9,254,240 Infringement Action, dated Jun. 29, 2021, 5 pages.
Bestway's 2019 SaluSpa Catalog as submitted in U.S. Pat. No. 9,254,240 Infringement Action, dated Jun. 29, 2021, 5 pages.
Bestway's 2020 SaluSpa Catalog as submitted in U.S. Pat. No. 9,254,240 Infringement Action, dated Jun. 29, 2021, 5 pages.
Bestway's Answer to Intex's Complaint, in U.S. Pat. No. 8,562,773 and U.S. Pat. No. 9,156,203 Infringement Action, filed Aug. 15, 2016; 9 pages.

(56) References Cited

OTHER PUBLICATIONS

Bestway's Answer to Intex's Second Amended Complaint for False Advertising, Unfair Competition, and Infringement of U.S. Pat. No. 10,154,869 and U.S. Pat. No. 9,254,240, dated Oct. 14, 2022, 19 pages.
Bestway's Corrected Answer to Intex's Complaint for Patent Infringement of U.S. Pat. No. 9,254,240, dated Sep. 6, 2016, 7 pages.
Bestway's Emergency Motion (Ex Parte Application) for Leave to Amend Answer and Invalidity Contentions in Advance of the May 30, 2025 PGR Estoppel Hearing in U.S. Pat. No. 9,254,240 Infringement Action, dated May 16, 2025, 28 pages.
Bestway's Emergency Motion (Ex Parte Applications) for Leave to Amend Answer and Invalidity Contentions in action for False Advertising, Unfair Competition, and Infringement of U.S. Pat. No. 10,154, 869 and U.S. Pat. No. 9,254,240, dated May 17, 2025, 30 pages.
Bestway's Motion to File Supplemental Information pursuant to 37 CFR 42.223(a), in Post Grant Review of U.S. Pat. No. 9,254,240, dated Jun. 18, 2018; 40 pages.
Bestway's Notice and Motion for Leave to Amend Answer and Invalidity Contentions in action for False Advertising, Unfair Competition, and Infringement of U.S. Pat. No. 10,154,869 and U.S. Pat. No. 9,254,240, dated May 25, 2025, 31 pages.
Bestway's Notice and Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 16, 2024, 28 pages.
Bestway's Notice and Motion for Summary Judgment (Non-Infringement and No Willful Infringement) and Partial Summary Judgment (Simex Estoppel) in U.S. Pat. No. 9,254,240 Infringement Action, dated Aug. 18, 2023, 30 pages.
Bestway's Notice of Errata regarding Motion for Leave to Amend Answer and Invalidity Contentions & Exhibit 1 in action for False Advertising, Unfair Competition, and Infringement of U.S. Pat. No. 10,154,869 and U.S. Pat. No. 9,254,240, dated Jun. 30, 2025, 2 pages.
Bestway's Opening Claim Construction Brief in U.S. Pat. No. 9,254,240 Infringement Action, dated Jan. 30, 2017; 22 pages.
Bestway's Opening Markman Brief in action for False Advertising, Unfair Competition, and Infringement of U.S. Pat. No. 10,154,869 and U.S. Pat. No. 9,254,240, dated Apr. 14, 2023, 32 pages.
Bestway's Opposition to Intex's Motion for Partial Summary Judgment of Infringement and Estoppel in U.S. Pat. No. 9,254,240 Infringement Action, dated Sep. 11, 2023, 30 pages.
Bestway's Reply Brief in Support of Motion for Leave to Amend Invalidity Contentions in U.S. Pat. No. 9,254,240 Infringement Action, dated Jun. 10, 2022, 15 pages.
Bestway's Reply in Support of Its Motion for Leave to Amend Answer to Include Unclean Hands Affirmative Defense in in action for False Advertising, Unfair Competition, and Infringement of U.S. Pat. No. 10,154,869 and U.S. Pat. No. 9,254,240, dated Aug. 7, 2024, 14 pages.
Bestway's Reply in Support of Motion for Summary Judgment (Non-Infringement and No Willful Infringement) and Partial Summary Judgment (Simex Estoppel) in U.S. Pat. No. 9,254,240 Infringement Action, dated Sep. 25 2023, 15 pages.
Bestway's Reply in Support of Motion to Amend Answer and Invalidity Contentions in action for False Advertising, Unfair Competition, and Infringement of U.S. Pat. No. 10,154,869 and U.S. Pat. No. 9,254,240, dated Jun. 16, 2025, 14 pages.
Bestway's Reply to Intex's Preliminary Response in Inter Partes Review of U.S. Pat. No. 10,165,869, dated Dec. 31, 2020; 14 pages.
Bestway's Reply to Intex's Response in Inter Partes Review of U.S. Pat. No. 9,901,186, dated Sep. 3, 2021; 32 pages.
Bestway's Reply to Intex's Response in Post Grant Review of U.S. Pat. No. 9,254,240, dated Nov. 13, 2017; 25 pages.
Bestway's Reply to Intex's Response to the Appeal in Invalidity Proceeding of EP 2674070, dated Dec. 9, 2025; 65 pages.
Bestway's Responsive Claim Construction Brief in U.S. Pat. No. 9,254,240 Infringement Action, dated Feb. 13, 2017, 23 pages.
Bestway's Statement of Uncontroverted Facts in Support of Motion for Summary Judgment (Non-Infringement and No Willful Infringement) and Partial Summary Judgment (Simex Estoppel) in U.S. Pat. No. 9,254,240 Infringement Action, dated Aug. 18, 2023, 11 pages.
Bestway's Supplemental Claim Construction Brief in U.S. Pat. No. 9,254,240 Infringement Action, dated Sep. 8, 2020, 27 pages.
Bestway's Supplemental Demonstratives, Oral Hearing, Grounds 2 and 3, on Aug. 1, 2018 in Post Grant Review of U.S. Pat. No. 9,254,240; 24 pages.
Bestway's Supplemental Reply in Post Grant Review of U.S. Pat. No. 9,254,240, dated Jul. 12, 2018; 29 pages.
Bestway's Supplemental Responsive Claim Construction Brief in U.S. Pat. No. 9,254,240 Infringement Action, dated Oct. 1, 2020, 14 pages.
Complaint for False Advertising, and Unfair Competition, Ex. 1005, in Inter Partes Review of U.S. Pat. No. 9,901,186, filed Oct. 4, 2019; 16 pages.
Decision Denying Request for Rehearing, entered Jun. 20, 2017, Exhibit 1009, in Inter Partes Review of U.S. Pat. No. 9,254,240; 6 pages.
Declaration of Ali M. Sadegh, Ph.D., dated Feb. 6, 2017, Exhibit 2005, in Inter Partes Review of U.S. Pat. No. 9,156,203; 138 pages.
Declaration of Ali M. Sadegh, Ph.D., dated Jun. 27, 2017, Exhibit 1011, in Inter Partes Review of U.S. Pat. No. 9,254,240; 130 pages.
Declaration of J. DeAmicis in Support of Intex's Opposition to Bestway's Emergency Motion (Ex Parte Application) for Leave to Amend Answer and Invalidity Contentions in U.S. Pat. No. 9,254,240 Infringement Action, dated May 19, 2025, 5 pages.
Declaration of O. F. Ennis in Support of Bestway's Motion for Leave to Amend Answer to Include Unclean Hands Affirmative Defense in action for False Advertising, Unfair Competition, and Infringement of U.S. Pat. No. 10,154,869 and U.S. Pat. No. 9,254,240, dated Jul. 17, 2024, 4 pages.
Declaration of R. Dodge in Support of (1) Intex's Notice and Motion for Partial Summary Judgment of Infringement and Estoppel; (2) Intex's Notice of Motion to Exclude Bestway's Expert Opinions; and (3) Intex's Notice and Consolidated Motion to Strike in U.S. Pat. No. 9,254,240 Infringement Action, dated Aug. 18, 2023, 11 pages.
Declaration of R. Dodge in support of Intex's Motion for Leave to Amend Its Infringement Contentions in U.S. Pat. No. 9,254,240 Infringement Action, dated Jun. 8, 2021, 4 pages.
Declaration of R. Dodge in Support of Intex's Opening Markman Brief in action for False Advertising, Unfair Competition, and Infringement of U.S. Pat. No. 10,154,869 and U.S. Pat. No. 9,254,240, dated Apr. 14, 2023, 5 pages.
Declaration of R. Dodge in Support of Intex's Opposition to Bestway's Motion for Leave to Amend Its Invalidity Contentions in U.S. Pat. No. 9,254,240 Infringement Action, dated May 27, 2022, 4 pages.
Declaration of R. Dodge in Support of Intex's Responsive Markman Brief in action for False Advertising, Unfair Competition, and Infringement of U.S. Pat. No. 10,154,869 and U.S. Pat. No. 9,254,240, dated May 5, 2023, 2 pages.
Declaration of R. Dodge in support of Intex's Responsive Markman Brief in U.S. Pat. No. 9,254,240 Infringement Action, dated Oct. 1, 2020, 3 pages.
Declaration of S. A. Caloiaro in Support of Bestway's Emergency Motion (Ex Parte Application) for Leave to Amend Answer and Invalidity Contention in action for False Advertising, Unfair Competition, and Infringement of U.S. Pat. No. 10,154,869 and U.S. Pat. No. 9,254,240, dated May 17, 2025, 3 pages.
Declaration of S. A. Caloiaro in Support of Bestway's Motion for Leave to Amend Answer and Invalidity Contentions in U.S. Pat. No. 9,254,240 Infringement Action, dated May 24, 2025, 4 pages.
Declaration of S. A. Caloiaro in Support of Bestway's Opening Markman Brief in action for False Advertising, Unfair Competition, and Infringement of U.S. Pat. No. 10,154,869 and U.S. Pat. No. 9,254,240, dated Apr. 14, 2023, 4 pages.

(56) References Cited

OTHER PUBLICATIONS

Declaration of S. A. Caloiaro in support of Bestway's Supplemental Responsive Claim Construction Brief in U.S. Pat. No. 9,254,240 Infringement Action, dated Oct. 1, 2020, 2 pages.
Declaration of S. Caloiaro in Support of Bestway's Motion for Leave to Amend Its Invalidity Contentions in U.S. Pat. No. 9,254,240 Infringement Action, dated May 6, 2022, 4 pages.
Declaration of S. Caloiaro in Support of Bestway's Motion for Summary Judgment (Non-Infringement and No Willful Infringement) and Partial Summary Judgment (Simex Estoppel) in U.S. Pat. No. 9,254,240 Infringement Action, dated Aug. 18, 2023, 4 pages.
Declaration of S. Caloiaro in Support of Bestway's Opposition to Intex's Motion for Partial Summary Judgment of Infringement and Estoppel in U.S. Pat. No. 9,254,240 Infringement Action, dated Sep. 11, 2023, 3 pages.
Auxiliary Request 4.3Y3, dated Apr. 22, 2026, in opposition of European Patent No. 3572600; 3 pages.
Communication from the Opposition Division regarding Outcome of Oral Proceedings, dated Apr. 21, 2026, in Opposition Against European Patent No. 3572600; 5 pages.
Ex Parte Quayle Action as issued by the U.S. Patent Office, dated Feb. 11, 2026, in U.S. Appl. No. 17/848,442; 7 pages.
Non-Final Office Action as issued by the U.S. Patent Office, dated Jan. 14, 2026, in U.S. Appl. No. 19/318,878; 23 pages.
Petitioner's Submission in Preparation for Oral Proceedings, dated Apr. 17, 2026, in Opposition Against European Patent No. 3572600; 14 pages.
Response to Communication pursuant to Article 94(3) EPC, dated Apr. 21, 2026, in European Patent Application No. 24191120.5; 5 pages.
Response to Non-Final Office Action filed with the U.S. Patent Office, dated Apr. 14, 2026, in U.S. Appl. No. 19/318,878; 15 pages.
Response to Restriction Requirement filed with the U.S. Patent Office on Apr. 9, 2026, in U.S. Appl. No. 19/318,988; 7 pages.
Restriction Requirement as issued by the U.S. Patent Office, dated Apr. 3, 2026, in U.S. Appl. No. 19/318,988; 6 pages.
Summary of Lack-of-Inventive-Step asserted by Petitioner, dated Apr. 22, 2026, in opposition of European Patent No. 3572600; 4 pages.
Examination Report issued by the Indian Patent Office, dated Apr. 17, 2026, in Indian Patent Application No. 202218024920; 7 pages.
Final Office Action issued by the U.S. Patent Office, dated May 6, 2026, in U.S. Appl. No. 19/318,878; 19 pages.
Notice of Allowance issued by the U.S. Patent Office, dated Apr. 28, 2026, in U.S. Appl. No. 18/532,903; 9 pages.
Supplemental Amendment filed with the U.S. Patent Office, dated Feb. 6, 2026, in U.S. Appl. No. 17/848,442; 13 pages.
Non-Final Office Action issued by the U.S. Patent Office, dated May 12, 2026, in U.S. Appl. No. 19/318,988; 15 pages.
Notice of Allowability issued by the U.S. Patent Office, dated Jun. 9, 2026, in U.S. Appl. No. 18/532,903; 2 pages.
Examination Report issued by the European Patent Office dated Jun. 2, 2026, in European Patent Application No. 24191120.5; 6 pages.
Applicant-Initiated Interview Summary, U.S. Appl. No. 19/318,988, dated Jul. 29, 2026, 3 pages.
Applicant-Initiated Interview Summary, U.S. Appl. No. 17/848,442 dated Jul. 2, 2026, 3 pages.
Preliminary Amendment filed with the U.S. Patent Office, dated Aug. 2, 2026, in U.S. Appl. No. 18/532,903; 5 pages.
Notice of Allowance, U.S. Appl. No. 18/532,903, dated Aug. 3, 2026, 8 pages.
Preliminary Amendment, U.S. Appl. No. 18/532,903, dated Aug. 2, 2026, 5 pages.
Response to Quayle Action, U.S. Appl. No. 17/848,442, dated Aug. 10, 2026, 17 pages.

* cited by examiner

INTERNAL TENSIONING STRUCTURE USEABLE WITH INFLATABLE DEVICES

CROSS REFERENCE TO RELATED APPLICATIONS

This application is a continuation of U.S. Patent Application Ser. No. 18/532,903, filed Dec. 7, 2023; which is a continuation of U.S. patent application Ser. No. 17/889,684, filed Aug. 17, 2022, now abandoned; which is a continuation of U.S. patent application Ser. No. 16/935,964, filed Jul. 22, 2020, now abandoned; which is a continuation of U.S. patent application Ser. No. 15/581,638, filed Apr. 28, 2017, now abandoned; which is a continuation of U.S. Patent Application Ser. No. 14/444,453, filed Jul. 28, 2014, now U.S. Pat. No. 9,802,359, which is a continuation of PCT Application Serial No. PCT/US2012/042079, filed Jun. 12, 2012, which claims priority to Chinese Patent Application Serial No. 201210053143.X, filed Mar. 2, 2012, Chinese Patent Application Serial No. 201210053146.3, filed Mar. 2, 2012, Chinese Patent Application Serial No. 201220075738.0, filed Mar. 2, 2012, and Chinese Patent Application Serial No. 201220075742.7, filed Mar. 2, 2012, the disclosures of which are expressly incorporated by reference herein.

BACKGROUND

1. Technical Field

The present disclosure relates to an inflatable product structure, and in particular to an inflatable product structure which is light in weight and low in cost.

2. Description of the Related Art

Inflatable products, are light in weight, easy to house, and easy to carry. Such products technologies have been used for outdoor items and toys, as well as various household goods including inflatable beds, inflatable sofas and the like.

Many inflatable products utilize internal structures in order to form the product into its intended, predetermined shape upon inflation. For example, one type of inflatable bed, referred to as a wave-shaped, straight-strip or I-shaped inflatable bed, may include a tension-band type internal structure arranged along wave-shaped, straight-line or I-shaped pathways within the internal cavity. Another type of inflatable bed, referred to as a column-type inflatable bed, has tension bands arranged into honeycomb-shaped or cylindrical structures within the inflatable cavity.

These internal tension-band structures disposed in the cavity of the inflatable bed give shape to the bed as internal pressure increases, thereby preventing the inflatable bed from expanding evenly on all sides in the manner of a balloon. More particularly, in order to maintain an inflatable bed as a rectangular shape, the tension bands join the upper and lower surfaces of the inflatable bed to one another. To allow passage of pressurized air to both sides of these joining structures, the tension bands may be formed as belts stretching between the upper and lower surfaces, or as vertical expanses of material with air columns formed therein. The number and spacing of the tension bands is proportional to the sharpness of the rectangularity of the inflated product. That is to say, a greater number and/or linear extent of tension bands within the pressurized cavity results in a more "flat" bed surface.

In conventional inflatable products such as the inflatable beds described above, the tension bands are made of PVC sheets with a sufficient thickness to ensure spreading of force and concomitant reductions in stress in the product material. For example, the tension bands of known inflatable beds or sofas may have a thickness of about 0.36 mm. For some known water carrier devices, such as inflatable swimming pools, the internal tension bands may have a thickness of about 0.38 mm, while "sandwich" type inflatable swimming pools may have a thickness of 0.7-0.8 mm.

Thus, conventional inflatable structures utilizing belt- or sheet-like PVC tension bands meet the force requirements of the product by varying the thickness of the tension bands. However, where continuous plastic strips or belts are utilized, such tension bands contribute to increased weight of the inflatable product. Similarly, an increase in thickness and/or spatial density of solid-strip tension bands also increases the compressed/folded volume of the deflated inflatable structure.

SUMMARY

The present disclosure provides an internal tensioning structure for use in an inflatable product, and a method for producing the same. The tensioning structure fulfills the basic function of maintaining two adjacent inflatable surfaces in a desired geometric arrangement when the inflatable product is pressurized. The tensioning structure is formed by connecting a pair of plastic strips sheets via spaced-apart strands, such as strings or wires. When pulled taut, the strands provide a high tensile strength between the two opposed plastic strips. At the same time, the plastic strips facilitate a strong, long-lasting weld between the tensioning structure and the inflatable product.

Various configurations of the tensioning structure are contemplated within the scope of the present disclosure. In one embodiment, a pair of parallel plastic strips has a plurality of strands extending therebetween to connect the plastic strips to one another, with the strands substantially parallel to one another and substantially perpendicular to the plastic strips. In another embodiment, a similar arrangement of two parallel plastic strips are connected by a plurality of strands with each adjacent pair of such strands converging to a point at one of the plastic strips in a "V" configuration. Either embodiment may be incorporated into a tensioning structure with one of a number of geometric arrangements within the inflatable cavity, such as linear, cylindrical, wave-shaped, etc.

According to one embodiment thereof, the present disclosure provides an inflatable product comprising: a first sheet and a second sheet disposed opposite the first sheet, the first and second sheets spaced apart to define a gap when the inflatable product is inflated. The inflatable product further includes a tensioning structure having a gap portion spanning the gap between the first sheet and the second sheet to maintain a spatial relationship between the first and second sheets when the inflatable product is inflated. The gap portion has an extent measured along the surface of at least one of the first sheet and the second sheet. The gap portion occupies a volume and has an operable area occupied by gap portion of the tensioning structure defined as the total area of the gap between the first sheet and the second sheet, as measured along the extent of the gap portion of the tensioning structure. The gap portion of the tensioning structure defines an operable area-to-volume ratio of at least 10 square millimeters per cubic millimeter.

According to another embodiment thereof, the present disclosure provides an inflatable product comprising: a first sheet and a second sheet disposed opposite the first sheet.

The first and second sheets are spaced apart to define a gap when the inflatable product is inflated. The inflatable product further includes a tensioning structure having a gap portion spanning the gap between the first sheet and the second sheet to maintain a spatial relationship between the first and second sheets when the inflatable product is inflated. The gap portion has an extent measured along the surface of at least one of the first sheet and the second sheet. The gap portion has an operable area occupied by gap portion of the tensioning structure defined as the total area of the gap between the first sheet and the second sheet, as measured along the extent of the gap portion of the tensioning structure. The gap portion of the tensioning structure has a total weight such that the tensioning structure defines an operable area-to-weight ratio of at least 6,000 square centimeters per kilogram.

According to another embodiment thereof, the present disclosure provides an inflatable product comprising: a first sheet and a second sheet disposed opposite the first sheet. The first and second sheets are spaced apart to define a gap when the inflatable product is inflated; The inflatable product further comprises a tensioning structure having a gap portion spanning the gap between the first sheet and the second sheet to maintain a spatial relationship between the first and second sheets when the inflatable product is inflated. The gap portion of the tensioning structure has an average thickness of less than 0.125 millimeters.

According to yet another embodiment thereof, the present disclosure provides an inflatable product comprising: a first sheet; a second sheet disposed opposite the first sheet, the first and second sheets spaced apart to define a gap; a tensioning structure spanning the gap between the first sheet and the second sheet, the tensioning structure comprising: a plurality of strands uniformly spaced apart and arranged substantially parallel to one another; and a plurality of weld strips spaced apart from one another and substantially perpendicular to the plurality of strands, each of the plurality of weld strips affixed to each of the plurality of strands, and each of the plurality of weld strips affixed to at least one of the first sheet and the second sheet.

According to still another embodiment thereof, the present disclosure provides an inflatable product comprising: a first sheet; a second sheet disposed opposite the first sheet, the first and second sheets spaced apart to define a gap; a tensioning structure spanning the gap between the first sheet and the second sheet, the tensioning structure comprising: a plurality of strands uniformly spaced apart and arranged in parallel; and a first weld sheet having the plurality of strands affixed to an upper surface of the first weld sheet.

According to still another embodiment thereof, the present disclosure provides an inflatable product comprising: a first sheet; a second sheet disposed opposite the first sheet, the first and second sheets spaced apart to define a gap; a tensioning structure spanning the gap between the first sheet and the second sheet, the tensioning structure comprising: an upper weld strip; a lower weld strip arranged substantially parallel to the upper weld strip and spaced apart from the upper weld strip span the gap between the first sheet and the second sheet; and a plurality of end-to-end V-shaped strands arranged between weld strips, each of the V-shaped strands having upper and lower ends fixed to the upper and lower weld strips, respectively.

According to still another embodiment thereof, the present disclosure provides an inflatable product comprising: a first sheet; a second sheet disposed opposite the first sheet, the first and second sheets spaced apart to define a gap, the first sheet and the second sheet cooperating to at least partially bound an inflatable chamber; a plurality of tensioning structures welded to respective inner surfaces of the first and second sheets such that the plurality of tensioning structure span the gap, each of the plurality of tensioning structures comprising: an upper weld strip affixed to one of the first sheet and the second sheet; a lower weld strip affixed to the other of the first sheet and the second sheet; and a plurality of strands connecting the upper and lower weld strips to one another.

According to still another embodiment thereof, the present invention provides an inflatable product comprising: a first sheet; a second sheet disposed opposite the first sheet, the first and second sheets spaced apart to define a gap, the first sheet and the second sheet cooperating to at least partially bound an inflatable chamber; a plurality of tensioning structures welded to inner surfaces of the first and second sheets such that the plurality of tensioning structures span the gap, each of the plurality of tensioning structures comprising: a weld sheet; a plurality of strands, and the plurality of strands substantially evenly spaced and arranged substantially parallel to one another, the plurality of strands affixed to the weld sheet; and a weld strip affixed to each end of the weld sheet such that a longitudinal extent of the weld strip is substantially perpendicular to the plurality of strands, respective ends of the plurality of strands are affixed to the weld strip, and each of the weld strips are welded to one of the first sheet and the second sheet.

According to still another embodiment thereof, the present invention provides a method for producing a tensioning structure of an inflatable product, the method comprising: arranging at least one of a welder and an adhesive device downstream of a strand guide; supplying a plurality of strands to the welder or the adhesive device via the strand guide, such that the supplied strands are substantially uniformly spaced apart and arranged substantially parallel to one another; positioning weld strips on a first die of the welder or gluing device, the weld strips having a longitudinal extent corresponding to an overall width of the plurality of strands; advancing a second die of the welder or gluing device into an operable position in which the first and second dies are disposed at opposing sides of the weld strips, activating the welder or gluing device to fixedly connect the weld strips to the plurality of strands, such that the weld strips are affixed to the plurality of strands in a spaced apart and substantially parallel arrangement, and such that the weld strips are substantially perpendicular to the plurality of strands.

According to still another embodiment thereof, the present invention provides a method for producing a tensioning structure of an inflatable product comprises: arranging a hot roller downstream of a strand guide; supplying a plurality of strands to the hot roller via the strand guide, such that the supplied strands are substantially uniformly spaced apart and arranged substantially parallel to one another; arranging a conveying roller downstream of the strand guide, the conveying roller operable to deliver at least one weld sheet to the hot roller, the at least one weld sheet having a width corresponding to an overall width of the plurality of strands; and passing the plurality of strands and the at least one weld sheet through the hot roller, such that the plurality of strands become affixed to the at least one weld sheet.

According to still another embodiment thereof, the present invention provides a method for producing a tensioning structure, the method comprising: arranging a first pair of weld strips parallel to one another on a joining device; wrapping at least one continuous strand around a plurality of members arranged along a pair of rows adjacent the first pair of weld strips, respectively, each of the pair of rows of members offset with respect to the other of the pair of rows of members, the step of wrapping comprising alternating between the pair of rows, such that the at least one continuous strand forms a plurality of end-to-end V-shaped strands; and using the joining device to join the first pair of weld strips to the plurality of strands at respective V-shaped corners formed by the at least one continuous strand, such that the tensioning structure has a tensile strength along a direction perpendicular to a longitudinal extent of the first pair of weld strips.

BRIEF DESCRIPTION OF THE DRAWINGS

The above mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the present invention, and such exemplifications are not to be construed as limiting the scope of the invention in any manner.

DETAILED DESCRIPTION

The present disclosure provides tensioning structures which give shape to inflatable devices, such as inflatable couches, beds or swimming pools. The tensioning structures are lightweight and occupy minimal volume when the device is deflated and packed away, while also functioning as a strong and durable internal support upon inflation and use of the inflatable device.

An exemplary tensioning structure in accordance with the present disclosure utilizes thin and flexible string- or wire-like strands which join two areas of fabric to one another. The strands are firmly connected to the adjacent fabric via an intermediate material, such as a strip or sheet, and the intermediate material is in turn firmly connected to the fabric. The area of contact between intermediate material and the attached strands may be manipulated to impart a connection strength commensurate with the tensile strength of the strand. Similarly, the area of contact between the intermediate material and the adjacent fabric may also be manipulated to impart a fabric/tensioning structure connection strength commensurate with the aggregate tensile strength of all strands in the tensioning structure.

Various tensioning structures and methods of manufacturing the same are described in detail below. It is contemplated that any of the present described tensioning structures may be used in any inflatable product, either alone, as a group or in combination with one another as required or desired for a particular design. In addition, it is contemplated that tensioning structures in accordance with the present disclosure can be used in other contexts, such as in camping equipment, or in any other context where a lightweight, packable structure is needed to join two pieces of material that are urged away from one another in use.

1. Weld Strips Joined by Spaced-Apart Strands

Figure 1:
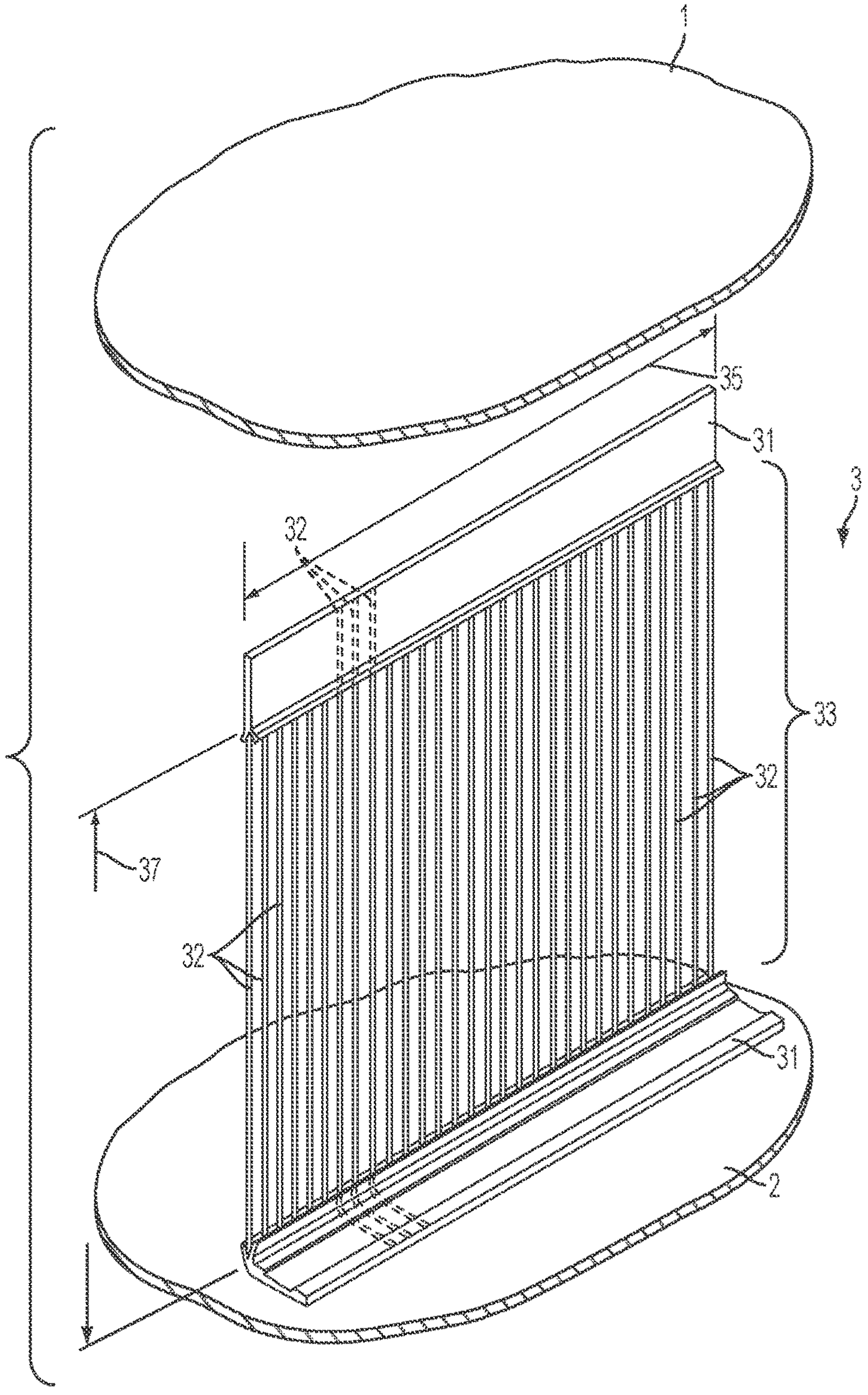
FIG. 1 is an exploded, perspective view of an inflatable structure incorporating a tensioning structure made in accordance with the present disclosure.
Figure 2:
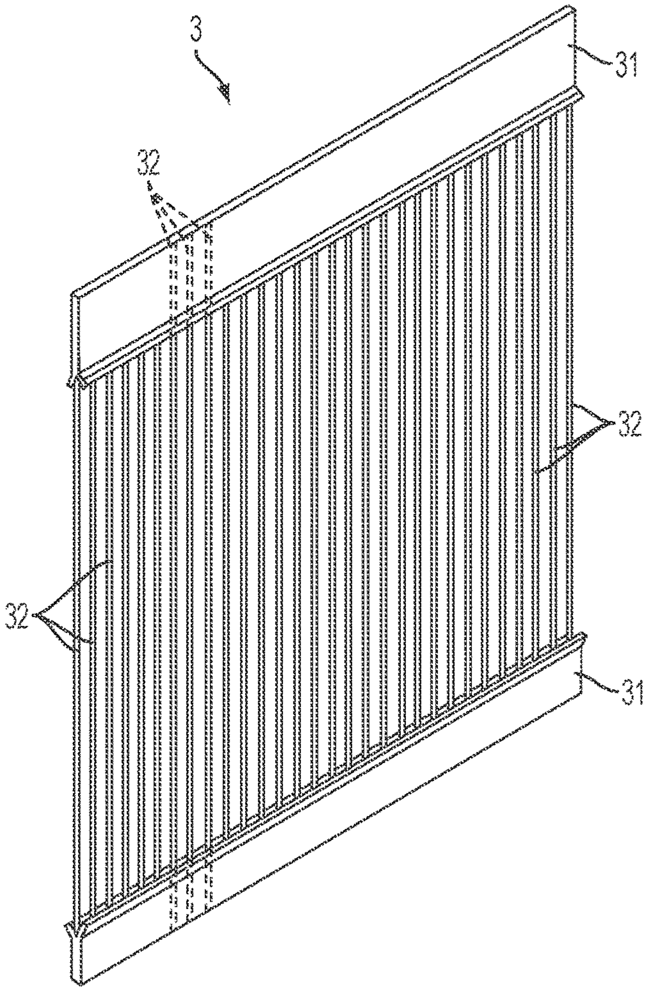
FIG. 2 is an enlarged perspective view of the tensioning structure shown in FIG. 1.

Turning now to FIGS. 1 and 2, tensioning structure 3 is shown joining upper material 1 to lower material 2. In the illustrated embodiment, tensioning structure 3 includes upper and lower weld strips 31 connected to one another by a plurality of substantially parallel strands 32 that define a gap portion extending between a gap between upper and lower sheets 1, 2. The upper and lower weld strips 31 are in turn welded to the upper material 1 and the lower material 2, respectively, such that forces urging upper and lower materials 1, 2 are encountered by tension in strands 32.

Optionally, reinforcing strands 5 (FIG. 3) may be provided along the longitudinal extent of weld strip 31 (i.e., substantially perpendicular to strands 32). Reinforcing strands 5, when provided, may be coupled to tensile strands 32, such as by folding strands 32 over reinforcing strands 5, tying strands 5, 32 to one another, or adhesively securing strands 5, 32 to one another. When so coupled, reinforcing strands 5 provide additional surface area contact with weld strips 31 and thereby improve the resistance of securing strands 5 to pulling free from weld strips 31. In addition, the presence of reinforcing strands 32 within weld strips 31 improves the tensile strength of weld strips 31 along their longitudinal extents.

The plurality of strands 32 in the tensioning structure 3 as shown in FIGS. 1 and 2 are arranged such that the strands 32 are substantially parallel to one another when strands 32 are pulled taut (i.e., when weld strips 31 are drawn away from one another). In addition, adjacent pairs of strands 32 may have even intervals therebetween, such that a substantially constant tensile strength of tensioning structure 3 is maintained across the longitudinal extent of weld strips 31. In an exemplary embodiment, strands 32 may extend along the entire width of weld strips 31, as illustrated in FIGS. 1 and 2, such that a large area of contact between strands 32 and weld strips 31 is achieved. For clarity, FIGS. 1 and 2 illustrate only a limited number of strands 32 affixed to strips 31 in this way, it being appreciated that all strands 32 in a tensioning structure 3 may be so affixed.

Figure 3:
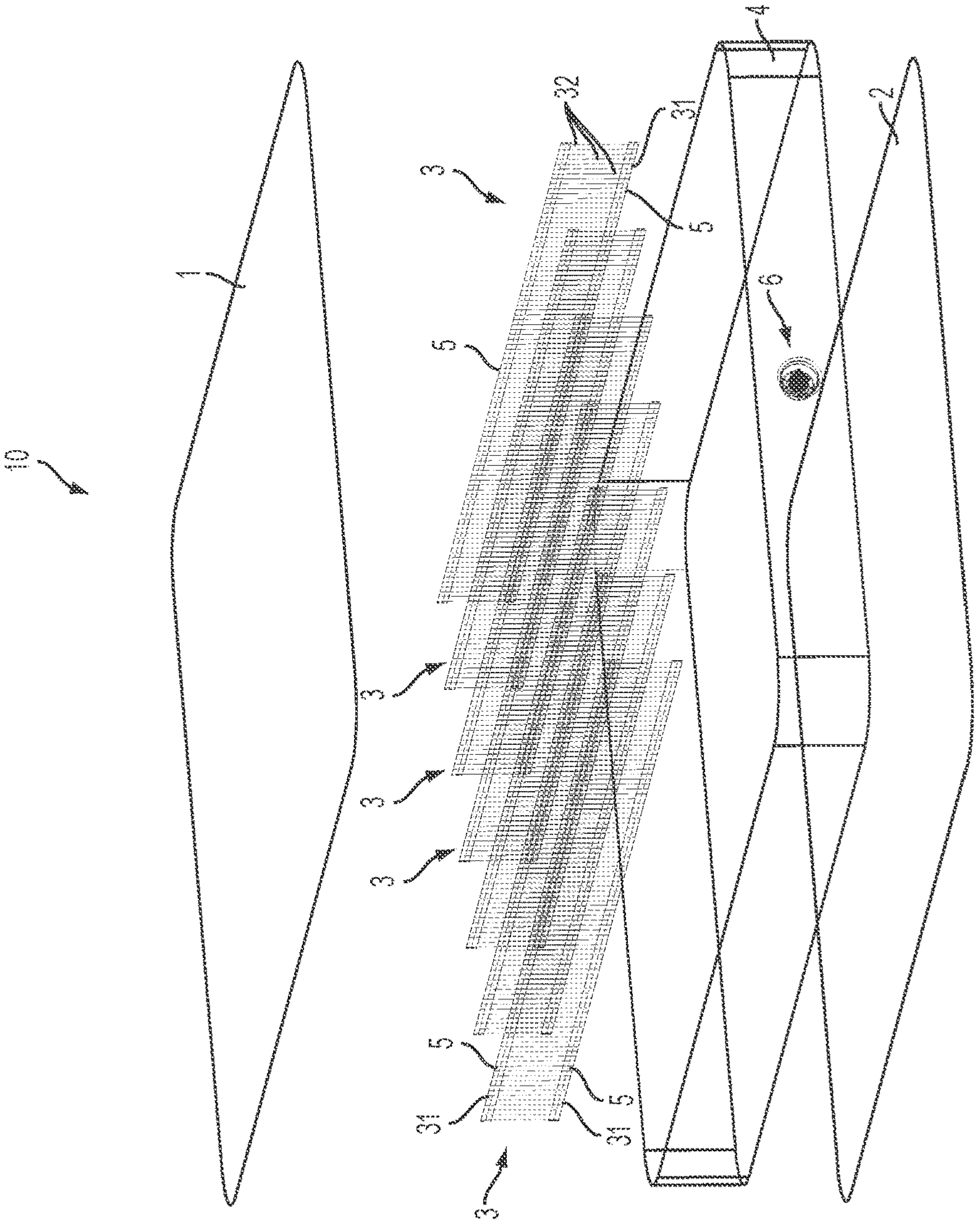
FIG. 3 is an exploded, perspective view of an inflatable bed incorporating tensioning structures made in accordance with the present disclosure.
Figure 4:
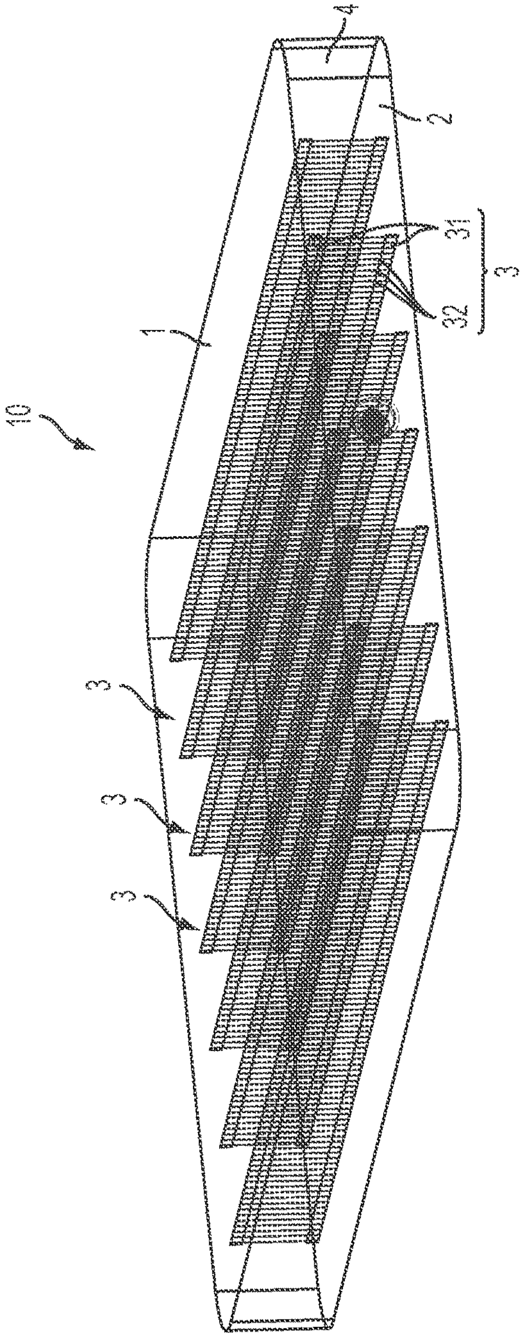
FIG. 4 is an assembled view of the inflatable bed of FIG. 3, in which the inflatable bed material is made transparent to show the internal arrangement of the tensioning structures.

In one exemplary application shown in FIGS. 3 and 4, a number of tensioning structures 3 are used in an inflatable structure such as air mattress 10, which includes a sleeping surface at upper material 1 and a ground-contacting surface at lower material 2. Annular side band 4 is fixedly connected or welded to the peripheries of the upper material 1 and the lower material 2 to form an inflatable chamber. A valve 6 may be provided to facilitate inflation and deflation of the mattress 10.

Although mattress 10 is shown as a single layer, double layers may also be provided. Additional mattress features may also be provided such as those shown in U.S. Pat. No. 7,591,036 titled Air-Inflated Mattress, the entire disclosure of which is expressly incorporated by reference herein. In addition to mattresses, tensioning structure may be used in other inflatable products such as inflatable boats, inflatable islands, floatation devices, swimming pools, inflatable slides, and any other inflatable devices.

Each of the plurality of tensioning structures 3 is welded to respectively opposed portions of the inner surfaces of upper and lower materials 1, 2, as described in detail above. As shown in FIGS. 3 and 4, the tensioning structure 3 of the illustrated embodiment defines an overall longitudinal extent (that is, along the longitudinal direction of weld strips 31) corresponding to the width or length of the sleeping and ground-contacting materials 1, 2 of mattress 10.

As noted above, tensioning structures 3 are connected to upper and lower material 1, 2 by weld strips 31. Such welding is accomplished by abutting one of weld strips 31 to one of upper and lower materials 1, 2 and then applying heat to melt and fuse the material of weld strips 31 to the abutting material. In an exemplary embodiment, weld strips 31 and upper and lower material 1, 2 are both made of PVC, and the welding process is accomplished by applying 105 degree Celsius heat for approximately 0.5 seconds. Upper and lower sheets 1, 2 and weld strips 31 have thicknesses ranging from 0.15 to 1.0 millimeters with 0.34 millimeters being preferred for upper and lower sheets 1, 2 and 0.18 millimeters being preferred for weld strips 31. Weld strips 31 are preferably 12.7 millimeters wide and may range from 1 to 100 millimeters wide. The PVC used preferably has a tensile strength ranging from at least 7 kgf/cm to 73 kgf/cm and a density ranging from 0.8-2.5 grams per centimeter cubed with a preferred density of 1.5 grams per centimeter cubed.

Figure 5:
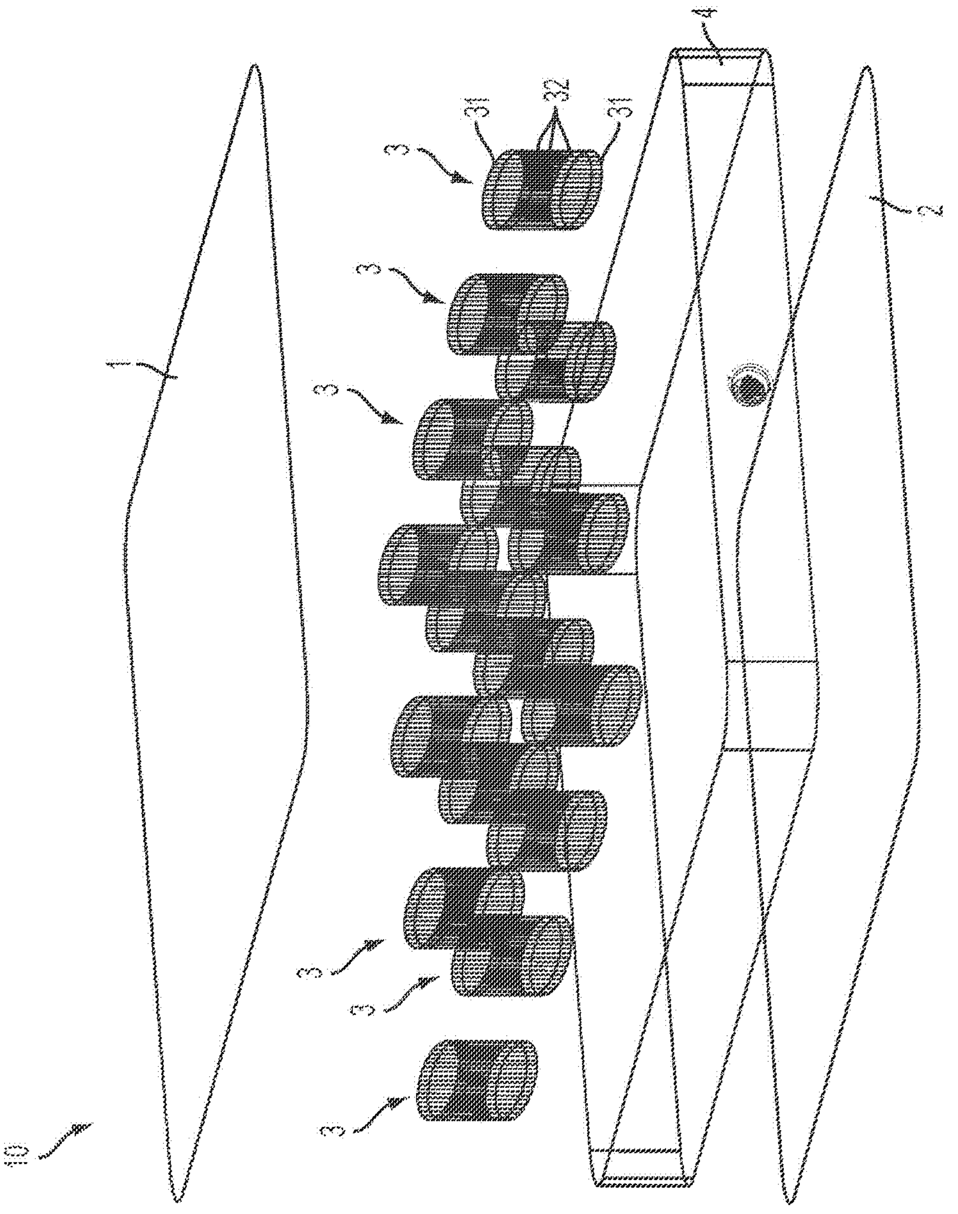
FIG. 5 is an exploded, perspective view of an inflatable bed incorporating an alternative geometric arrangement of tensioning structures made in accordance with the present disclosure.
Figure 6:
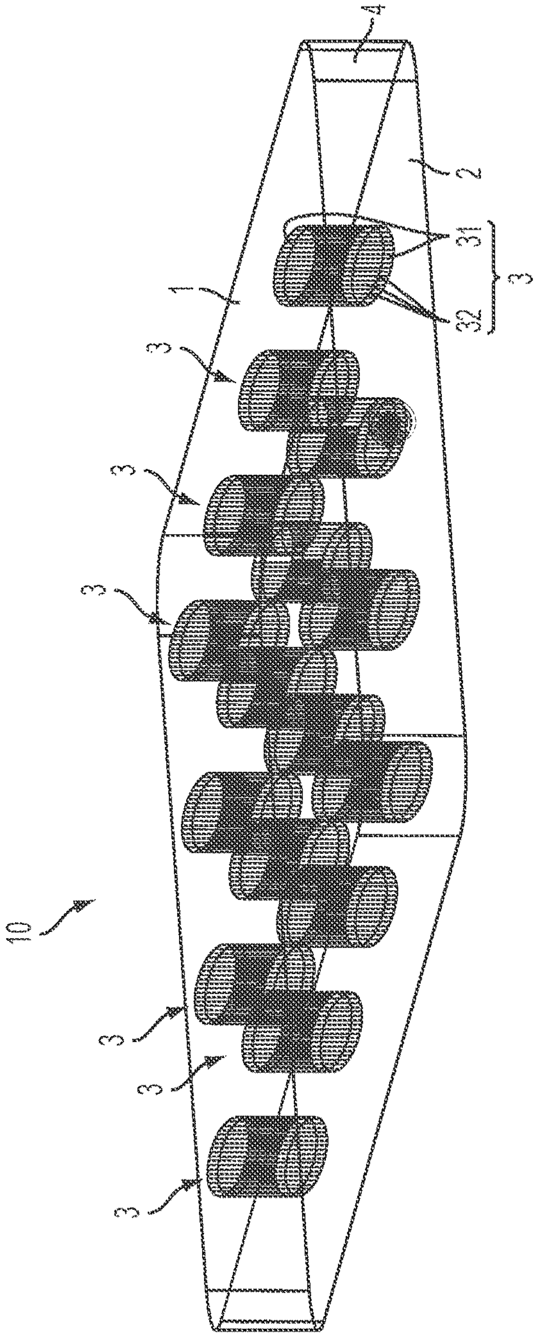
FIG. 6 is an assembled view of the inflatable bed of FIG. 5, in which the inflatable bed material is made transparent to show the internal spatial arrangement of the tensioning structures.

In FIGS. 3 and 4, tensioning structures 3 are welded to upper and lower material 1, 2 along a substantially linear path, with the plurality of structures 3 substantially parallel to one another and equally spaced across materials 1, 2. However, it is contemplated that the welding geometry may take any other suitable geometry, such as a wave-like path, I-shaped path, Z-shaped path or V-shaped path. One exemplary alternative geometry is a cylindrical or columnar arrangement, as illustrated in FIGS. 5 and 6. In this arrangement, upper and lower weld strips 31 are each connected at their ends in an end-to-end manner to form an arcuate ring, such as a circular ring as illustrated. The plurality of strands 32 between the upper and lower weld strips 31 thus form a closed columnar periphery, thereby forming the body of a column. Upon assembly of inflatable bed 10, this column is welded to upper and lower materials 1, 2 in a similar fashion as described herein with respect to linearly arranged tensioning structure 3.

When mattress 10 is inflated, the introduction of pressurized air into the cavity of mattress urges upper and lower materials 1, 2 apart from one another. When sufficiently pressurized, strands 32 become taut and tensioning structures 3 prevent any further spreading apart of upper and lower materials 1, 2 in the vicinity of each tensioning structure 3. Further pressurization causes further tensile stress within tensioning structures 3, and additional forces on the weld between tensioning structures 3 and the adjacent material.

In an exemplary embodiment of mattress 10, tensioning structure 3 includes as few as one strand every two centimeters, 1, 2, 3, 4, strands per centimeter of longitudinal extent of weld strips 31, or as much as 5, 10, 15, 20, 30, 40, 50, or more strands per centimeter, or may have any number of strands per centimeter within any range defined by any of the foregoing values. According to the preferred embodiment, there is about 2.8 millimeters between strands (i.e., 3.6 strands per centimeter). Strands 32 may be made of regular cotton, polyester, nylon thread made of multiple filaments twisted together, of the type typically used in clothing seams, or any other strand types. These regular threads provide substantial tensile strength at a very low cost. According to alternative embodiments, strands 32 may be woven together to form a fabric. According to another embodiment, non-woven fabric may be used to form the portion of tensioning structure 3 extending through the gap between sheets 1, 2.

According to the present disclosure, the threads may range from diameters of 0.1 to 1.0 millimeters. According to the preferred embodiment, the thread has a diameter of 0.2 millimeters. According to the present disclosure, the tensile strength of the threads may range from 0.2 kgf to 10 kgf per thread. According to the preferred embodiment, the tensile strength of the thread is 3 kgf per thread. According to the preferred embodiment, the threads have a density range from 0.01 to 0.3 grams per meter. According the preferred embodiment, the threads are 0.085 grams per meter. Of course, it is appreciated that other materials could be used, such as monofilament lines, metal wires or cables, plastic and the like.

The above-described exemplary arrangement of tensioning structure 3 yields a strong finished product suitable for use in a wide variety of inflatable products. In exemplary embodiments, tensioning structure 3 has strands 32 with an overall axial span between 5 centimeters and 65 centimeters, rendering strands 32 suitable to span a correspondingly sized gap formed between the spaced-apart weld strips 31. Therefore, this exemplary embodiment is suitable for use in mattress 10 having an inflated thickness approximately equal to the axial span of strands 32. This exemplary embodiment further uses the regular thread material noted above with a strand density in the ranges given above. The resulting exemplary tensioning structure 3 has an overall tensile strength between 5.9 and 23.3 kgf per linear centimeter (where linear centimeters are measured along the longitudinal extent of weld strips 31).

When mattress 10 is inflated, tensioning structure defines an operable area along its longitudinal extent and across the gap between upper and lower materials 1, 2. More particularly, the area occupied by tensioning structure 3 is defined as the total area of the gap between the material sheets joined by tensioning structure 3, with such gap measured along the longitudinal extent of the tensioning structure such that the measured area is inclusive of each of the plurality of strands 32. Where tensioning structure 3 is linearly arranged and upper and lower materials 1, 2 are parallel to one another (as shown, for example, in FIGS. 3 and 4), this area is simply the longitudinal extent of tensioning structure 3 multiplied by the space between upper and lower materials 1 and 2. Where tensioning structure 3 takes a non-linear path (such as the columnar, arcuate path shown in FIGS. 5 and 6, for example), or upper and lower materials 1 and 2 are non-parallel, the above-described method for measuring area still results in an accurate operable arca.

The above-described exemplary arrangement of tensioning structure 3 achieves high tensile strength while promoting light weight and low packed volume of the finished inflatable product. According to the present disclosure, strands 32 and the area between strands 32 define a gap portion 33 (see FIG. 1) of tensioning structure 3 spanning the gap between upper and lower materials/sheets 1, 2 that maintains a spatial relationship between the first and second sheets when mattress 10 is inflated. As shown in FIG. 1, the collection of strands 32 that define this gap portion 33 having an extent 35 measured along the surface of at least one of first sheet 1 and second sheet 2. Strands 32 of this gap portion 33 of tension structure 3 collectively occupy a volume. Gap portion 33 has an operable area defined by extent 35 of gap portion 33 (also closely approximate to a length of weld strips 31) and length 37 of strands 32. The operable arca is occupied by strands 32 of tensioning structure 3 and defines a total area of the gap between first sheet 1 and second sheet 2, as measured along extent 35 of gap portion 33 of tensioning structure 3. For example, if strands 32 of an example tension structure have a length 37 of 100 millimeters between first and second sheets 1, 2 and extent 35 of gap portion 33 is 100 millimeters, the operable area of gap portion 33 defined by strands 32 is 10,000 square millimeters. Assuming that there are 3.6 strands per centimeter, there will be 3,571 millimeters of strands 32 within the 10,000 square millimeter operable area. If strands 32 have a diameter of 0.2 millimeters, the total volume occupied by strands 32 will be 112.2 millimeters cubed. In this example, gap portion 33 of tensioning structure 3 defines an operable arca-to-volume ratio of 89.13 millimeters squared per millimeters cubed (ex. 10,000 millimeter squared/112.2 millimeters cubed). According to the present disclosure, the operable area-to-volume ratio may range from 10 to 3,000 millimeters squared per millimeter cubed.

Because of use of strands 32 rather than PVC sheets, the overall weight of mattress 10 can also be reduced. Gap portion 33 of tensioning structure 3 defined by strands 32 has a total weight and operable area, as discussed above. In the above example, the operable area was 10,000 square millimeters (100 millimeters by 100 millimeters) and there were 3.6 strands per centimeter. This results in 3,571 millimeters of thread. At a density of 0.085 grams per meter of thread, the total thread will weigh 0.304 grams. As a result, an operable arca-to-weight ratio will be about 32,941 square millimeters per gram (or 329,412 square centimeters per kilogram) in the preferred embodiment (ex. 10,000 square millimeters/0.304 grams). According to some embodiments of the present disclosure, the operable area-to-weight ratio is between 8,000 and 5,000,000 square centimeters per kilogram. According to other embodiments, the operable area-to-weight ratio is between 12,500 and 2,500,000 square centimeters per kilogram. According to other embodiments, the operable area-to-weight ratio is between 20,000 and 1,000,000 square centimeters per kilogram.

Because of use of strands 32 rather than PVC sheets, the average thickness of gap portion 33 of tensioning structure 3 extending between first and second sheets 1, 2 can also be reduced. Gap portion 33 of tensioning structure 3 defined by strands 32 has an average thickness and operable area, as discussed above. The average thickness is reduced by the nominally circular cross section of strands 32 and the gaps between each strand 32.

For example, the maximum thickness of gap portion 33 is the diameter of strands 32 (0.2 millimeters in the above example). The minimum thickness of gap portion 33 is zero in unoccupied areas between strands 32. When averaged over the total area of gap portion 33 occupied by strands 32 and the total area of gap portion 33 without strands 33, the average thickness is less than the diameter of strands 32. Furthermore, if the distance between strands 32 is increased, the average thickness decreases because more of gap portion 33 is unoccupied by strands (i.e., the amount of gap portion 33 with zero thickness increases, which decreases the average thickness of gap portion 33).

In the above example, the operable area was 10,000 square millimeters (100 millimeters by 100 millimeters) and there were 3.6 strands per centimeter (or 2.8 millimeter from strand 32 to strand 32). In contrast to the maximum thickness of a circular thread, which is the diameter, the average thickness of a circular thread is pi*diameter/4. Using strands 32 with a diameter of 0.2 millimeters, results in average thickness of 0.157 millimeters for each strand 32. Because of the gaps between strands 32, the average thickness of gap portion 33 defined by strands 32 and the gaps therebetween is 0.0112 millimeters (i.e. 2.8 millimeters between strands 32 has a thickness of zero, which reduces the average thickness of gap portion 33 to much less than the average thickness of strands 32). According to some embodiments of the present disclosure, the average thickness of the gap portion of tensioning structure 3 is between 0.0003 to 0.1 millimeters. According to other embodiments, the average thickness is between 0.001 and 0.05 millimeters. According to other embodiments, the average thickness is between 0.005 and 0.02 millimeters.

Figure 7:
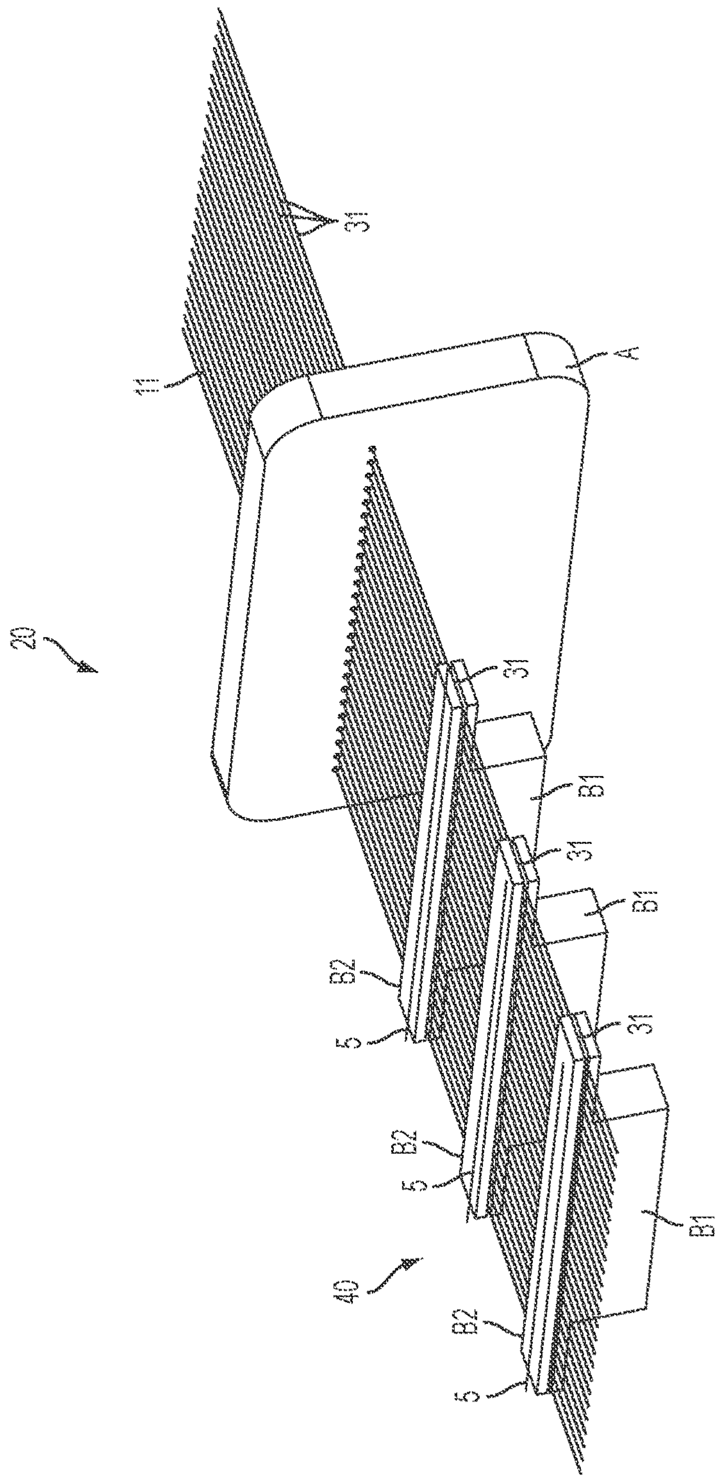
FIG. 7 is a perspective view of an apparatus for producing bulk material for the tensioning structures shown in FIGS. 3-6.

Turning now to FIG. 7, an apparatus 20 suitable for manufacturing tensioning structure 3 is shown. To operate apparatus 20 to this end, a plurality of strands 32 are provided from a bulk thread supply 11, which may be a yarn stand containing several spools of yarn for example. Thread supply 11 continuously delivers the plurality of strands 32 via strand guide A, which includes a plurality of apertures through which individual strands 32 pass after delivery from thread supply 11 and before incorporation into bulk tensioning structure material 30 (shown in FIG. 9 and described below). Strand guide A maintains uniform spacing of strands 32 from one another, and arranges strands 32 parallel to one another such that the plurality of strands 32 are substantially planar. The width of weld strips 31, the distance between neighboring pairs of weld strips 31, and the spacing between neighboring pairs of strands 32 can be set to any values as required or desired by an intended use, such as in a particular inflatable product.

These planar, parallel and even spaced strands 32 are then passed in to welder 40, as shown in FIG. 7. Welder 40 may be a thermofusion device, using heat to join two plastic materials together, or may be a high-frequency welder, in which electromagnetic waves take advantage of excitable chemical dipoles in the plastic material to soften and join the materials to one another. Moreover, any suitable welding method may be employed by welder 40, as required or desired for a particular material and process. Another alternative is to forego a welding process and use adhesive to join strands 32 to weld strips 31. Where adhesive connection is utilized, welder 40 may be replaced by a similarly arranged adhesive device, such as a gluing device. Yet another alternative is to utilize a sewing machine to mechanically join weld strips 31 to strands 32. Moreover, weld strips 31 need not be welded to upper or lower materials 1, 2, and the term "weld strip" as used herein refers to any strip of material suitable for affixation to another material, whether by application of heat, application of adhesive, mechanical joining methods such as sewing and riveting, or any other suitable method.

Weld strips 31, having a length corresponding to the width of the arranged plurality of strands 32, are positioned on lower dies B1 of welder 40. Strands 32 are advanced over weld strips 31 as illustrated, and upper dies B2 are then lowered into contact with weld strips 31. Energy (i.e., heat or electromagnetic waves) is applied to fixedly connect the weld strip 31 with each of the plurality of strands 32 such that the respective strands 32 are fixed in the spaced apart and parallel configuration dictated by strand guide A. When so fixed, bulk material 30 (FIG. 9) is complete and ready for use.

The finished bulk material 30 may then be delivered to a take-up device (not shown), such as a spool or roll. This allows bulk material 30 to be continuously produced and stored for later use. Bulk material 30 can be converted into tensioning structure 3 (FIG. 2) by cutting down the center of weld strip 31. Tensioning structure 3 can then be applied to various inflatable products by trimming the length and width thereof according to the dimensions of the product.

As noted above, reinforcement strand 5 may be added to tensioning structure 3 to further improve the strength thereof, including the tensile strength of weld strips 31. To add at least one reinforcement strand 5 to bulk material 30, reinforcement strands 5 are arranged perpendicular to the plurality of strands 32, and abutting the respective weld strips 31. Upper die B2 of welder 40 is pressed down to fixedly connect the weld strips 31 to both reinforcement strands 5 and the plurality of strands 32, as described above. Reinforcement strands 5 are illustrated in FIG. 3 but omitted from FIG. 4 for clarity.

As shown in FIG. 4, tensioning structures 30 are positioned within band 4 and welded to upper and lower sheet 1, 2. Although shown as perpendicular to sheets 1, 2 in FIG. 4, after welding, weld strips 31 lay flat on sheets 1, 2 after welding as shown in the lower portion of FIG. 1. Similarly, in mattresses 10 of FIGS. 6, 21, 23, and 28, weld strips 31 are shown perpendicular to sheets 1, 2, but will lay flat on sheets 1, 2 upon welding as shown in the lower portion of FIG. 1.

Figure 8:
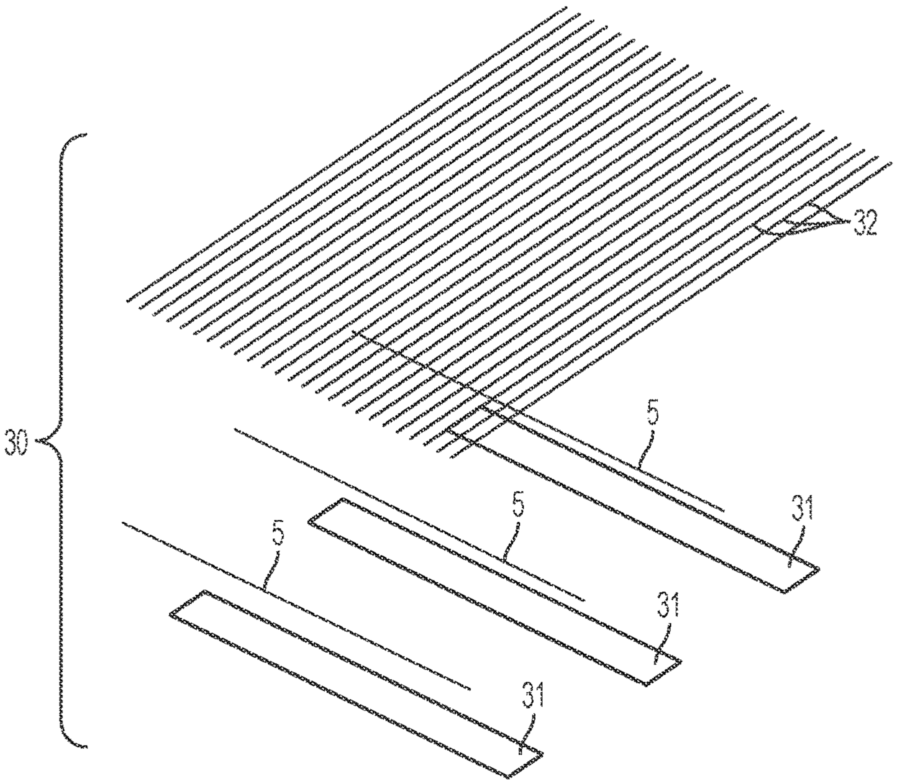
FIG. 8 is an exploded, perspective view showing a first embodiment of the bulk material created by the apparatus of FIG. 7.
Figure 9:
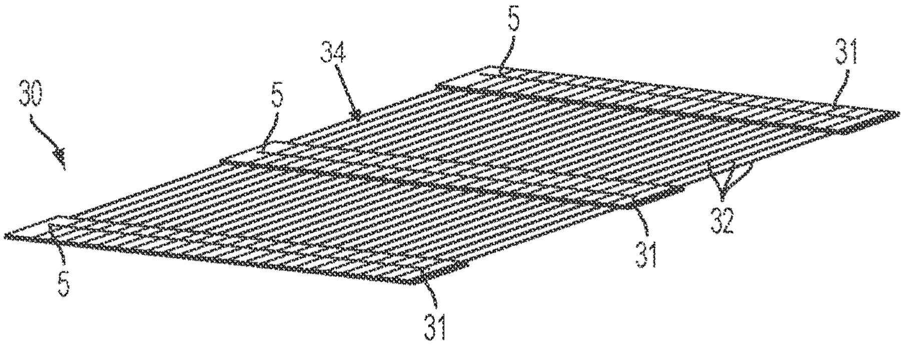
FIG. 9 is a perspective view showing a first embodiment of the bulk material created by the apparatus of FIG. 7.
Figure 10:
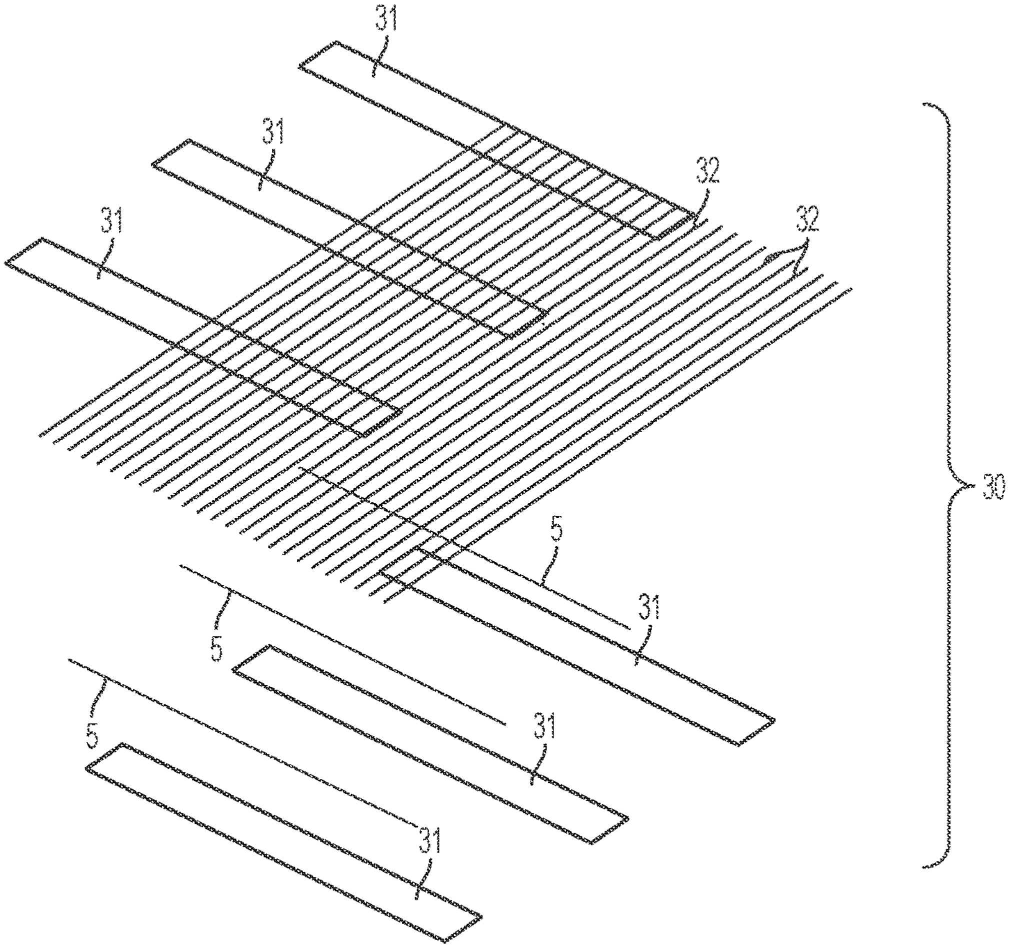
FIG. 10 is a perspective view showing a second embodiment of the bulk material created by the apparatus of FIG. 7.
Figure 11:
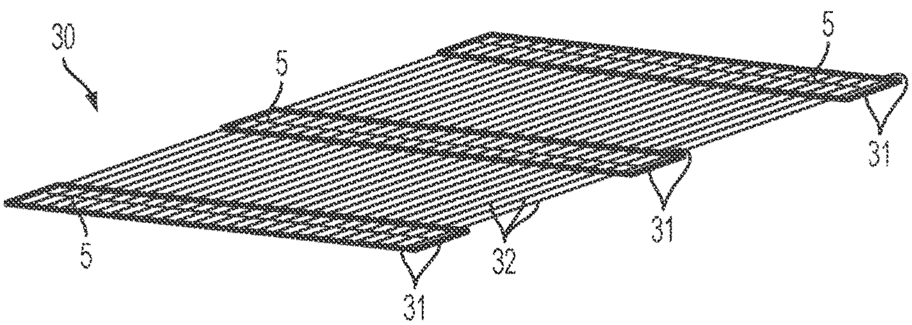
FIG. 11 is a perspective view showing a second embodiment of the bulk material created by the apparatus of FIG. 7.

As illustrated in FIGS. 8 and 9, bulk material 30 (FIG. 9) may be formed using a single layer of weld strips 31 connecting to strands 32. In another exemplary embodiment shown in FIGS. 10 and 11, bulk material 30 may be manufactured as a dual layer structure using a pair of weld strips both above and below strands 32. The use of two mutually opposed weld strips employs a gripping action to "trap" or capture the strands 32 therebetween, thereby contributing to a high-strength coupling interface. When implemented in an inflatable product, the resulting dual-layer tensioning structure 3 has improved strength and can be welded to upper or lower material 1, 2 (FIGS. 1, 3 and 4) on either side. As shown in FIGS. 10 and 11 and discussed above, at least one reinforcement strand 5 may also be captured between the weld strips 31.

2. Sheet-Backed Tensioning Structures With Affixed Strands

Figure 12:
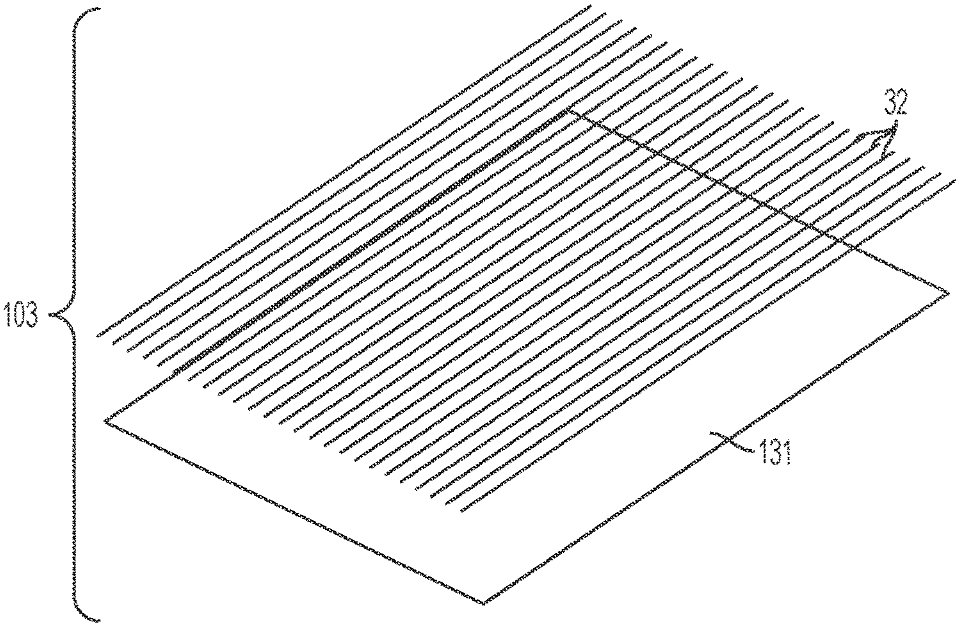
FIG. 12 is an exploded, perspective view of a first alternative tensioning structure made in accordance with the present disclosure.
Figure 13:
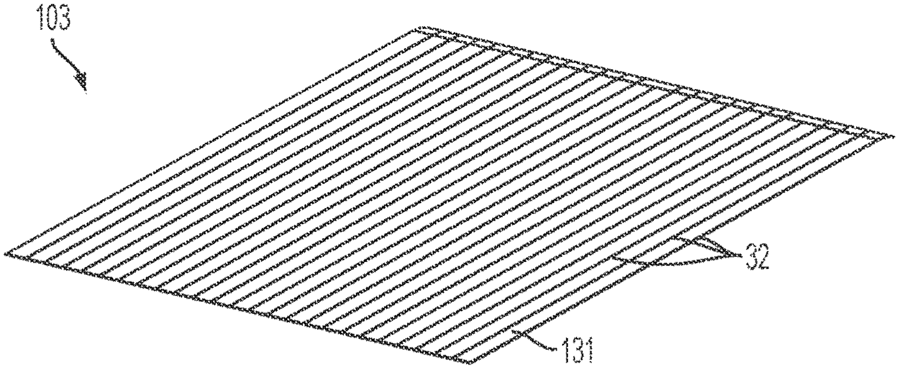
FIG. 13 is an assembled, perspective view of the first alternative tensioning structure shown in FIG. 12.

An alternatively arranged tensioning structure is shown in FIGS. 12 and 13 as tensioning structure 103. Structure 103 is substantially similar to tensioning structure 3 described above, with reference numerals of structure 103 analogous to the reference numerals used in structure 3, except with 100 added thereto. Elements of structure 103 correspond to similar elements denoted by corresponding reference numerals of structure 3, except as otherwise noted.

Tensioning structure 103 includes a plurality of strands 32 which are evenly spaced and arranged substantially parallel to one another, in a similar fashion to tensioning structure 3 described above. However, tensioning structure 103 includes weld sheet 131 in place of weld strips 31 of structure 3. Rather than affixing the ends of strands 32 to weld strips 31, the entire length of strands 32 are affixed to weld sheet 131. Weld sheet 131 serves to provide for proper positioning and protection of the plurality of strands 32, such as to avoid knotting or damage of strands 32 during practical use. However, because tensioning structure 103 includes strands 32 embedded therein, weld sheet 131 does not need to bear significant tensile loads and can be kept to a minimal thickness. For example, weld sheet 131 may be 0.10 millimeters in thickness.

Figure 14:
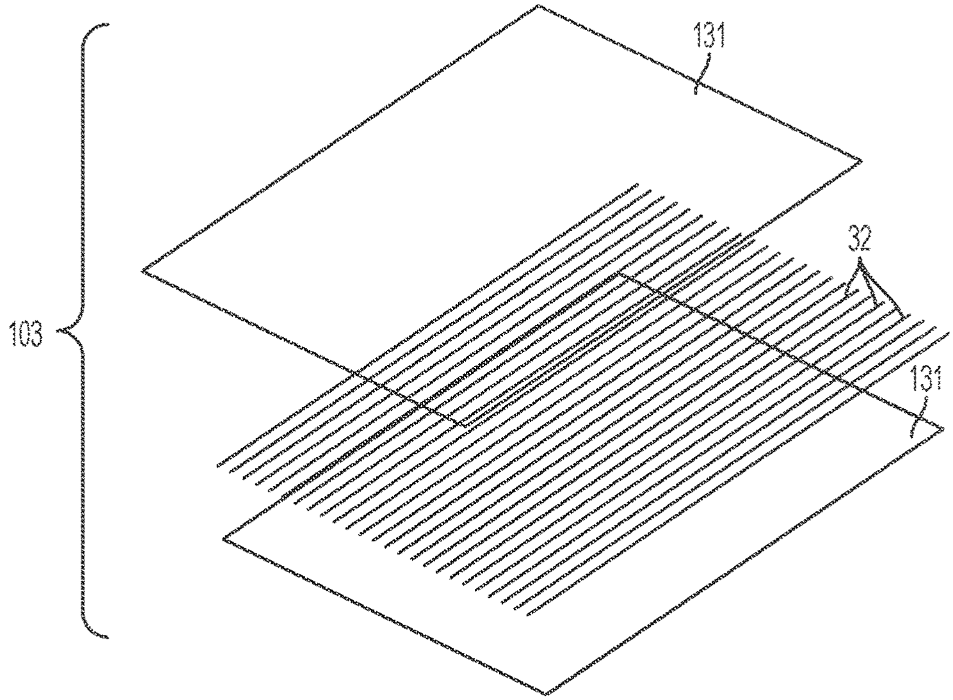
FIG. 14 is an exploded, perspective view of a second alternative tensioning structure made in accordance with the present disclosure.

In FIGS. 12 and 13, a single weld sheet 131 is used, though other arrangements are contemplated. FIG. 14, for example, illustrates tensioning structure 103 (FIG. 13) with an extra weld sheet 131 applied opposite the first weld sheet 131. Similar to the embodiment of tensioning structure 3 using mutually opposed weld strips 31 (FIGS. 10 and 11), the mutually opposed weld sheets 131 may be used to encapsulate strands 32.

Figure 15:
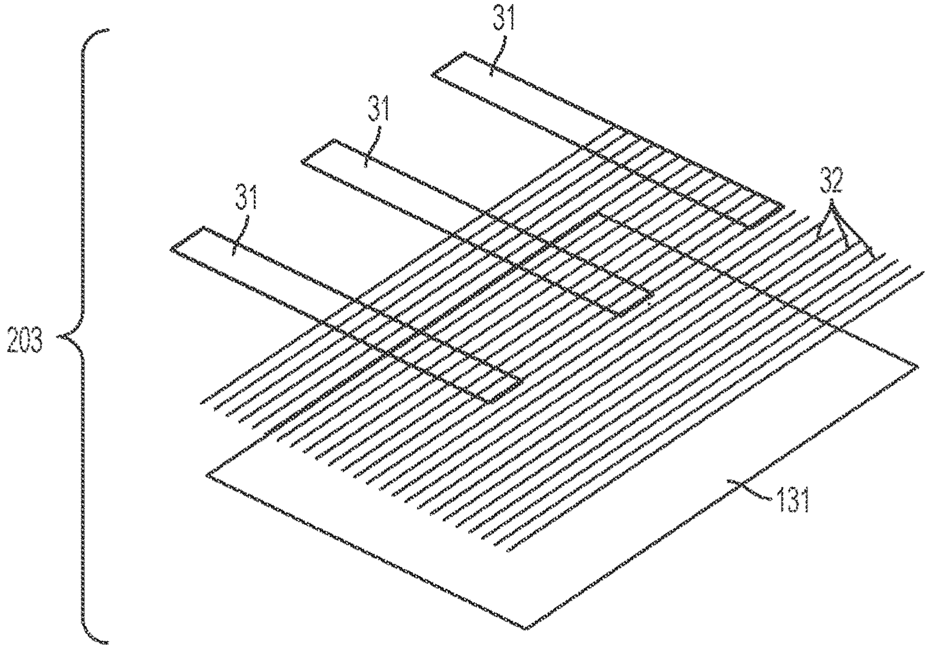
FIG. 15 is an exploded, perspective view of a third alternative tensioning structure made in accordance with the present disclosure.
Figure 16:
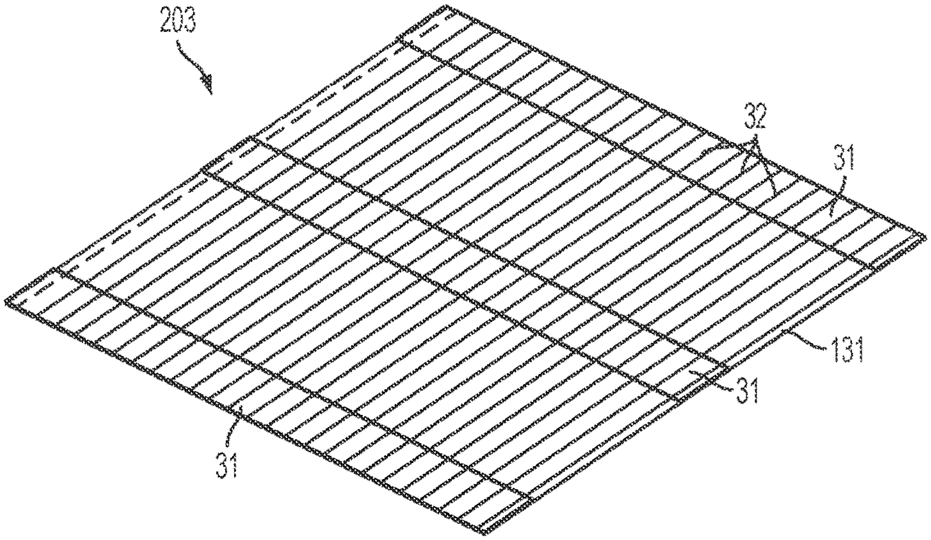
FIG. 16 is an assembled, perspective view of the third alternative tensioning structure shown in FIG. 15.

FIGS. 15 and 16 illustrate tensioning structure 203, which is substantially similar to tensioning structure 3 described above, with reference numerals of structure 203 analogous to the reference numerals used in structure 3, except with 200 added thereto. Elements of structure 203 correspond to similar elements denoted by corresponding reference numerals of structure 3, except as otherwise noted. However, structure 203 represents a hybrid approach combining elements of tensioning structures 3 and 103, in which a plurality of weld strips 31 are used to encapsulate a portion of strands 32 between strips 31 and weld sheet 131. The addition of weld strips 31 to the weld sheet 131 improves the strength of the weld connection between tensioning structure 203 and the adjacent product material (e.g., upper and/or lower material 1, 2 of inflatable bed 10 shown in FIGS. 2 and 3).

Figure 17:
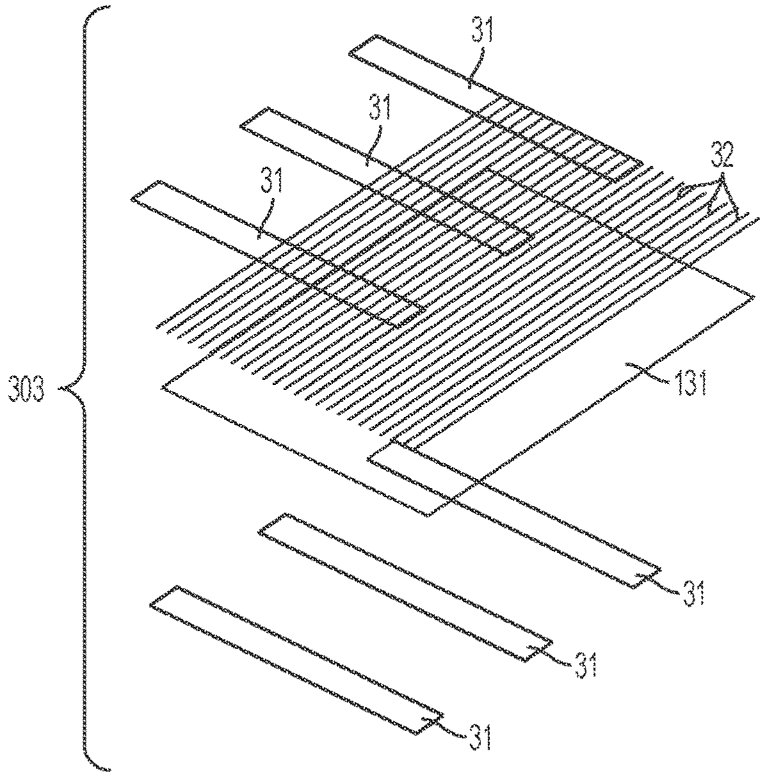
FIG. 17 is an exploded, perspective view of a fourth alternative tensioning structure made in accordance with the present disclosure.

FIGS. 17 illustrates tensioning structure 303, which is substantially similar to tensioning structure 3 described above, with reference numerals of structure 303 analogous to the reference numerals used in structure 3, except with 300 added thereto. Elements of structure 303 correspond to similar elements denoted by corresponding reference numerals of structure 3, except as otherwise noted. Moreover, structure 303 incorporates all the elements of tensioning structure 203 but adds a second, lower layer of weld strips 31 attached to weld sheet 131 opposite the first, upper layer of weld strips 31. Thus, there is a dual-layer structure of opposing weld strips 31 further augmenting weld sheet 131, rendering tensioning structure 303 very strong and robust both along the extent of strands 32 and at the weld between strands 32 and the adjacent material, e.g., material 1, 2 of inflatable bed 10 (FIGS. 3 and 4).

Figure 18:
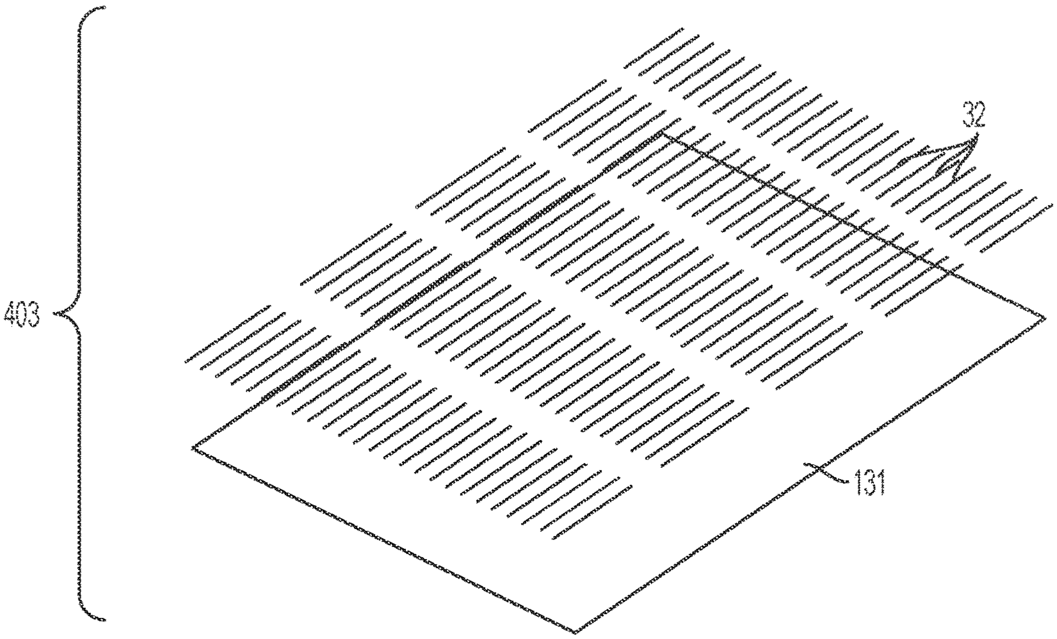
FIG. 18 is an exploded, perspective view of a fifth alternative tensioning structure made in accordance with the present disclosure.
Figure 19:
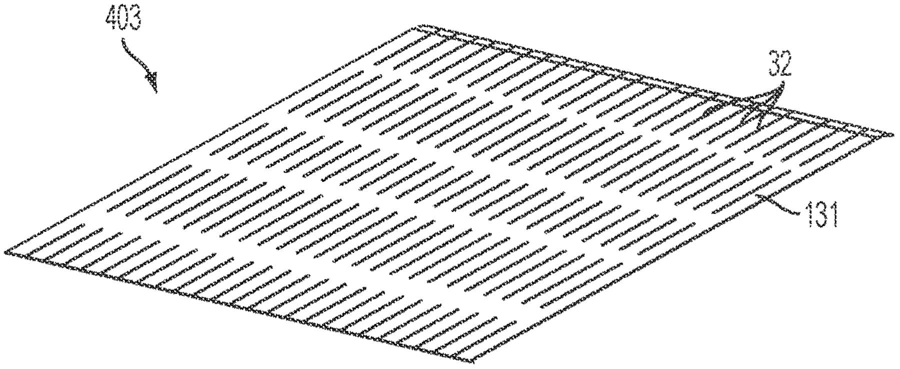
FIG. 19 is an assembled, perspective view of the fifth alternative tensioning structure shown in FIG. 18.

Turning to FIGS. 18 and 19, yet another tensioning structure 403 is illustrated. Tensioning structure 403 is substantially similar to tensioning structure 3 described above, with reference numerals of structure 403 analogous to the reference numerals used in structure 3, except with 400 added thereto. Elements of structure 403 correspond to similar elements denoted by corresponding reference numerals of structure 3, except as otherwise noted. However, the plurality of strands 32 used in structure 403 are discontinuous. As shown in FIGS. 13 and 14, the plurality of strands 32 may be trimmed to any desired length, and then affixed to weld sheet 131 by hot pressing. Upon installation into an inflatable product use, the affixed strands 32 may be cut to length, and welded into place as described above. Thus, using tensioning structures 403 has the potential to reduce consumption of the material used for strands 32 and avoid unnecessary waste thereof, thereby lower material cost.

Figure 20:
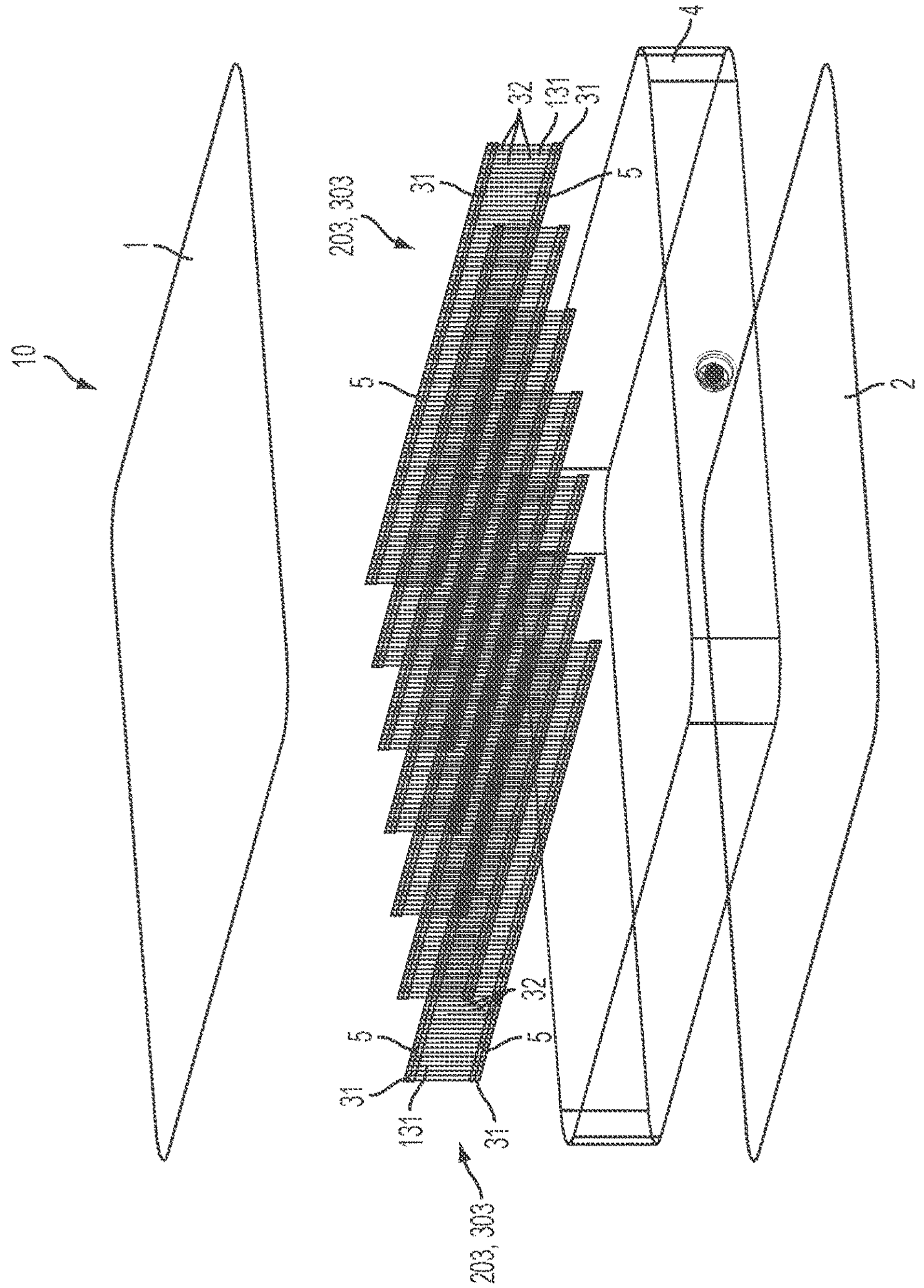
FIG. 20 is an exploded, perspective view of an inflatable bed incorporating alternative tensioning structures made in accordance with the present disclosure.

Optionally, as shown in FIG. 20, each end of the weld sheet 131 (i.e., at the ends of strands 32) may include a reinforcing strand 5 arranged similarly to tensioning structure 3 discussed above. Reinforcing strands 5 are omitted from FIG. 21 for clarity.

Figure 21:
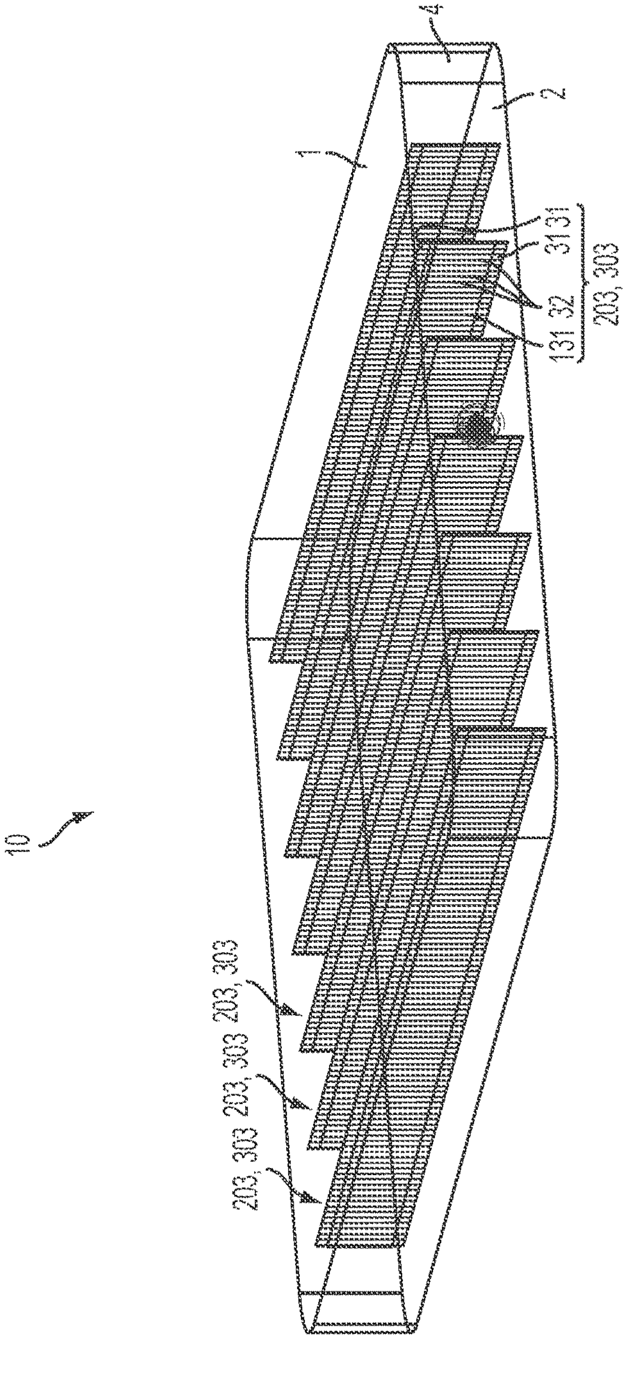
FIG. 21 is an assembled view of the inflatable bed of FIG. 22, in which the inflatable bed material is made transparent to show the internal arrangement of the tensioning structures.

The sheet-backed embodiments illustrated as tensioning structures 103, 203, 303 and 403 in FIGS. 12-19 may be integrated into an inflatable device in a similar fashion as tensioning structures 3 described above. For example, FIGS. 20 and 21 illustrate integration of tensioning structures 103 into inflatable bed 10, which is accomplished by the same method as described above.

Figure 22:
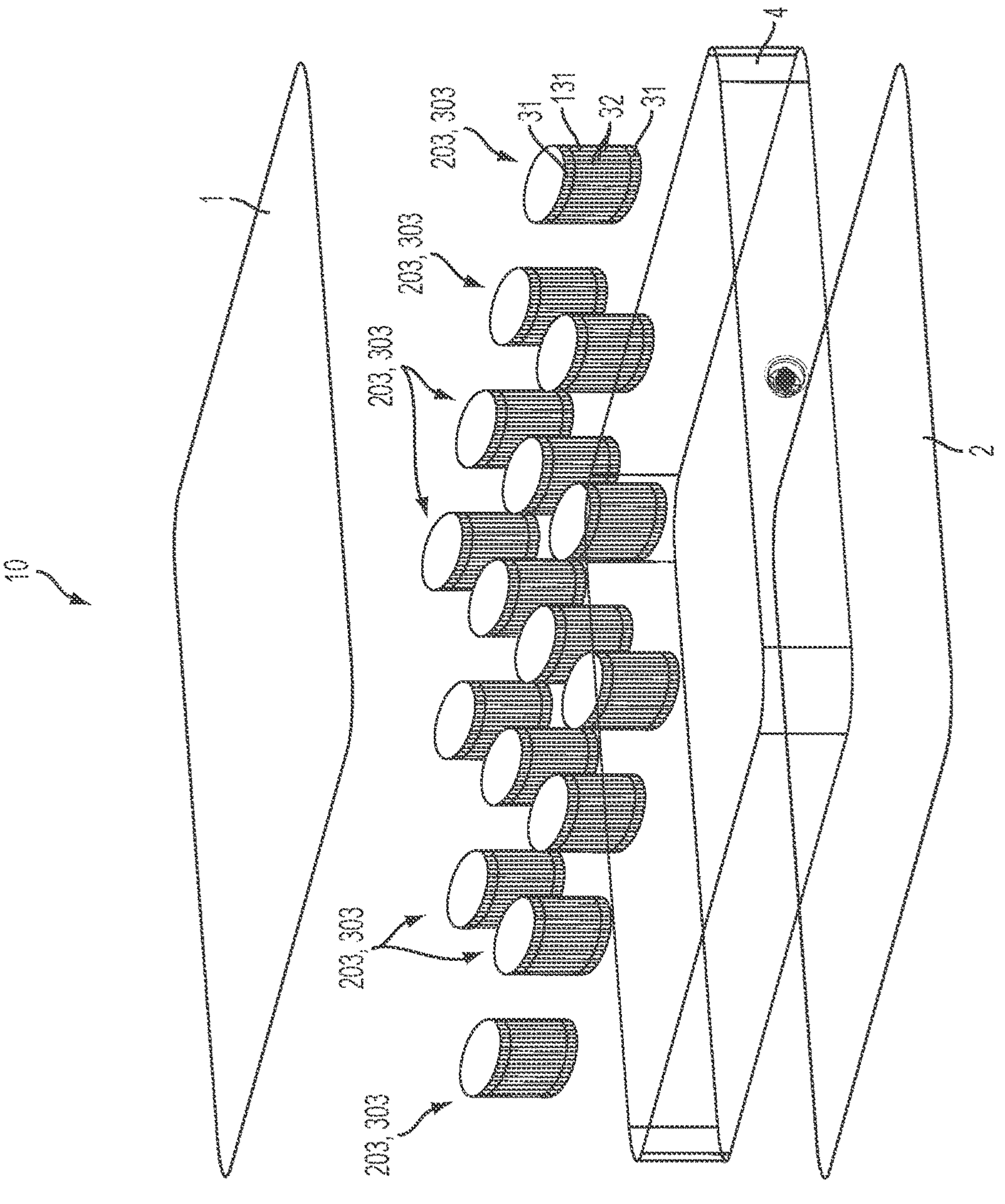
FIG. 22 is an exploded, perspective view of an inflatable bed incorporating an alternative tensioning structures made in accordance with the present disclosure, configured in an alternative geometric arrangement.
Figure 23:
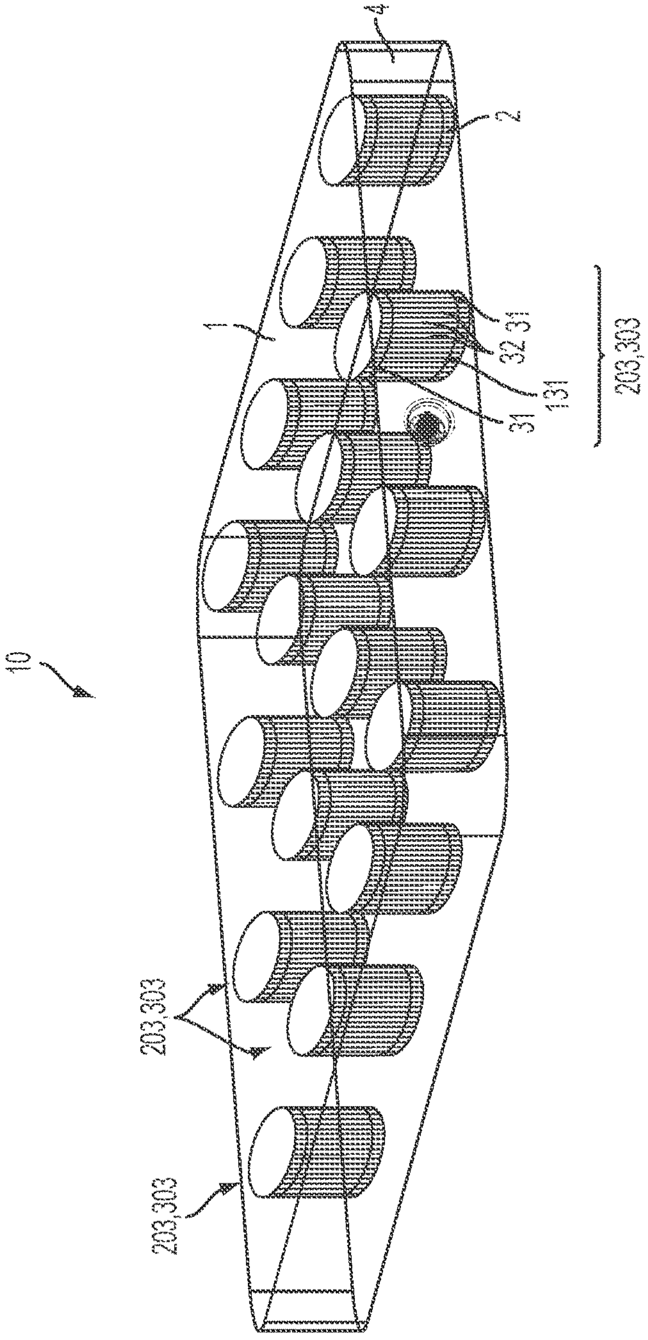
FIG. 23 is an assembled view of the inflatable bed of FIG. 22, in which the inflatable bed material is made transparent to show the internal spatial arrangement of the tensioning structures.

Tensioning structures 103, 203, 303 and 403 may also be formed into a variety of geometric configurations, as discussed above with respect to tensioning structure 3. These configurations include a wave-like path, I-shaped path, Z-shaped path or V-shaped path. As illustrated in FIGS. 22 and 23, is a cylindrical or columnar arrangement may also be utilized. In this arrangement, weld sheet 131 (and upper and lower weld strips 31, if present) is connected at its ends in an end-to-end manner to form an arcuate ring, such as a circular ring as illustrated. The plurality of strands 32 between thus cooperate with the material of weld sheet 131 to form a closed columnar periphery, thereby forming the body of a column. The axial ends of this columnar structure can then be welded to upper material 1 and lower material 2, respectively, of inflatable bed 10.

Figure 24:
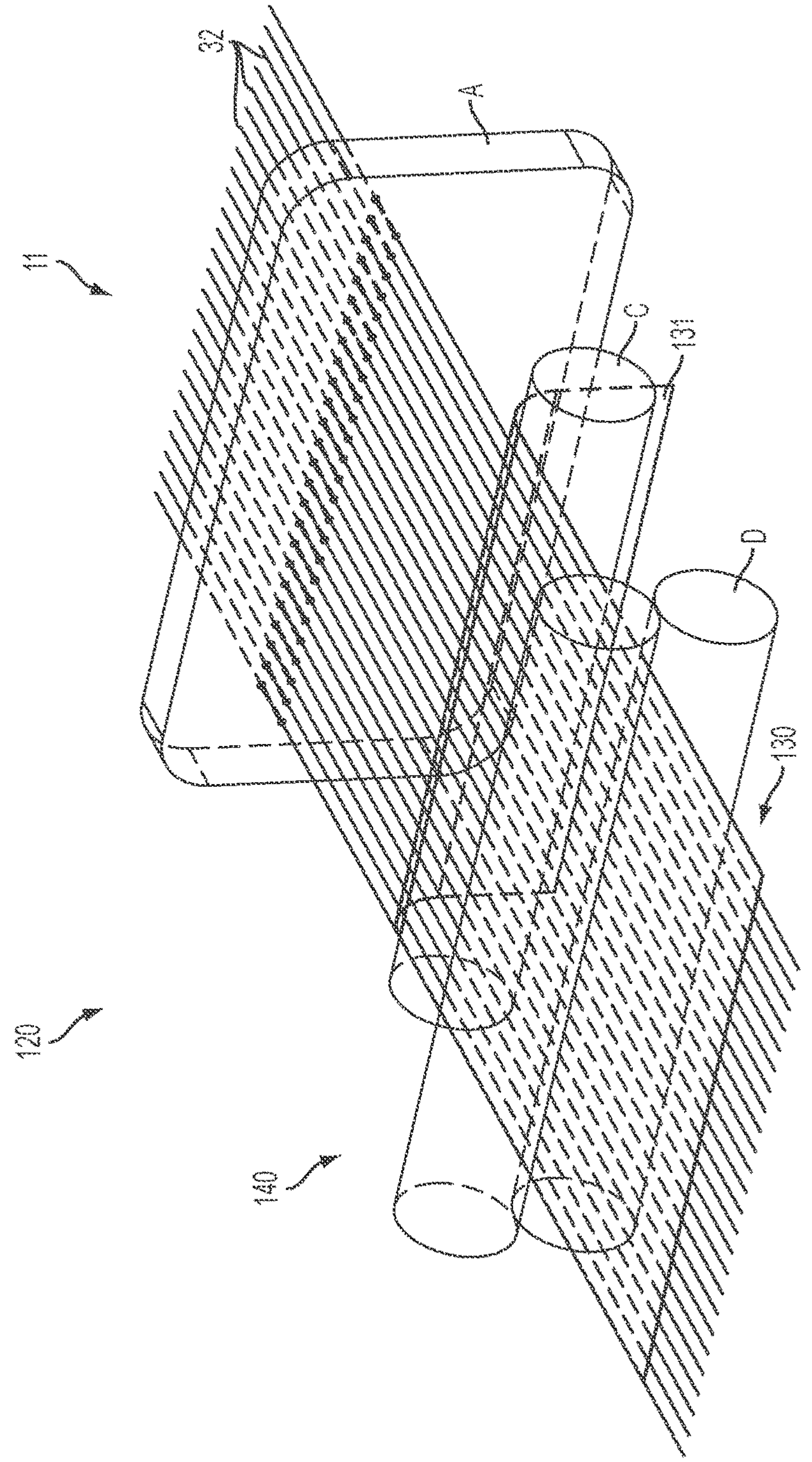
FIG. 24 is a perspective view of an apparatus for producing bulk material for the first through fifth alternative tensioning structures shown in FIGS. 12-19.

Turning now to FIG. 24, an apparatus 120 suitable for manufacturing tensioning structures 103, 203, 303 or 403 is shown. Operation of apparatus 120 is accomplished by first supplying a plurality of strands 32 from a yarn stand or other stock of yard, as described above with respect to apparatus 20. Strands 32 are continuously delivered via strand guide A, described above, which provides uniformly spaced apart and parallel strands 32 to the downstream welder 140.

Welder 140 includes a conveying roller C downstream of strand guide A, which continuously delivers a weld sheet 131 of width sufficient to correspond to the width of the plurality of strands 32. Downstream of roller C, the plurality of strands 32 are near to or abutting weld sheet 131.

The plurality of strands 32 and weld sheet 131 then advance together through hot roller D, which heats and compresses the material such that strands 32 become fixed to the softened material of weld sheet 131. After passage through roller D, tensioning structure 103 as shown in FIG. 13 is complete. The bulk material for tensioning structure 103 may be wound onto a take-up spool for later cutting into a tensioning structure 103 of appropriate size for a particular application.

When the thus tensioning structure 103 is applied to an inflatable product such as inflatable bed 10 (FIGS. 21 and 22), the weld sheet 131 may have a relatively small thickness given the level of internal pressure (and, therefore, tension) expected to be encountered by structure 103 during inflation and use of the product. For example, the thickness may be reduced by 20%-40% with respect known internal tensioning structures lacking strands 32. Because strands 32 are positioned and configured to bear the tensile loads applied to tensioning structure 103, weld sheet 131 need only provide for proper positioning and protection of the plurality of strands 32, such as to avoid knotting or damage of strands 32 during practical use. In one exemplary embodiment, the thickness of weld sheet 131 may be as small as 0.10 millimeters.

Where a second weld sheet 131 is added to tensioning structure 103, as shown in FIG. 14 and described above, a second roller C (not shown) may be provided opposite the illustrated roller C of FIG. 24, such that rollers C are disposed on either side of strands 32. Both sheets 131 are then passed through the hot pressing roller D, capturing strands 32 between the two layers of plastic sheets.

Where a plurality of weld strips 31 are added to create tensioning structure 203, as shown in FIGS. 15 and 16 and described above, a finished tensioning structure 103 made using apparatus 120 may be further processed using apparatus 20 as shown in FIG. 7 and described above. After the intermediate sheeted product equivalent to tensioning structure 103 exiting from hot rollers D, weld strips 31 may be added to one or both sides of the intermediate sheeted product. At least one reinforcement strand 5 may be added as required or desired, such that reinforcement strands 5 are perpendicular to the plurality of strands 32, as described in detail above.

Where weld strips 31 are added to both sides of a sheeted intermediate product to create tensioning structure 303, a process similar to the above may be employed in which an intermediate sheeted product exits rollers D and receives additional weld strips 31. However, weld strips 31 are added to both sides instead of to a single side, in accordance with the method of manufacturing a dual-layer version of bulk material 30 using welder 40 as described above. Of course, at least one reinforcement strand 5 may be added in a similar fashion as previously described.

3. Weld Strips Joined by V-Shaped Strands

Figure 25:
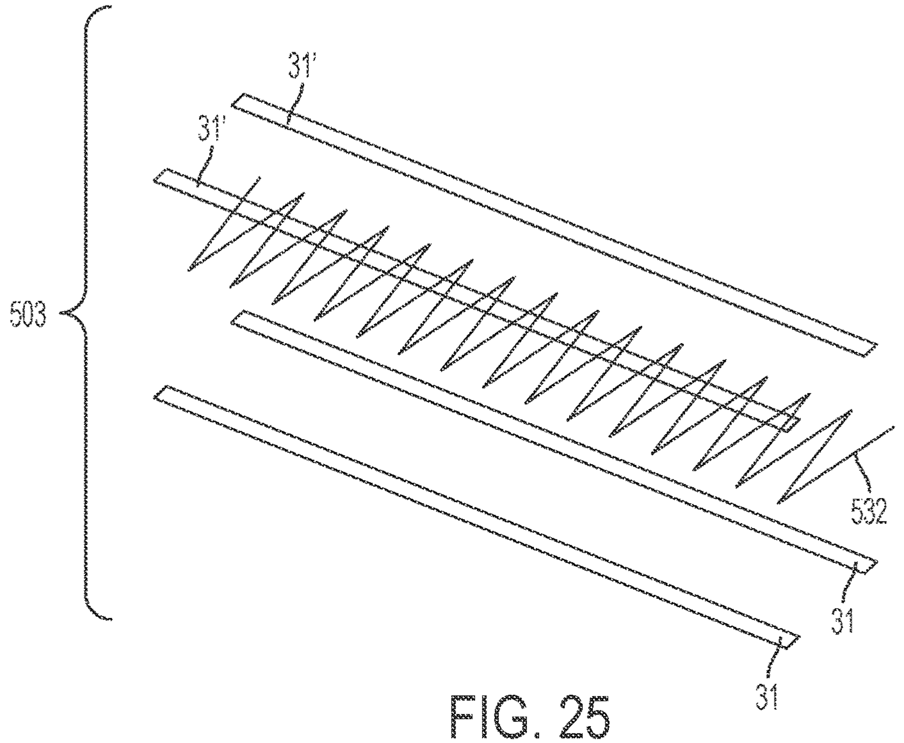
FIG. 25 is an exploded, perspective view of a sixth alternative tensioning structure made in accordance with the present disclosure.
Figure 26:
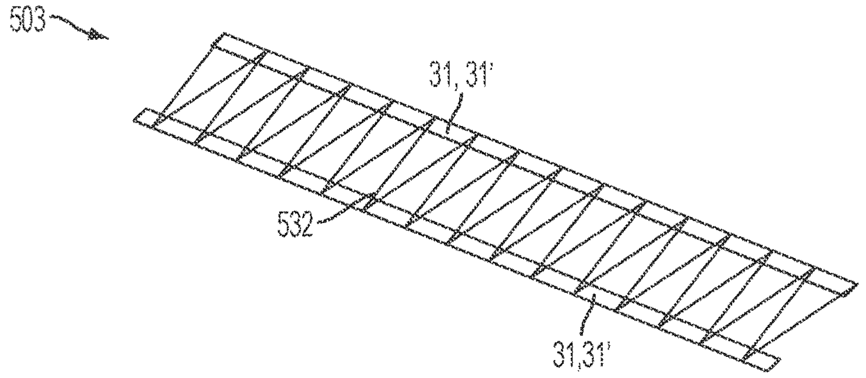
FIG. 26 is an assembled, perspective view of the sixth alternative tensioning structure shown in FIG. 25.
Figure 27:
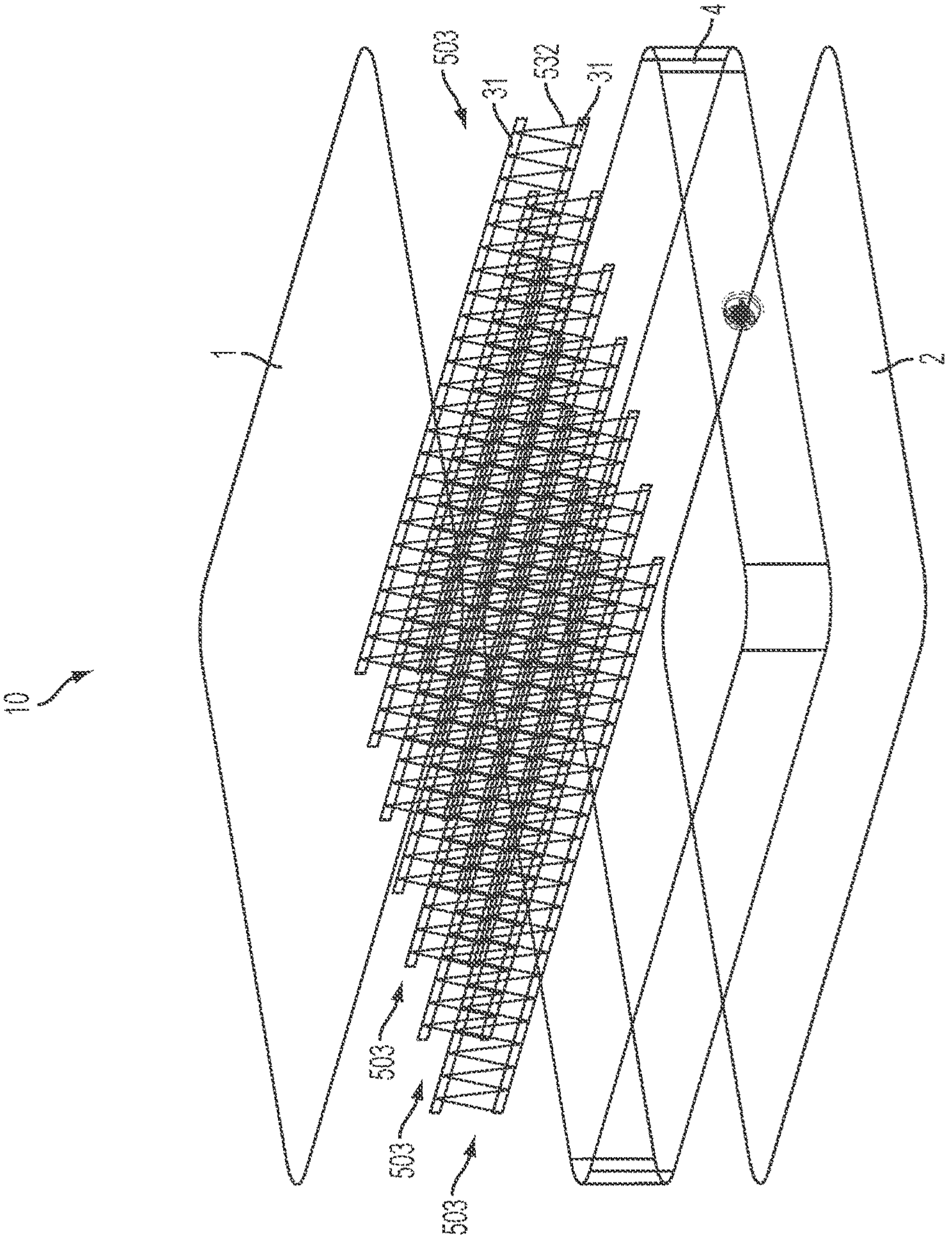
FIG. 27 is an exploded, perspective view of an inflatable bed incorporating the sixth alternative tensioning structure shown in FIG. 25.
Figure 28:
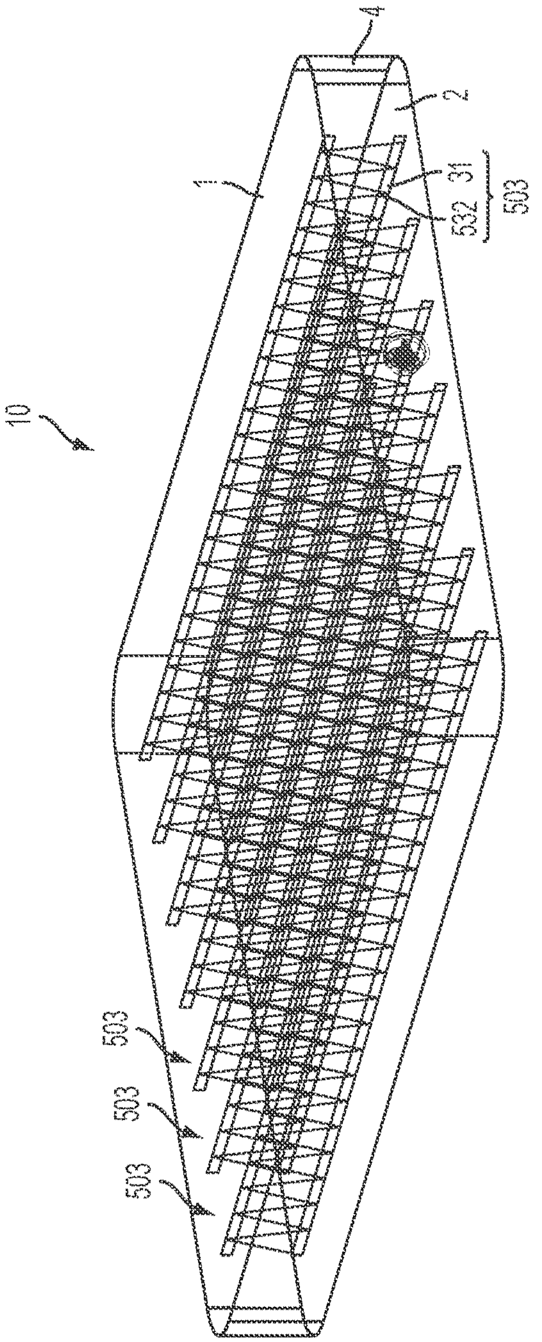
FIG. 28 is an assembled view of the inflatable bed of FIG. 27, in which the inflatable bed material is made transparent to show the internal arrangement of the tensioning structures.

An alternatively arranged tensioning structure is shown in FIGS. 25 and 26 as tensioning structure 503. Structure 503 is substantially similar to tensioning structure 3 described above, with reference numerals of structure 503 analogous to the reference numerals used in structure 3, except with 500 added thereto. Elements of structure 503 correspond to similar elements denoted by corresponding reference numerals of structure 3, except as otherwise noted.

However, strand 532 in tensioning structure 503 have a staggered, V-shaped arrangement, and may be formed from a single strand wound back and forth rather than a plurality of separate and discrete strands as used in tensioning structure 3 for example. As described below in the context of the method of manufacture of tensioning structure 503, strand 532 may be a single, continuous strand woven between weld strips 31, 31', with the point of each “V” affixed to at least one of the weld strips 31, 31'.

Figure 29:
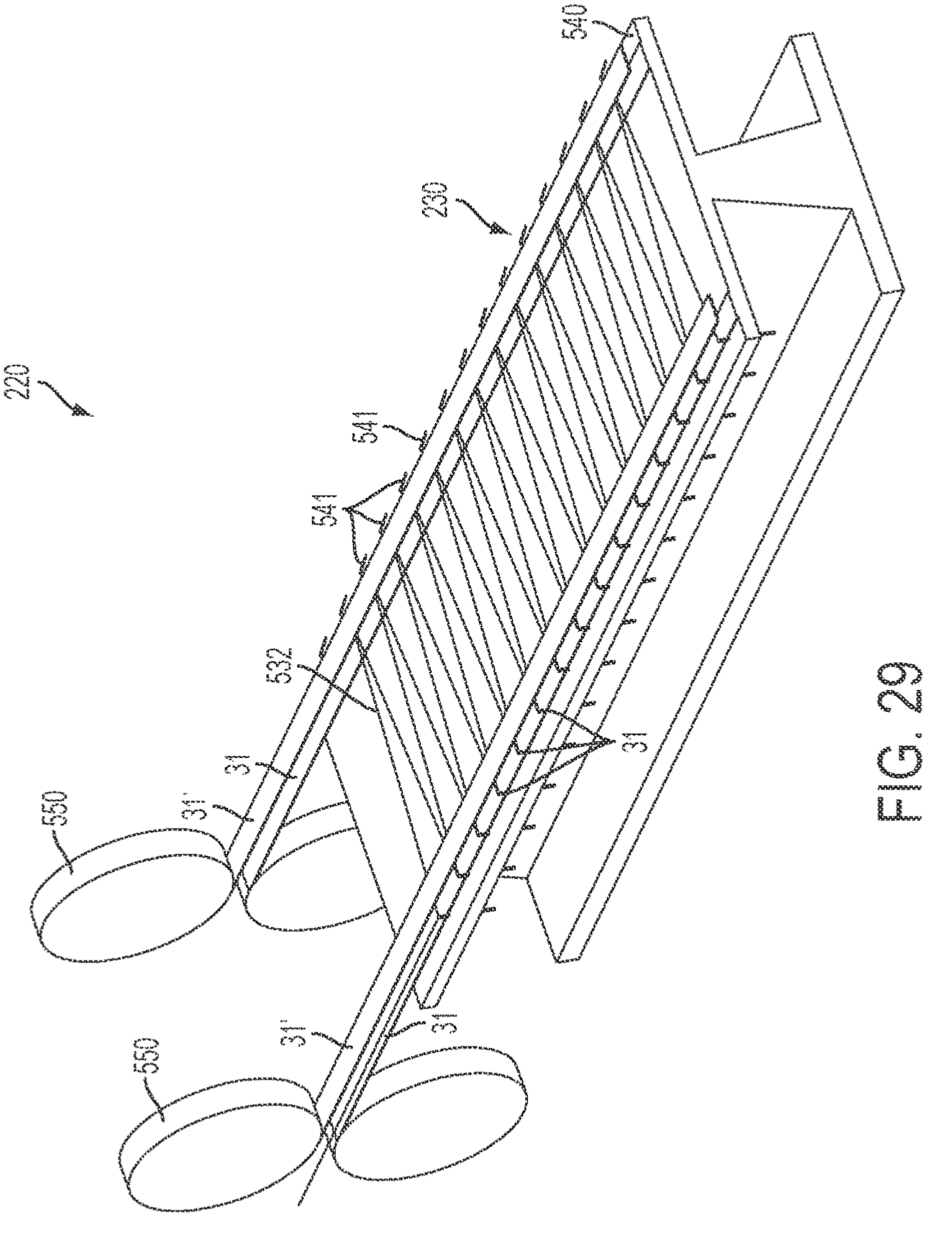
FIG. 29 is a perspective view of an apparatus for producing bulk material for the sixth alternative tensioning structures shown in FIGS. 25-28.

Turning now to FIG. 29, an apparatus 220 suitable for manufacturing tensioning structure 503 is shown. Operation of apparatus 220 is accomplished by disposing a lower pair of weld strips 31 such that the lower pair are substantially parallel and spaced apart upon joining device 540. In the illustrated embodiment, weld strips 31 are unspooled from rolls of weld strip material contained within a pair of unreeling devices 550.

Next, continuous strand 532 is wrapped successively around a set of adjacent hook-shaped members 541 disposed at either side of joining device 540, with the plurality of hook-shaped members 541 arranged in two respective rows corresponding to the location of the previously-placed lower pair of weld strips 31. In an exemplary embodiment, hook-shaped members 541 are uniformly spaced from one another and arranged at the outer sides of lower pair of weld strips 31, with each row of hook-shaped members 541 offset with respect to the other row. With this arrangement, the continuous strand 532 forms a plurality of end-to-end “V” shaped strands when wrapped around successive hook-shaped members 541 in alternating rows thereof, as shown. That is to say, the corner of each “V” is formed at a respective hook-shaped members 541, and successive corners traced along continuous strand 532 will alternate between rows of hook-shaped members 541.

Next, a second pair of weld strips 31' are positioned over the first pair of weld strips 31, respectively, and are clamped thereto such that each “V” shaped corner formed by strand 532 is disposed between one of the first pair of weld strips 31 and the abutting one of the second pair of weld strips 31'. The second pair of weld strips 31' may also be unspooled from unreeling devices 550.

Finally, the abutting pairs of weld strips 31, 31' are joined to one another and to strand 532, such as by welding or by one of the other attachment methods discussed above. For example, weld strips 31, 31', may be joined by a high frequency welder or another thermofusion device. It is also contemplated that strand 532 can be fixed to weld strips 31, 31', and weld strips 31 can be fixed to weld strips 31', by adhesive or by sewing.

As with other tensioning structures discussed above, tensioning structure 503 may be produced and stored in bulk and later applied to various inflatable products. The length and width of tensioning structure 503 may be trimmed to accommodate the internal length or width of the inflatable product.

In one alternative embodiment, it may be not necessary to provide the second layer of weld strips 31', and instead to fix only the first layer of weld strips 31 to the strand 532. Fixing strand 532 to the single layer of weld strips 31 may be accomplished in a similar fashion to the single-layer weld strip and weld sheet embodiments described above.

Figure 30:
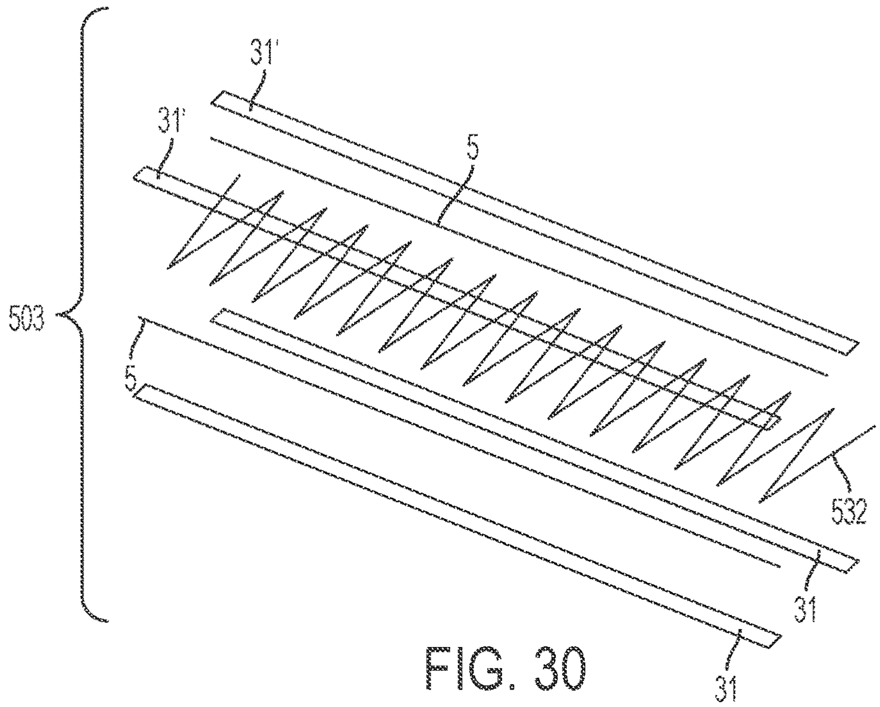
FIG. 30 is an exploded, perspective view of a seventh alternative tensioning structure made in accordance with the present disclosure.
Figure 31:
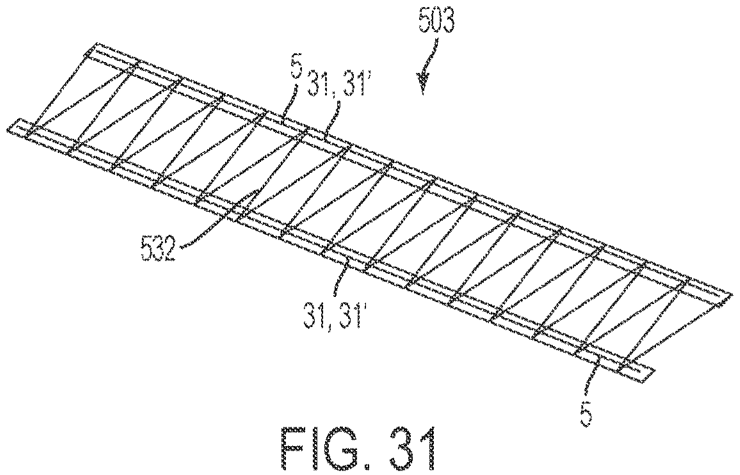
FIG. 31 is an assembled, perspective view of the seventh alternative tensioning structure shown in FIG. 30.
Figure 32:
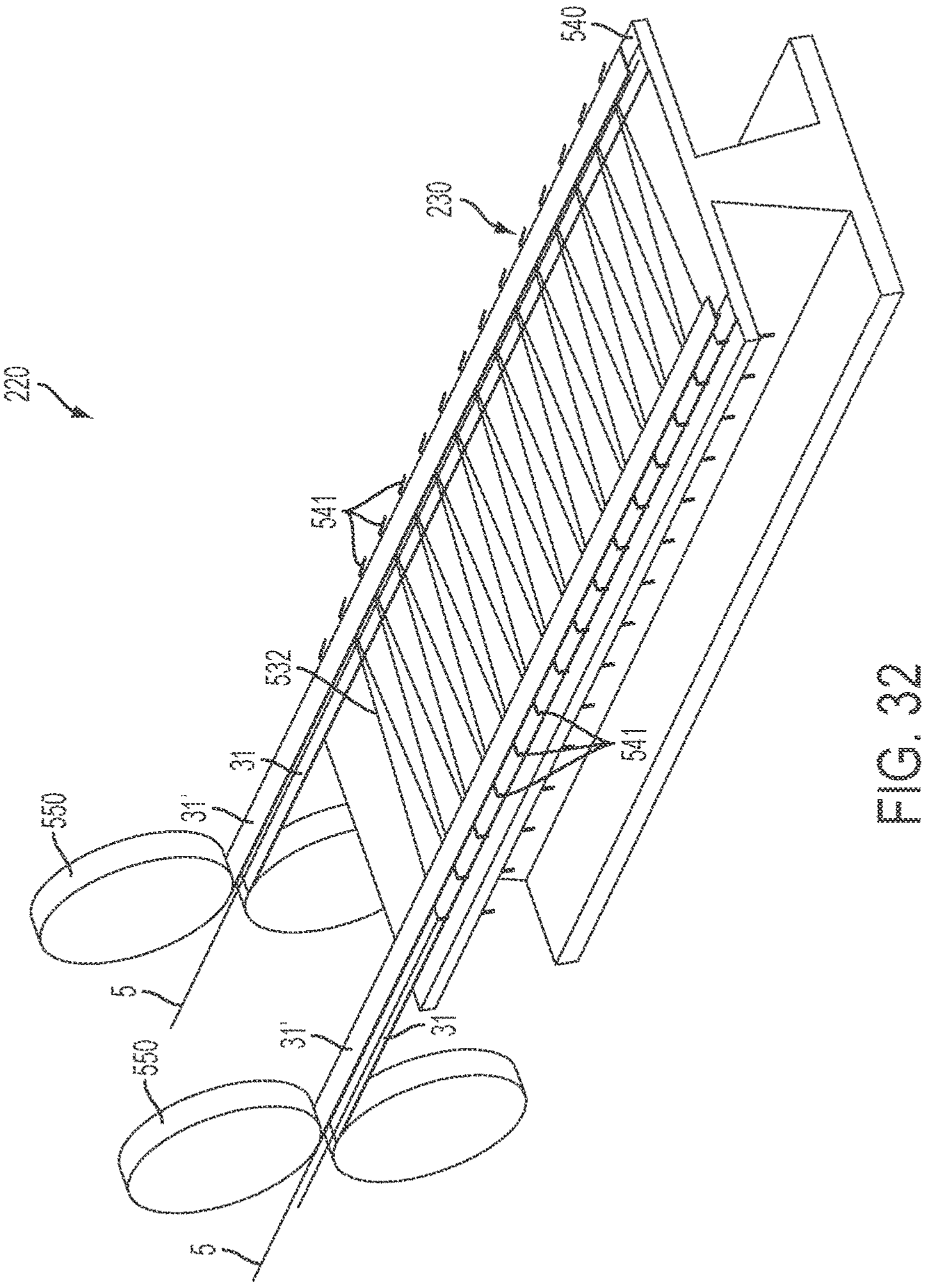
FIG. 32 is a perspective view of an apparatus for producing bulk material for the seventh alternative tensioning structures shown in FIGS. 30 and 31.

Turning to FIGS. 30-32 tensioning structure 503 may also be provided with at least one reinforcement strand 5 extending along the longitudinal extent of at least one of weld strips 31, 31'. Similar to the uses of reinforcement strands 5 in the embodiments described above, reinforcement strands 5 may be arranged on one of the lower pair of weld strips 31 and/or between the lower and upper pairs of weld strips 31, 31'.

A tensioning structure in accordance with the present disclosure, including tensioning structures 3, 103, 203, 303, 403 and 503 discussed above, has a high tensile strength along the axial extent of the strands 32, 532 extending between respective weld strips and/or along weld sheets. This high tensile strength is complemented with a full-strength weld between the adjacent material of an inflatable product, which is facilitated by the full surface-area contact provided by the weld strip and/or weld sheet interface between strands 32, 532 and such adjacent material. In this way, the tensioning structure performs well an internal structure of the inflatable product, while facilitating an overall reduction in weight and deflated/folded volume of the inflatable product. For example, a loose arrangement of strands 32 is significantly lighter than a one-piece sheet of comparable size and tensile strength.

Where weld sheets 131 are employed, such sheets act to ensure a consistent position and arrangement of the plurality of strands 32 (or 532), thereby prevent such strands from becoming wound or otherwise entangled with one another. Meanwhile, weld strips 31 can be utilized to provide a robust structure for welding the tensioning structure into the inflatable product, thereby ensuring that the high tensile strength offered by the strands of the tensioning structure is fully realized. In addition, the use of weld sheet 131 can significantly reduce the weight of the entire inflatable product with respect to a traditional, relatively thicker one-piece sheet which is also responsible for handling tensile loading. In other words, weld sheet 131 reduces by 20%-40% in thickness with respect to an existing tensioning structures having comparable thicknesses of 0.36 mm to 0.8 mm as noted above.

Figure 33:
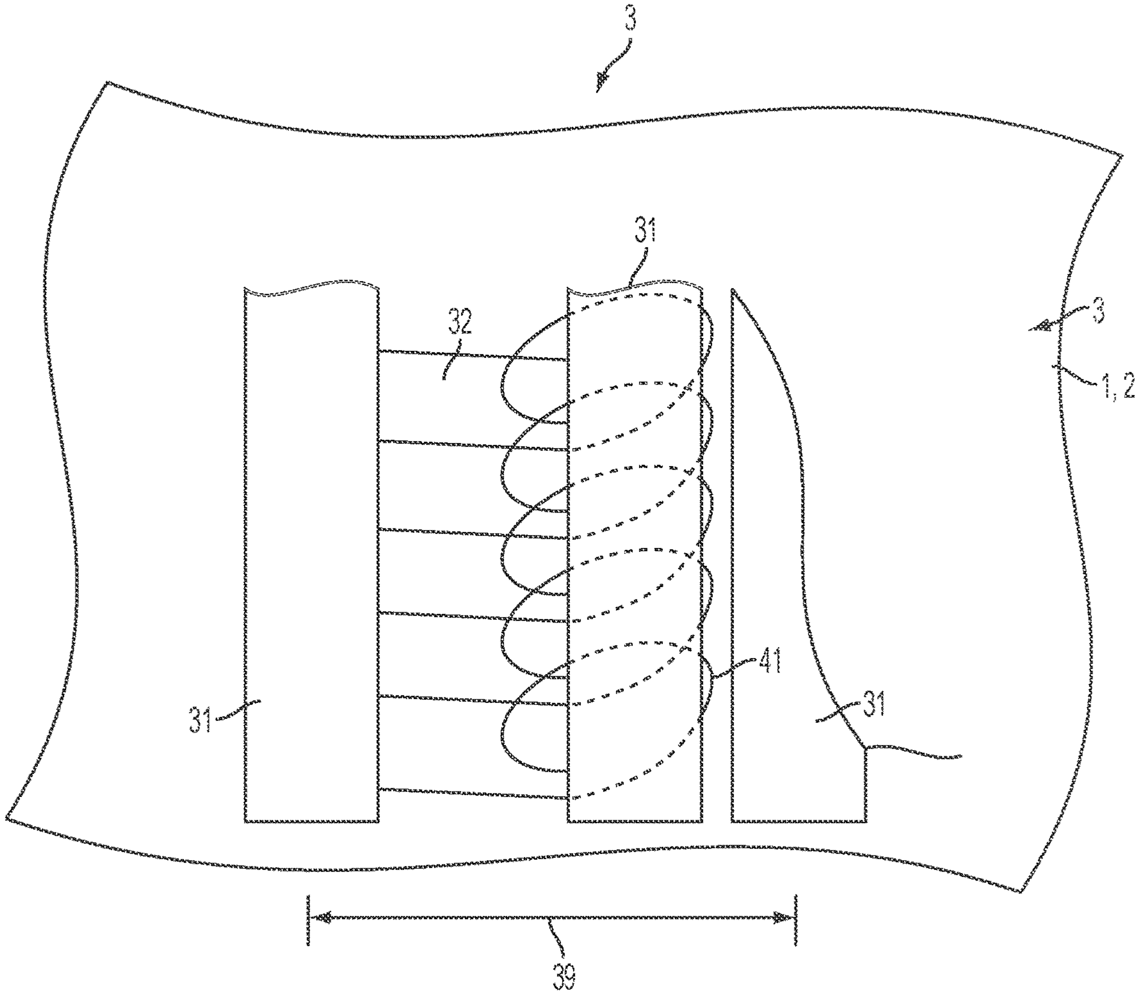
FIG. 33 is a top plan view of portions of tensioning structures bunched together during a welding process.

As illustrated in FIG. 33, tensioning structures 3 have a distance 39 between adjacent tensioning structures 3. As discussed above, strands 32 have a length 37 that approximates a height 37 of tensioning structures 3 when mattress 10 is inflated. During construction of typical mattresses using PVC tensioning structures (not shown), the height of PVC tensioning structures is practically limited by the distance between adjacent PVC tensioning structures. This limitation is the result of the typical manufacturing process wherein the PVC tensioning structures are all aligned on a lower sheet 2 and simultaneously welded to lower sheet 2. If the PVC tensioning structures are too tall, they will overlap adjacent PVC tensioning structures causing adjacent PVC tensioning structures to be welded together and resulting in dysfunctional PVC tensioning structures. To increase the height of PVC tensioning structures, the PVC tensioning structures may be folded in half along their length while one edge is being welded. By folding the PVC tensioning structure, the maximum height may be increased to slightly less than twice the distance between adjacent PVC tensioning structures (ex. 15 millimeters less than twice the height of the PVC tensioning structure). Providing more than one fold is impracticable.

Because gap portions 33 of tensioning structures 3 are made of strands 32 rather than typical PVC sheets discussed above, they are much more flexible than typical PVC tensioning structures. As a result of this flexibility, mattresses 10 can be readily manufactured having heights 37 greater than twice distance 39 between adjacent tensioning structures 3.

During manufacture, weld strips 31 of each of the plurality of tensioning structures 3 are aligned in their respective position for welding to lower sheet 1. The other weld strip 31 of these tensioning structures 3 are moved adjacent to the weld strip 31 to be welded as shown in FIG. 33. Because of their flexibility, strands 32 bunch on top of themselves or on top of nearby strands 32 allowing multiple layers of strands 32 to readily lie on top of one another. By allowing multiple layers of strands 32 to lie on top of each other, height 37 of tensioning structures 3 can be greater than twice distance 39 between tensioning structures 3. According to embodiments, length 37 of strands 32 may be 2, 2.5, 3, 3.5, 4, 4.5, 5, 5.5, 6 or more times longer than distance 39 between tensioning structures 3.

As shown in FIG. 33, loops 41 form in strands 32 during bunching and portions of strands 32 may be positioned under weld strip 31 that is currently not being welded. Although each strand 32 shown in FIG. 33 only has one loop 41 and is only overlapping one other strand 32, each strand 32 may have multiple loops 41 and may overlap multiple other strands 32, particularly when the distance between stands 32 along weld strips 31 is shorter than that illustrated in FIG. 33.

Figure 35:
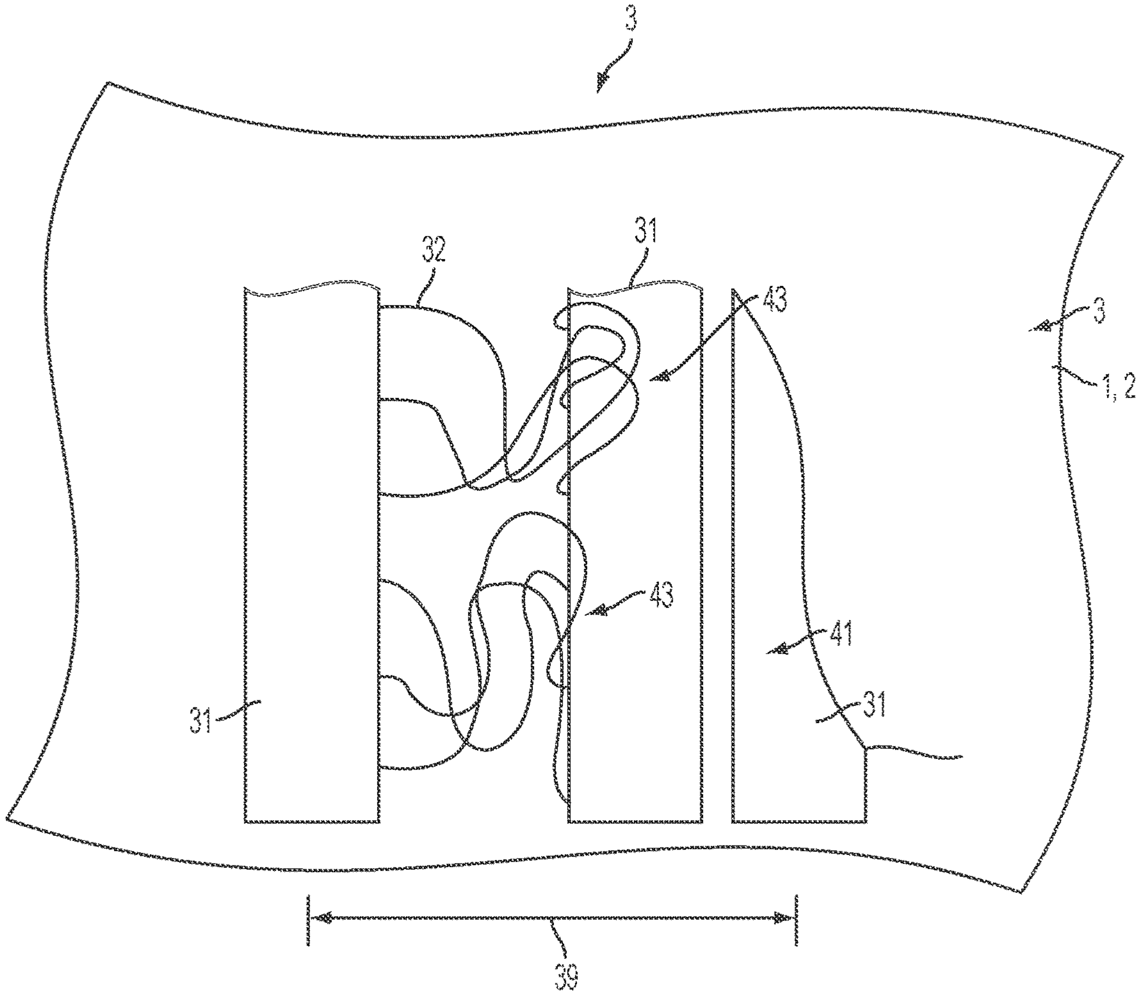
FIG. 35 is a view similar to FIG. 33 showing portions of tensioning structures with strands placed in piles during a welding process.
Figure 36:
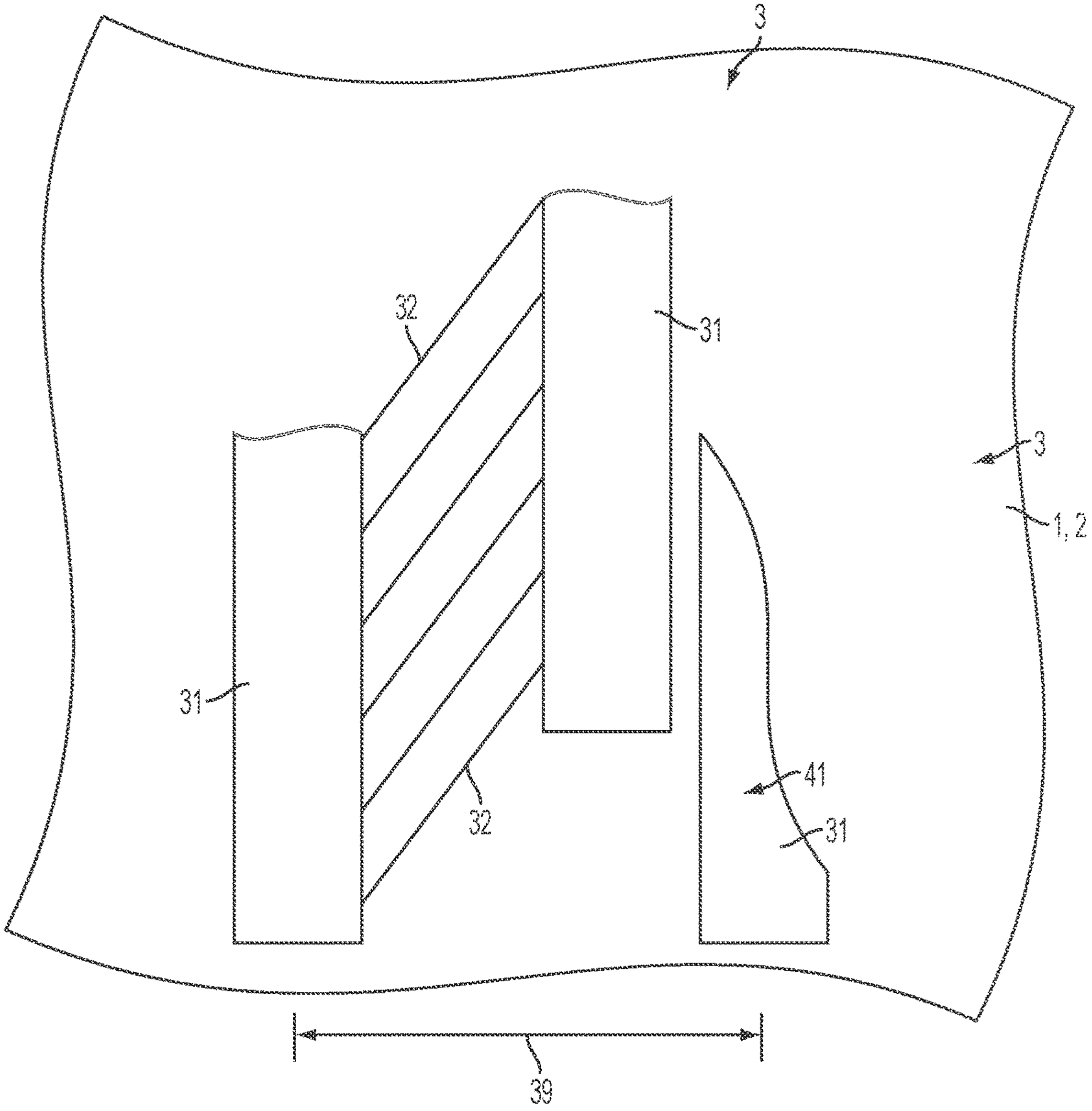
FIG. 36 is a view similar to FIG. 33 showing portions of tensioning structures shifted relative to each other during a welding process.

In addition to the bunching arrangement shown in FIG. 33 to facilitate welding of weld strips 31 to lower sheet 2, other orientations of long strands 32 can be used to prevent a portion of one tensioning structure 3 from overlapping an adjacent tensioning structure 3 during welding. For example, as shown in FIG. 35, strands may be collected in piles 43 to account for moving welds strips 31 of each tensioning structure 3 adjacent each other. The turns of piles 43 account for the decreased distance between weld strips 31 when weld strips 31 are moved together. According to another example, weld strips 31 of each tensioning structure 3 are shifted along the extent or length of tensioning structures 3 as shown in FIG. 36. The shifting results in strands 32 forming acute angles with weld strips 31 and accounts for the decreased distance between weld strips 31. By accommodating strands 32 that are longer than the distance between adjacent tensioning structures 3, tensioning structures 3 may be made taller without interfering with the process of welding tensioning structures 3 to upper and lower sheets 1, 2. As mentioned above, strands 32 may be longer than shown in FIGS. 33-36. With such longer strands 32, more or larger loops 41 (FIG. 33), larger and/or taller piles 43 (FIG. 35), or greater shifting (FIG. 36) may be used to accommodate the longer strands 32 to avoid tensioning structures 3 overlapping during welding.

When prepared for shipping or storage, mattresses 10 are deflated. During deflation, strands 32 may bunch as shown in FIG. 33. Further, strands 32 from adjacent tensioning structures 3 will contact each other and may become interleaved with strands 32 from one tensioning structure 3 positioned between strands 32 of another tensioning structure. Further, because strands 32 are very flexible, they collapse readily when contacted by other structures when mattress 10 is deflated for shipping or storage. For example, when strands 32 contact upper or lower sheets 1, 2 when deflated, they comply to upper and lower sheets 1, 2 to allow upper and lower sheets 1, 2 to compact more closely. At least partially because of this compaction, the overall deflated volume of mattress 10 is reduced when compared to mattresses using PVC sheet tensioning structures. When collapsed, strands 32 from a tensioning structure 3 may become interleaved with strands 32 from the same tensioning structure 32, loops 41 may form, piles 43 may form, and/or strands 32 may become angled to weld strips 31 in a manner similar to that shown in FIG. 36.

Figure 34:
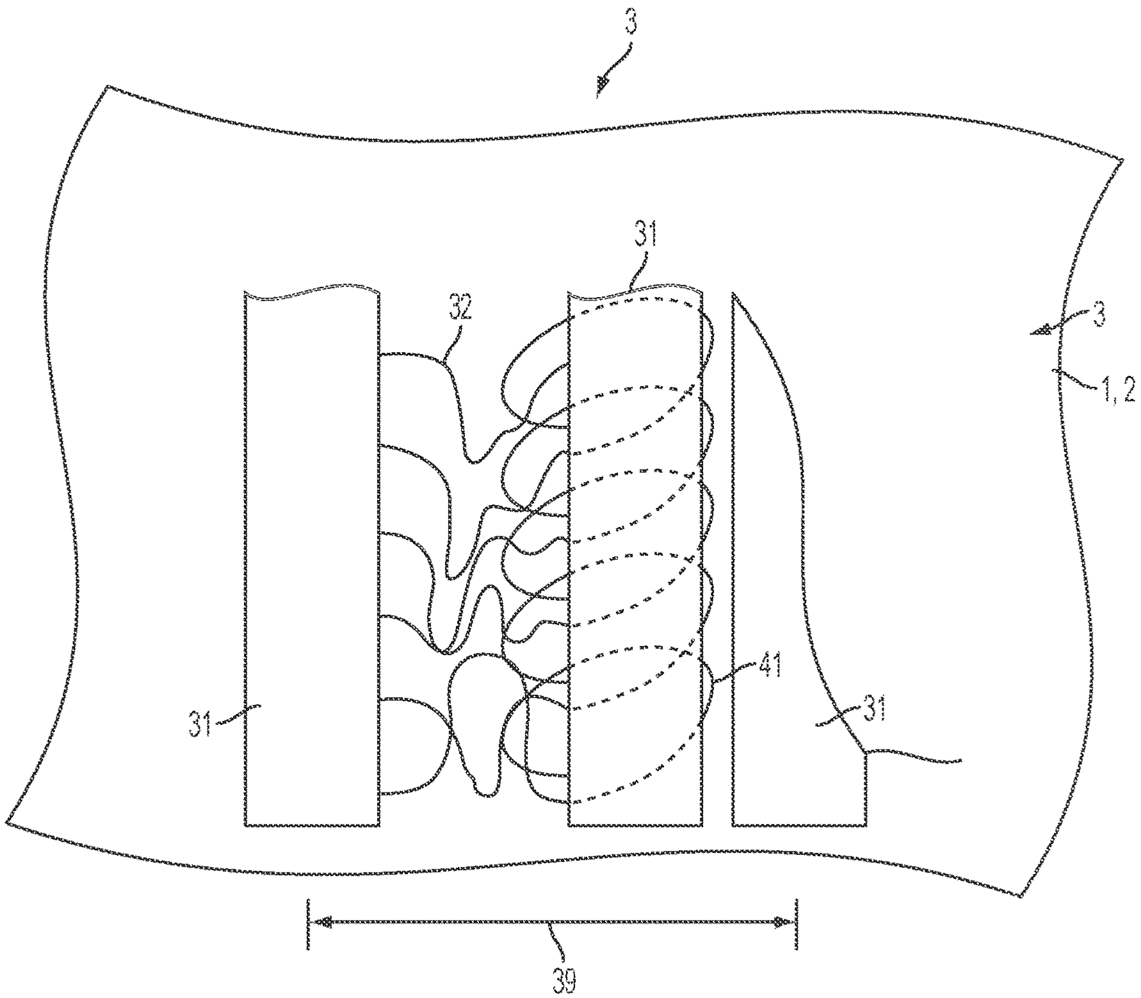
FIG. 34 is a top plan view of portions of a tensioning structure collapsed when the mattress is deflated for storage or shipment.

As shown in FIG. 34, when collapsed, strands 32 may be oriented in different directions with some overlapping as shown in the bottom two strands 32 and other following substantially the same direction as shown in the top three strands 32. Some strands 32 collapse in directions that are not perpendicular to the extent of weld strips 31. For example, the lowest-most strand 32 in FIG. 34 leaves left-most weld strip 31 is a perpendicular direction to this weld strip 31, turns up to be parallel to this weld strip 31, returns to perpendicular to this weld strip 31, turns down to be parallel to this weld strip 31, and then loops under this weld strip 31 to attached to the other weld strip 31 in a perpendicular direction to the other weld strip 31. According to some embodiments, the overall folded or deflated volume of mattress 10 may be 8-25% less than comparable mattresses with PVC sheet tensioning structures. According to the preferred embodiment, the volume is about 16% less.

A tensioning structure in accordance with the present disclosure is also a low-cost option for imparting a desired structure and shape to an inflatable device. For example, a large reduction in PVC material may be achieved by use of the present tensioning structure, as compared to a one-piece sheet of comparable size and tensile strength.

While the disclosure has been described as having exemplary designs, the present disclosure can be further modified within the spirit and scope of this invention. This application is therefore intended to cover any variations, uses or adaptations of the disclosure using its general principles. Further, this application is intended to cover such departures from the present disclosure as come within known or customary practice in the art to which this disclosure pertains.

What is claimed is:

1. An inflatable product, comprising:

a first sheet;

a second sheet;

a plurality of spaced apart internal tensioning structures, each of the plurality of spaced apart internal tensioning structures comprising:

a plurality of weld strips including a first portion and a second portion, the first portion of the plurality of weld strips including a first side directly welded to the first sheet and a second side opposite the first side, the second side of the first portion facing the second sheet and the second portion of the plurality of weld strips including a first side and a second side, the second side of the second portion directly welded to the second sheet and the first side of the second portion facing the first sheet; and a strand extending back and forth multiple times between the first portion of the plurality of weld strips and the second portion of the plurality of weld strips, wherein a first plurality of strand portions of the strand are fixed between the second side of the first portion of the plurality of weld strips and the first sheet, a second plurality of strand portions of the strand are fixed between the first side of the second portion of the plurality of weld strips and the second sheet, and a third plurality of strand portions of the strand extend between the first portion of the plurality of weld strips and the second portion of the plurality of weld strips, the third plurality of strand portions including a first strand segment portion and a second strand segment portion angled relative to the first strand segment portion when viewed from a first longitudinal side of the respective tensioning structure when the inflatable product is inflated.

2. The inflatable product of claim 1, wherein a first length of the strand includes the first strand segment portion of the third plurality of strand portions and the second strand segment portion of the third plurality of strand portions with a first one of the second plurality of strand portions interposed between the first strand segment portion of the third plurality of strand portions and the second strand segment portion of the third plurality of strand portions.

3. The inflatable product of claim 2, wherein the second strand segment portion of the third plurality of strand portions makes an acute angle with the first strand segment portion of the third plurality of strand portions when the inflatable product is inflated.

4. The inflatable product of claim 1, wherein the third plurality of strand portions of the strand includes a third strand segment portion and a fourth strand segment portion, the fourth strand segment portion angled relative to the third strand segment portion and a second length of the strand includes the first strand segment portion of the third plurality of strand portions and the second strand segment portion of the third plurality of strand portions with a first one of the second plurality of strand portions interposed between the first strand segment portion of the third plurality of strand portions and the second strand segment portion of the third plurality of strand portions, the third strand segment portion of the third plurality of strand portions with a first one of the first plurality of strand portions interposed between the second strand segment portion of the third plurality of strand portions and the third strand segment portion of the third plurality of strand portions, and the fourth strand segment portion of the third plurality of strand portions with a second one of the second plurality of strand portions interposed between the third strand segment portion of the third plurality of strand portions and the fourth strand segment portion of the third plurality of strand portions.

5. The inflatable product of claim 4, wherein the second strand segment portion of the third plurality of strand portions makes an acute angle with the first strand segment portion of the third plurality of strand portions when the inflatable product is inflated.

6. The inflatable product of claim 5, wherein the first strand segment portion of the third plurality of strand portions is parallel to the third strand segment portion of the third plurality of strand portions when the inflatable product is inflated.

7. The inflatable product of claim 6, wherein the second strand segment portion of the third plurality of strand portions is parallel to the fourth strand segment portion of the third plurality of strand portions when the inflatable product is inflated.

8. The inflatable product of claim 5, wherein the second strand segment portion of the third plurality of strand portions is parallel to the fourth strand segment portion of the third plurality of strand portions when the inflatable product is inflated.

9. The inflatable product of claim 4, wherein the first strand segment portion of the third plurality of strand portions is parallel to the third strand segment portion of the third plurality of strand portions when the inflatable product is inflated.

10. The inflatable product of claim 9, wherein the second strand segment portion of the third plurality of strand portions is parallel to the fourth strand segment portion of the third plurality of strand portions when the inflatable product is inflated.

11. The inflatable product of claim 4, wherein the second strand segment portion of the third plurality of strand portions is parallel to the fourth strand segment portion of the third plurality of strand portions when the inflatable product is inflated.

12. The inflatable product of claim 1, wherein the first portion of the plurality of weld strips includes a first weld strip directly welded to the first sheet and the second portion of the plurality of weld strips includes a second weld strip directly welded to the second sheet.

13. The inflatable product of claim 12, wherein the first weld strip has an outer perimeter including a first longitudinal side and a second longitudinal side opposite the first longitudinal side, the strand extends beyond the outer perimeter on each of the first longitudinal side of the first weld strip and the second longitudinal side of the first weld strip.

14. The inflatable product of claim 12, wherein the first portion of the plurality of weld strips includes a third weld strip welded to the first weld strip of the first portion of the plurality of weld strips and the second portion of the plurality of weld strips includes a fourth weld strip welded to the second weld strip of the second portion of the plurality of weld strips.

15. The inflatable product of claim 14, wherein the first plurality of strand portions of the strand are positioned between the first weld strip of the first portion of the plurality of weld strips and the third weld strip of the first portion of the plurality of weld strips and the second plurality of strand portions of the strand are positioned between the second weld strip of the second portion of the plurality of weld strips and the fourth weld strip of the second portion of the plurality of weld strips.

16. The inflatable product of claim 1, wherein the second strand segment portion of the third plurality of strand portions makes an acute angle with the first strand segment portion of the third plurality of strand portions when the inflatable product is inflated.

17. The inflatable product of claim 1, wherein the first sheet is coupled to the second sheet independent of the plurality of spaced apart internal tensioning structures to form an inflatable interior of the inflatable product.

18. The inflatable product of claim 17, wherein the first sheet is coupled to the second sheet through a band, the band being welded to the first sheet and the band being welded to the second sheet.

19. The inflatable product of claim 17, wherein the inflatable product is an air mattress.

20. The inflatable product of claim 19, wherein the plurality of spaced apart internal tensioning structures are welded to a respective inner surface of the first and second sheets along a plurality of linear paths.

21. The inflatable product of claim 1, wherein the first portion of the plurality of weld strips includes at least one reinforcement strand.

22. The inflatable product of claim 1, wherein the first sheet, the second sheet, and the plurality of weld strips are made of Polyvinyl Chloride (PVC).

23. An inflatable product, comprising:

a first sheet;

a second sheet, each of the first sheet and the second sheet extending in a first direction and a second direction angled relative to the first direction;

a plurality of spaced apart internal tensioning structures, each of the plurality of spaced apart internal tensioning structures comprising:

a plurality of weld strips including a first portion and a second portion, the first portion of the plurality of weld strips being welded to the first sheet and the second portion of the plurality of weld strips being welded to the second sheet; and a strand extending back and forth multiple times between the first portion of the plurality of weld strips and the second portion of the plurality of weld strips, wherein a first plurality of strand portions of the strand are fixed relative to the first sheet with the first portion of the plurality of weld strips, a second plurality of strand portions of the strand are fixed relative to the second sheet with the second portion of the plurality of weld strips, and a third plurality of strand portions of the strand which extend between the first portion of the plurality of weld strips and the second portion of the plurality of weld strips, the third plurality of strand portions including a first strand segment portion and a second strand segment portion angled relative to the first strand segment portion when the inflatable product is inflated, wherein the plurality of spaced apart internal tensioning structures includes a first internal tensioning structure, a second internal tensioning structure spaced apart relative to the first internal tensioning structure in the first direction, and a third internal tensioning structure spaced apart relative to the second internal tensioning structure in the first direction such that the second internal tensioning structure is positioned between the first internal tensioning structure and the third internal tensioning structure along the first direction, and wherein the first portion of the plurality of weld strips of the first internal tensioning structure is welded to the first sheet at a first location and a second location along the first direction, the second location being spaced apart from the first location, the first portion of the plurality of weld strips of the second internal tensioning structure is welded to the first sheet at a third location and a fourth location along the first direction, the fourth location being spaced apart from the third location, and the first portion of the plurality of weld strips of the third internal tensioning structure is welded to the first sheet at a fifth location and a sixth location along the first direction, the sixth location being spaced apart from the fifth location, wherein the inflatable product is an air mattress.

24. The inflatable product of claim 23, wherein the first portion of the plurality of weld strips of each of the plurality of spaced apart internal tensioning structures includes a first weld strip and a second weld strip.

25. The inflatable product of claim 24, wherein the first weld strip is welded to the second weld strip.

26. The inflatable product of claim 23, wherein the first portion of the plurality of weld strips of the first internal tensioning structure is in a non-intersecting relationship with the first sheet along the first direction between the first location and the second location, the first portion of the plurality of weld strips of the second internal tensioning structure is in a non-intersecting relationship with the first sheet along the first direction between the third location and the fourth location, and the first portion of the plurality of weld strips of the third internal tensioning structure is in a non-intersecting relationship with the first sheet along the first direction between the fifth location and the sixth location.

* * * * *